(12) United States Patent
Norton et al.

(10) Patent No.: US 9,397,877 B2
(45) Date of Patent: *Jul. 19, 2016

(54) METHOD AND APPARATUS FOR CONCURRENT FILTERING OF MULTIPLE COMPONENTS OF STREAMING DATA

(71) Applicant: VANTRIX CORPORATION, Montreal (CA)

(72) Inventors: Richard Elliott Norton, Ste-Genevieve (CA); Louis-Rene Poirier-Beauchemin, Quebec (CA); Robert Héroux, Montreal (CA); Mario Joseph Leo Claude Lavalliere, Mascouche (CA)

(73) Assignee: Vantrix Corporation, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/927,019

(22) Filed: Jun. 25, 2013

(65) Prior Publication Data

US 2013/0304753 A1    Nov. 14, 2013

Related U.S. Application Data

(63) Continuation of application No. 12/869,690, filed on Aug. 26, 2010, now Pat. No. 8,478,764, which is a continuation-in-part of application No. 12/266,353, filed on Nov. 6, 2008, now Pat. No. 8,019,709.

(60) Provisional application No. 60/986,835, filed on Nov. 9, 2007.

(51) Int. Cl.
*H04L 29/06* (2006.01)
*G06N 5/02* (2006.01)
*G06F 17/30* (2006.01)

(52) U.S. Cl.
CPC .... *H04L 29/06027* (2013.01); *G06F 17/30289* (2013.01); *G06N 5/025* (2013.01)

(58) Field of Classification Search
CPC . H04L 63/22; H04L 63/0227; H04L 63/0245; H04L 12/585; H04L 51/12; H04L 29/06027
USPC ........................................................ 707/754
See application file for complete search history.

(56) References Cited

U.S. PATENT DOCUMENTS 5,867,651 A * 2/1999 Dan et al. ...................... 709/203
6,226,630 B1   5/2001 Billmers
(Continued)

FOREIGN PATENT DOCUMENTS

| JP | 2011-505611 | 2/2011 |
| WO | WO 01/44933 | 6/2001 |
| WO | WO2009/059420 | 5/2009 |

OTHER PUBLICATIONS

2003 IEEE Pacific Rim Conference on Communications Computers and Signal Processing (PACRIM 2003) (Cat., No. 03CH37490) Communications, Computers and Signal Processing, 2003. PACRIM. 2003 IEEE Pacific Rim Conference on vol. 1 Digital Object Identifier: 10.1109/PACRIM.2003.1235703 Publication Year2003.

(Continued)

*Primary Examiner* — Hadi Armouche
*Assistant Examiner* — Bryan Wright
(74) *Attorney, Agent, or Firm* — IP-MEX Inc.; Victoria Donnelly

(57) ABSTRACT

Content filtering of data containers of multiple content types is performed using multiple filtering modules operating concurrently. An apparatus for content filtering has a set of content-specific filtering modules and a network interface for parsing a received data container into components and directing each component to a respective filtering module. A filtering module edits a component of a specific content type according to respective rules. A multiplexer combines edited components produced by the set of filtering modules to form an edited data container. A root module applies a set of basic rules to a data container and any attachments. In an alternative configuration, the apparatus employs multiple filtering modules each applying rules for all content types. Received data containers are distributed among the filtering modules and an output module arranges edited data containers of a data stream in proper sequential order.

20 Claims, 54 Drawing Sheets

(56) References Cited

U.S. PATENT DOCUMENTS

| | | | |
|---|---|---|---|
| 6,298,340 B1 | 10/2001 | Calvignac | |
| 6,347,087 B1* | 2/2002 | Ganesh et al. | 370/392 |
| 6,421,733 B1 | 7/2002 | Tso et al. | |
| 6,473,763 B1 | 10/2002 | Corl | |
| 7,120,702 B2 | 10/2006 | Huang | |
| 7,133,400 B1 | 11/2006 | Henderson | |
| 7,203,692 B2 | 4/2007 | Tabatabai | |
| 7,203,749 B2* | 4/2007 | Hiraga | 709/224 |
| 7,242,324 B2 | 7/2007 | Lai et al. | |
| 7,512,698 B1* | 3/2009 | Pawson | 709/231 |
| 7,545,978 B2 | 6/2009 | Amini et al. | |
| 7,551,629 B2 | 6/2009 | Chen et al. | |
| 7,822,801 B2 | 10/2010 | Zhao et al. | |
| 8,019,709 B2 | 9/2011 | Norton | |
| 8,407,778 B2 | 3/2013 | Moonen | |
| 8,442,928 B2 | 5/2013 | Norton et al. | |
| 8,447,718 B2 | 5/2013 | Norton et al. | |
| 8,478,764 B2 | 7/2013 | Norton et al. | |
| 2002/0049705 A1 | 4/2002 | Haviv-Segal | |
| 2002/0067718 A1* | 6/2002 | Coupe et al. | 370/389 |
| 2002/0097172 A1 | 7/2002 | Fallon | |
| 2002/0099829 A1* | 7/2002 | Richards et al. | 709/227 |
| 2003/0012136 A1* | 1/2003 | Walles | 370/229 |
| 2003/0031260 A1 | 2/2003 | Tabatabai | |
| 2004/0158741 A1 | 8/2004 | Schneider | |
| 2004/0193648 A1 | 9/2004 | Lai et al. | |
| 2005/0076110 A1* | 4/2005 | Mathew et al. | 709/223 |
| 2005/0108176 A1 | 5/2005 | Jarol | |
| 2005/0132264 A1 | 6/2005 | Joshi et al. | |
| 2005/0193015 A1* | 9/2005 | Logston | G06F 17/30058 |
| 2006/0106748 A1 | 5/2006 | Chafle | |
| 2006/0133423 A1* | 6/2006 | Hamada | H04N 21/234309 370/474 |
| 2006/0143162 A1 | 6/2006 | Bernacki | |
| 2006/0155852 A1 | 7/2006 | Mayer et al. | |
| 2006/0167582 A1 | 7/2006 | Jayco | |
| 2006/0205449 A1* | 9/2006 | Hillyard | 455/575.2 |
| 2007/0198339 A1 | 8/2007 | Shen | |
| 2007/0258586 A1* | 11/2007 | Huang et al. | 380/201 |
| 2008/0091695 A1 | 4/2008 | Nagasawa | |
| 2008/0232400 A1* | 9/2008 | Tsai | H04L 27/00 370/468 |
| 2009/0125459 A1 | 5/2009 | Norton et al. | |
| 2009/0183218 A1 | 7/2009 | Li | |
| 2010/0313250 A1 | 12/2010 | Chow | |
| 2010/0332618 A1 | 12/2010 | Norton | |
| 2011/0106962 A1 | 5/2011 | Cook | |
| 2011/0246489 A1* | 10/2011 | Pope et al. | 707/754 |
| 2012/0141092 A1 | 6/2012 | Friedman | |

OTHER PUBLICATIONS

Tsukakoshi, M; Takada, O.;Murakami, T.;Terada,M.;Yamaga, M. "Large scale and high-speed interconnection of multiple FDDIs using ATM-based LAN", INFOCOM'92. Eleventh Annual joint Conference of the IEEE Computer and Communications Societies, IEEE Digital Object Identifier:10.1109/INFOCOM.1992.263518 1992, pp. 2290-2298 v.3, 1992.

Hatonen, K.;Klemettinen, M.; Mannila, H.;Ronkainen, P.; Toivonen, H. "TASA:Telecommunication Alarm Sequence Analyzer or how to enjoy faults in your network", Network Operations and Managment Symposium, 1996., IEEE vol. 2 Digital Object Identifier:10.1109/NOMS.1996.539622, pp. 520-529 vol. 2, Publication Year: 1996.

Al-Begain, K; Awan, I.;"Modelling differentiated services in UMTS networks" Modelling, Analysis and Simulation of Computer Telecommunications Systems, 2003. MASCOTS 2003. 11th IEEE/ACM International Symposium on Digital Object Identifier:10.1109/MASCOT.2003. 1240653, pp. 164-171, Publication Year:2003.

Multimedia Messaging Service, Media formats and codecs 3GPP TS 26.140, V 7.1.0, http:// www.3gpp.org/ftp/specs/html-info/26140. htm, Jun. 2007.

Coulombe, Stephane and Grassel Guido, "Multimedia Adaptation for the Multimedia Messaging Service" IEEE Communication Magazine, vol. 42, No. 7, p. 120-126, Jul. 2004.

OMA Multimedia Messaging Service, Architecture Overview, Approved Version 1.2 01, published by Open Mobile Alliance, available from http://www.openmobilealliance.org/release_program/mms_v1_2.html, Mar. 2005.

Nokia Multimedia Messaging Service Center, External Application Interface, Frequently Asked Questions, Reference for External Application Interface (EAIF) protocol available at http://www.forum.nokia.com/info/sw.nokia.com/id/d0ee4125-3879-4482-b55d-90e3afe17a31/Ext_app_interface_FAQ.pdf.html , published by Nokia, prior to Sep. 9, 2007.

Telestream: "Telestream FlipScan filters User-Generated Media for the Web", www. telestream.net, Aug. 30, 2007, XP002712050, Retrieved from the Internet: URL: http://www.telestream.net/company/press/pdfs/prs_FlipScan.pdf [retrieved on Aug. 30, 2013].

* cited by examiner

| Rule number | Resolution | | | |
|---|---|---|---|---|
| | False | | True | |
| | Action | Next Rule | Action | Next Rule |
| R5 | A2 | R2 | A3 | R7 |
| R7 | A2 | R11 | A1 | R14 |
| R3 | A0 | R7 | A1 | R15 |
| R2 | A5 | R0 | A3 | R1 |
| R12 | A0 | R5 | A5 | R3 |
| R15 | A4 | R14 | A3 | R9 |
| R0 | A1 | φ | A8 | φ |
| R1 | A1 | φ | A5 | φ |
| R11 | A1 | φ | A8 | φ |
| R14 | A8 | φ | A2 | φ |
| R9 | A4 | φ | A8 | φ |

FIG. 46

Rule record 4210, First action 4221, Current rule 4220, First successor rule 4222, Second action 4223, Second successor rule 4224, 4600

| Rule numbers 5010 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 5020(1) {R12} First rule stratum (one rule) — U | 1 | 1 | 1 | 1 | 0 | 1 | 0 | 0 | 0 | 1 | 0 | 1 | 1 | 0 | 1 | 1 |
| 5020(1) — V | 1 | 1 | 1 | 1 | 0 | 1 | 0 | 2 | 0 | 1 | 0 | 1 | 0 | 0 | 2 | 1 |
| 5020(2) {R5, R3} Second rule stratum — U | 1 | 1 | 1 | 1 | 0 | 1 | 0 | 1 | 0 | 1 | 0 | 1 | 0 | 0 | 1 | 1 |
| 5020(2) — V | 1 | 1 | 0 | 1 | 0 | 0 | 0 | 2 | 0 | 1 | 0 | 1 | 0 | 0 | 2 | 1 |
| 5020(3) {R2, R7, R15} Third rule stratum — U | 1 | 1 | 1 | 1 | 0 | 0 | 0 | 1 | 0 | 1 | 0 | 1 | 0 | 0 | 1 | 1 |
| 5020(3) — V | 1 | 1 | 0 | 1 | 0 | 0 | 0 | 0 | 0 | 1 | 0 | 1 | 0 | 0 | 2 | 0 |
| 5020(4) {R0, R1, R9, R11, R14} Fourth rule stratum — U | 1 | 1 | 1 | 0 | 0 | 0 | 0 | 0 | 0 | 1 | 0 | 1 | 0 | 0 | 1 | 0 |
| 5020(4) — V | 0 | 0 | 0 | 0 | 0 | 0 | 0 | 0 | 0 | 0 | 0 | 0 | 0 | 0 | 0 | 0 |

*FIG. 50*

| Rule number | Resolution | | | |
|---|---|---|---|---|
| | False | | True | |
| | Action | Next Rule | Action | Next Rule |
| R5 | A2 | R2 | A3 | R7 |
| R7 | A2 | R11 | A1 | R14 |
| R3 | A0 | R7 | A1 | R15 |
| R2 | A5 | R0 | A3 | R1 |
| R12 | A0 | φ | A5 | R3 |
| R15 | A4 | R14 | A3 | R9 |
| R0 | A1 | φ | A8 | φ |
| R1 | A1 | φ | A5 | φ |
| R11 | A1 | φ | A8 | φ |
| R14 | A8 | φ | A2 | φ |
| R9 | A4 | φ | A8 | φ |

| Rule numbers (5210) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| {R12, R5} First rule stratum — U | 1 | 1 | 1 | 1 | 0 | 1 | 0 | 1 | 0 | 1 | 0 | 1 | 1 | 0 | 1 | 1 |
| {R12, R5} First rule stratum — V | 1 | 1 | 1 | 1 | 0 | 0 | 0 | 2 | 0 | 1 | 0 | 1 | 0 | 0 | 2 | 1 |
| {R2, R3} Second rule stratum — U | 1 | 1 | 1 | 1 | 0 | 0 | 0 | 1 | 0 | 1 | 0 | 1 | 0 | 0 | 1 | 1 |
| {R2, R3} Second rule stratum — V | 1 | 1 | 0 | 0 | 0 | 0 | 0 | 1 | 0 | 1 | 0 | 1 | 0 | 0 | 2 | 1 |
| {R0, R1, R7, R15} Third rule stratum — U | 1 | 1 | 0 | 0 | 0 | 0 | 0 | 1 | 0 | 1 | 0 | 1 | 0 | 0 | 1 | 1 |
| {R0, R1, R7, R15} Third rule stratum — V | 0 | 0 | 0 | 0 | 0 | 0 | 0 | 0 | 0 | 1 | 0 | 1 | 0 | 0 | 2 | 0 |
| {R9, R11, R14} Fourth rule stratum — U | 0 | 0 | 0 | 0 | 0 | 0 | 0 | 0 | 0 | 1 | 0 | 1 | 0 | 0 | 1 | 0 |
| {R9, R11, R14} Fourth rule stratum — V | 0 | 0 | 0 | 0 | 0 | 0 | 0 | 0 | 0 | 0 | 0 | 0 | 0 | 0 | 0 | 0 |

METHOD AND APPARATUS FOR CONCURRENT FILTERING OF MULTIPLE COMPONENTS OF STREAMING DATA

CROSS REFERENCE TO RELATED APPLICATIONS

The present application is a Continuation of U.S. patent application Ser. No. 12/869,690 filed Aug. 26, 2010 which issued under U.S. Pat. No. 8,478,764 on Jul. 2, 2013, which is a Continuation-in-Part of U.S. patent application Ser. No. 12/266,353 filed Nov. 6, 2008 which issued under U.S. Pat. No. 8,019,709 on Sep. 13, 2011, which claims priority from the U.S. Provisional Patent Application No. 60/986,835 filed on Nov. 9, 2007, the entire contents of which being incorporated herein by reference.

FIELD OF THE INVENTION

The present invention relates to content filtering of data containers of multiple components of different content types and, in particular, to a method and apparatus for content filtering based on multiple interrelated rules.

BACKGROUND OF THE INVENTION

In a network transporting data streams containing data of different content types, it may be desirable to examine a data stream to determine if content modifications are necessary to ensure compatibility with receiver capability, downstream transmission capacity, or any other constraints. Content modifications may also be desirable to enhance network throughput by employing data transcoding to change encoding methods or trans-rating to change encoding rates. In addition to content inspection and potential modifications, other content-management features may include personalization of communicated data and providing useful information to a receiver regarding data content or even conditions of a communications path.

The content types may include video signals, audio signals, still images, animation, or text. Modifications applicable to different content types may be based on different criteria. Furthermore, modifications applied to a single content type may be based on multiple interrelated conditions rendering the process of content management a challenging task. There is a need, therefore, for an apparatus for efficiently handling content management and facilitating real-time, virtually instantaneous, content examination and, where needed, content modifications.

SUMMARY OF THE INVENTION

In accordance with one aspect, the present invention provides an apparatus for content filtering of data containers where at least one data container contains components of different content types. The device comprises a set of content-specific filtering modules and a network interface for parsing a received data container into components and directing each component to a respective filtering module. Each filtering module comprises a module processor, a data memory, and an instructions-memory.

The data memory stores a set of descriptors of a specific content type, a set of descriptors' criteria, a set of operators, a set of filters, and a set of content-specific rules. Each filter specifies a content descriptor, a descriptor criterion, and an operator determining a binary state. Each rule is encoded as a Boolean expression of binary states of respective filters. The instructions-memory stores instructions which cause the module processor to edit a component of a specific content type according to respective rules to produce an edited component. A multiplexer combines edited components produced by the set of filtering modules to form an edited data container.

The apparatus further comprises a root module having a root processor and memory devices storing a set of basic rules applicable to a data container and any attachments of the data container.

In one embodiment, the instructions memory further stores processor readable instructions which cause the processor to arrange the rules in at least one rule tree. Each rule has a binary outcome leading to one of two respective actions and, optionally, one of two other rules from the set of rules.

In another embodiment, the instructions memory stores processor readable instructions which cause the processor to sort the rules into hierarchical rule strata each rule stratum containing independent rules. The data memory stores rule-succession records, each rule succession record corresponding to a specific rule within the set of rules. A rule succession record indicates a first action and a first succeeding rule corresponding to a value of 0 of the specific rule and a second action and a second succeeding rule corresponding to a value of 1 of the specific rule. The first succeeding rule may be a null rule and the second succeeding rule may be a null rule.

In accordance with another aspect, the present invention provides an apparatus for filtering data containers of multiple content types. The apparatus employs multiple filtering modules each having a module processor, a data memory, an instructions memory, and a buffer for holding edited data containers. The data memory stores encoded rules for each content type. The instructions memory stores processor-executable instructions which cause the module processor to apply the encoded rules to a data container and to individual components of the data container to produce an edited data container.

A central processor performs functions of a network interface, an input module, and an output module according to processor-executable instructions stored in a central instructions memory. The network interface receives data containers belonging to multiple data streams and transmits edited data containers over a network link. The input module holds received data containers in an input memory device and transfers a data container waiting in the input memory device to an unoccupied filtering module. The output module transfers an edited data container held in a buffer of a filtering module to the network interface for transmitting to a respective destination.

The input module may affix a label to each received data container in order to identify a data stream to which a received container belongs and provide a cyclic container number of a container within a data stream. The output module may then arrange edited data containers of a data stream in proper sequential order. The central processor may parse each received data container into constituent components of different content types and include in the label an indication of the positions of different components within a container. Alternatively, each module processor may parse data containers transferred from the input module into constituent components of different content types.

In accordance with a further aspect, the present invention provides a method for filtering data streams. The method comprises receiving data containers at a network interface having a processor and a memory device, parsing each data container into constituent components and identifying, for each component, a content type from among a set of predefined content types. A component is directed to a respective module, among a plurality of content-specific filtering modules, according to a content type of the component. Each content-specific filtering module has a respective processor, an instructions memory, and a data memory.

A content-specific filtering module determines characteristics of a respective component, identifies descriptors of the component, determines values of the descriptors, and acquires corresponding descriptor criteria from an associated memory device. A set of predefined filters is then determined, each filter having a binary state determined according to a content descriptor, a descriptor criterion, and an operator. A set of rules, each rule encoded as a Boolean expression of binary states of respective filters, is then evaluated and the respective component is edited according to values of the rules.

Edited components produced by the plurality of content-specific filtering modules are combined and transmitted over a network link.

Prior to directing components of a received data container to respective content-specific filtering modules, the received data container may be examined to detect undesirable content in any component or attachment and a component or an attachment may be deleted. A signal-processing function may also be performed on a component of the received data container. Preferably, a notification may be appended to the data container to report any alterations.

A rule may be applicable to more than one content type and more than one rule may lead to a same action. Thus, according to one embodiment, a superset of rules applicable to all predefined content types are stored in a rules-memory device and a superset of actions are stored in an actions-memory device. A particular content-specific filtering module need only store indices of rules, within the superset of rules, and indices of actions, within the superset of actions, relevant to the particular content-specific filtering module.

BRIEF DESCRIPTION OF THE DRAWINGS

Embodiments of the invention will now be described, by way of example, with reference to the accompanying drawings, in which:

FIG. 46 illustrates an exemplary user-specified rule succession table having multiple rule records, each rule record indicating a current rule having a binary outcome of "false" or "true", with an action and a succeeding rule corresponding to each outcome, for use in sorting the encoded rules generated by the configuration device of FIG. 33 in multiple rule strata, in accordance with an embodiment of the present invention;

FIG. 50 illustrates the method of FIG. 48, with the implementation of FIG. 49, for the exemplary rule succession table of FIG. 46;

FIG. 51 illustrates a user-specified rule succession table similar to the rule succession table of FIG. 46 but with a succeeding rule in one rule record replaced with a null rule;

FIG. 52 illustrates the method of FIG. 48, with the implementation of FIG. 49 applied to the rule succession table of FIG. 51;

DETAILED DESCRIPTION OF THE EMBODIMENTS OF THE INVENTION

Terminology

Multi-Media Service (MMS): The term is used colloquially to refer to multi-content communication services where information contents of different forms such as text, audio signals, video signals, images, presentations, etc., are exchanged among terminals through a network. Encoded information transferred from one terminal to another is typically arranged in a single data stream with time-interleaved segments corresponding to the different information contents.

Container: A container is a computer file stored on a computer readable medium and transmitted over a computer network. The container is structured to contain various types of data. The container may support multiple text, audio, and video streams with synchronization information to enable coordinated play back of various streams.

Container component: A container includes sections, each comprising data encoded in a specific form, such as a text, audio data, image data, or video data. The term container component refers to data in one section. A container component may be referenced as a "component" for brevity. In a multimedia messaging system, a component is also known as "media".

Container screening: "Container screening" refers to a process of examining the content of a container, including all components, to ensure absence of any undesirable insertions, especially harmful insertions.

Container adaptation: "Container adaptation" refers to a process of modifying the form of a container component found to be incompatible with the decoding capability of a respective receiver. If it is not feasible to present a container component to suit a receiver, the container component may be deleted. A container-adaptation process is receiver specific while the process of container screening is independent of the type of intended receiver.

Container editing: The term "container editing" refers to the combined processes of container screening and container adaptation.

Container conditioning: The term may be used synonymously with "container editing". However, container conditioning also appends an appropriate notification with a container, even when a container is not modified.

Transcoder: A transcoder is a device, which performs direct digital-to-digital translation of encoded information to enable an information record of one format to be reproduced in a different format suitable for a specific receiver.

Figure 1:
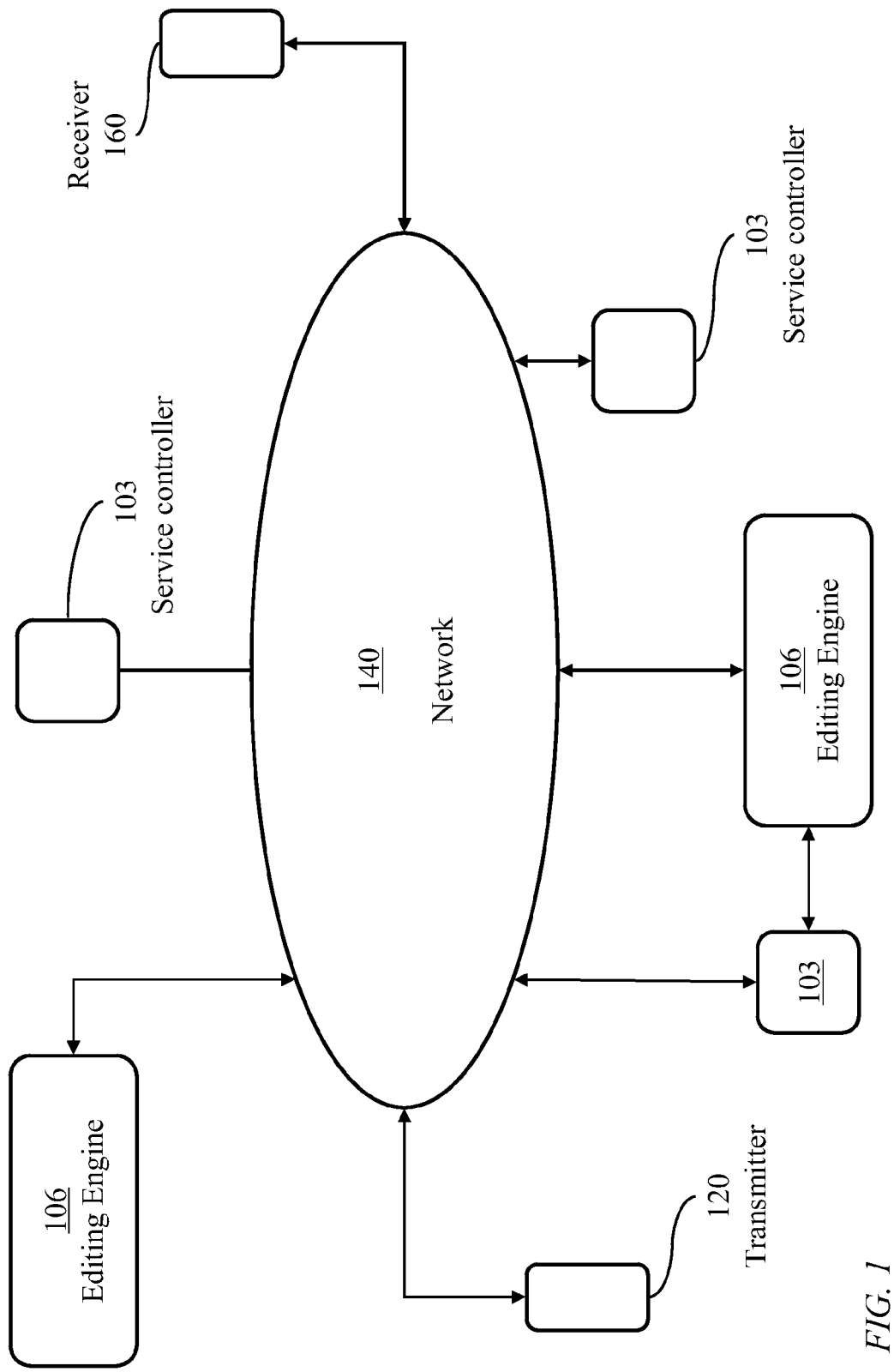
FIG. 1 illustrates a network supporting service controllers and editing engines for filtering and adapting data containers communicated through the network, in accordance with an embodiment of the present invention.

FIG. 1 illustrates a network 140 providing a path from a transmitting device 120 to a receiving device 160, hereinafter referenced as transmitter 120 and receiver 160. Network 140 supports service controllers 103 and editing engines 106, in addition to numerous other hardware terminal devices of different types. Transmitter 120 sends containers to receiver 160, where a container may include data of different content type such as encoded text, audio signals, still images, animation (rapid display of images), and video signals. A container may be directed to a service controller 103 which, in turn, directs the container to an editing engine 106 for examining the container and, where needed, editing the content of the container. An editing process includes data screening to ensure absence of any undesirable insertions, especially harmful insertions, content modifications to meet specific requirements, and content adaptation to be compatible with the decoding capability of a respective receiver.

Figure 2:
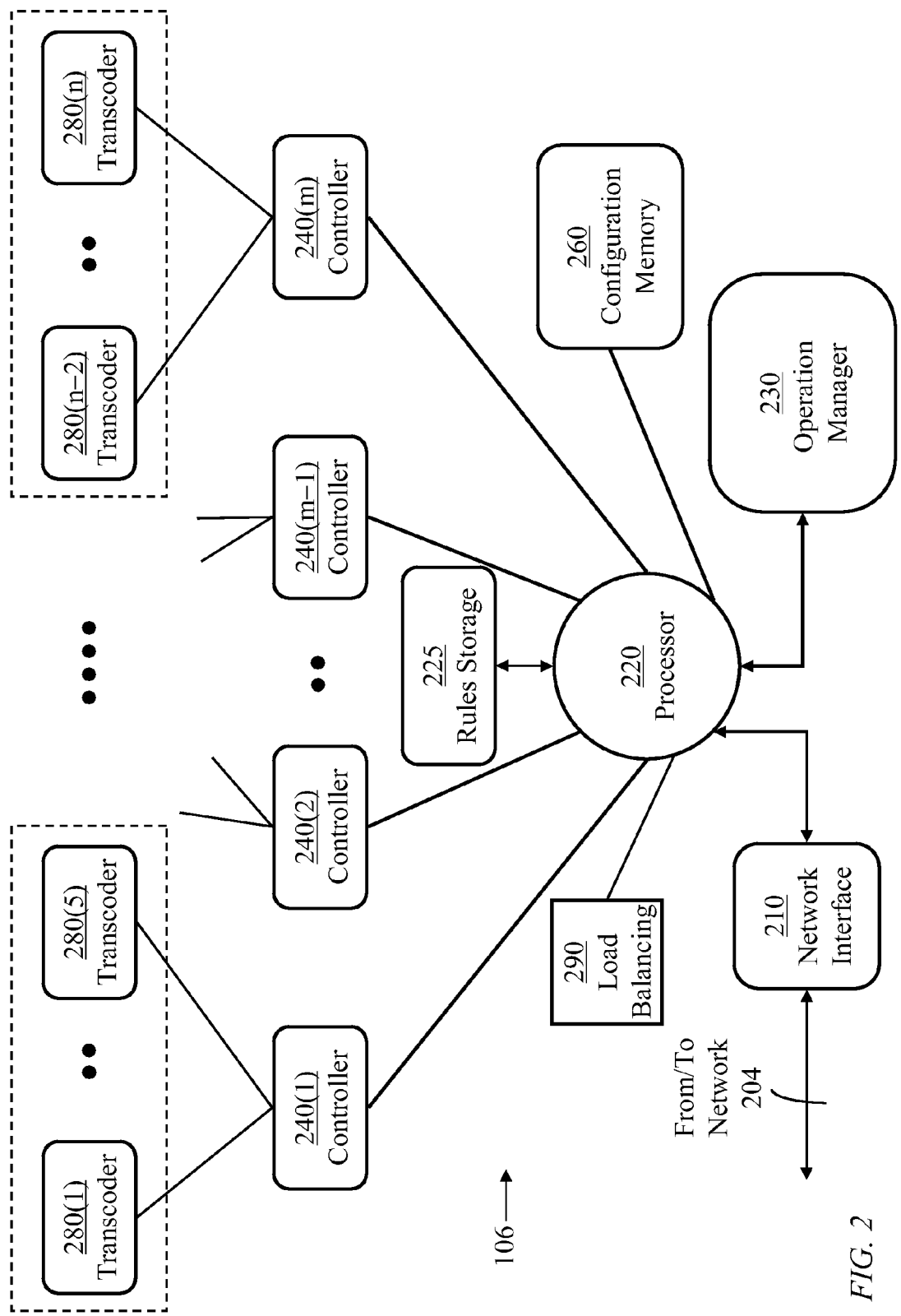
FIG. 2 illustrates an editing engine comprising controllers and transcoders, in accordance with an embodiment of the present invention.

FIG. 2 illustrates an editing engine 106. A network interface 210 receives containers from clients through a link 204. A container is directed to one of m>1 controllers 240, individually identified as 240(1), 240(2), ..., 240(m). Controllers 240 may be implemented as a distinct hardware entity or share a computing device hosting a number of transcoders 280 as will be described below. Controllers 240 are protocol specific, each being programmed to handle containers formed according to a respective protocol. Controllers handling a specific protocol are said to be of the same controller type. The controllers may be grouped into controller groups, each controller group handling containers formulated according to the same protocol. An editing engine 106 may have controllers of different types. However, an entire editing engine 106 may be configured to have controllers of the same type. The editing engine 106 may also have a load-balancing module 290.

The editing engine 106 includes a number of transcoders 280, individually identified as 280(1), 280(2), ..., 280(n). The primary function of the transcoders 280 is to perform direct digital-to-digital translation of encoded information to enable an information record of one format to be reproduced in a different format suitable for a specific receiver. A transcoder, however, may also perform processes of content filtering together with content adaptation. A number of selected transcoders 280 is assigned to each controller 240, together forming a control assembly. For example, in FIG. 2, controller 240(1) and transcoders 280(1) to 280(5) form one control assembly installed on a respective computing device. Controller 240(m) and transcoders 280(n-2) to 280(n) form another control assembly installed on another computing device. A control assembly is preferably installed on a server unit, also called a "blade server", which is a single circuit board supporting processors and memory devices.

A processor 220 hosts a network interface 210 and an operation manager 230. Network interface 210 receives containers from clients communicatively coupled to network 140 (FIG. 1). An operation manager 230 comprises computer readable instructions stored in a computer readable storage medium for performing operation, administration, and maintenance functions.

A service controller 103 may receive containers and send container editing requests to one of the editing engines 106.

Processor 220 also hosts a graphical user interface (not illustrated), which comprises computer readable instructions stored in a computer readable storage medium, coupled to operation manager 230, for entering an array of encoded rules and for assigning to each controller 240 a respective subset of transcoders. Configuration memory device 260 stores identifiers of transcoders assigned to each controller.

The rules governing the content filtering process may be stored as a common rule file stored in a rules memory 225 which is accessed by each transcoder 280. Alternatively, each computing device (server unit) hosting a controller and associated transcoders may store a relevant subset of the rules file.

Figure 3:
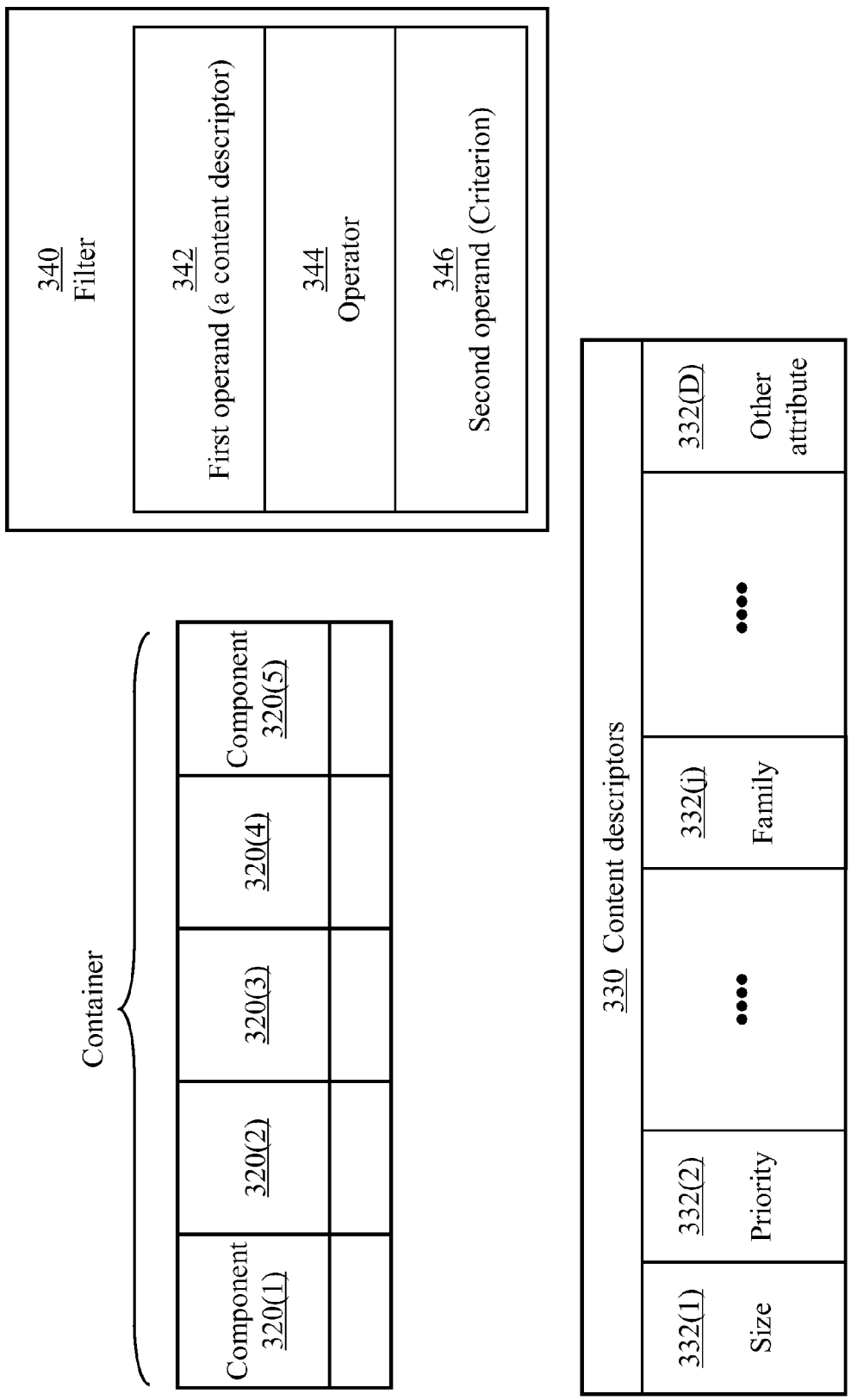
FIG. 3 illustrates exemplary structures of a multimedia container, content descriptors of a container component, and a content filter, in accordance with an embodiment of the present invention.

FIG. 3 illustrates a container having multiple components 320, individually identified as 320(1), 320(2), etc. A component 320 may contain a text, an audio recording, an encoded image, a video recording, and any of other content types. The content of a component is characterized using a set 330 of descriptors 332 individually identified as 332(1), 332(2), ... 332(j), and 332 (D), D being a total number of descriptors. Content descriptors are defined according to several attributes such as content type, identifier (name), extension, digital signature, cryptographic functions, priority, and file size. Descriptors may be added or deleted as content-filtering requirements vary with the evolving art of multimedia telecommunications.

In accordance with an embodiment of the present invention, characteristics of the content of a container component are represented as a set of binary variables, each binary variable determining whether the content meets a specific criterion. The value of a content descriptor of a received container is determined by examining the content of the container. A transcoder performing this function is therefore aware of the format of the received container and implications of a protocol according to which the container is formulated. The value of a characterizing binary variable is determined by applying an operator 344 to two operands; a value of the content descriptor (342) and a corresponding criterion 346 entered by an installer (a user) of the content-filtering system. The operator 344 and the two operands 342 and 346 are said to form a filter 340 (also called a content-condition or simply a condition). Thus, the content of a container component is characterized by a set of filters, each having a value of "true" or "false".

Editing a container before adaptation to suit a receiver is based on a set of rules, each rule determining an editing action such as deleting the entire content, deleting malicious insertions found in the content, or removing an attachment of the content. A rule is a function of a respective subset of the filters. Having selected the filters to be binary variables, the function defining a rule is preferably formulated as a Boolean expression of the subset of filters. Thus, an installer (a user) of a system for content filtering (as will be described in more detail with regard to FIG. 7 and FIG. 8) defines a rule by a subset of filters, a Boolean expression, and an action to be performed according to an outcome executing the Boolean expression.

Figure 4:
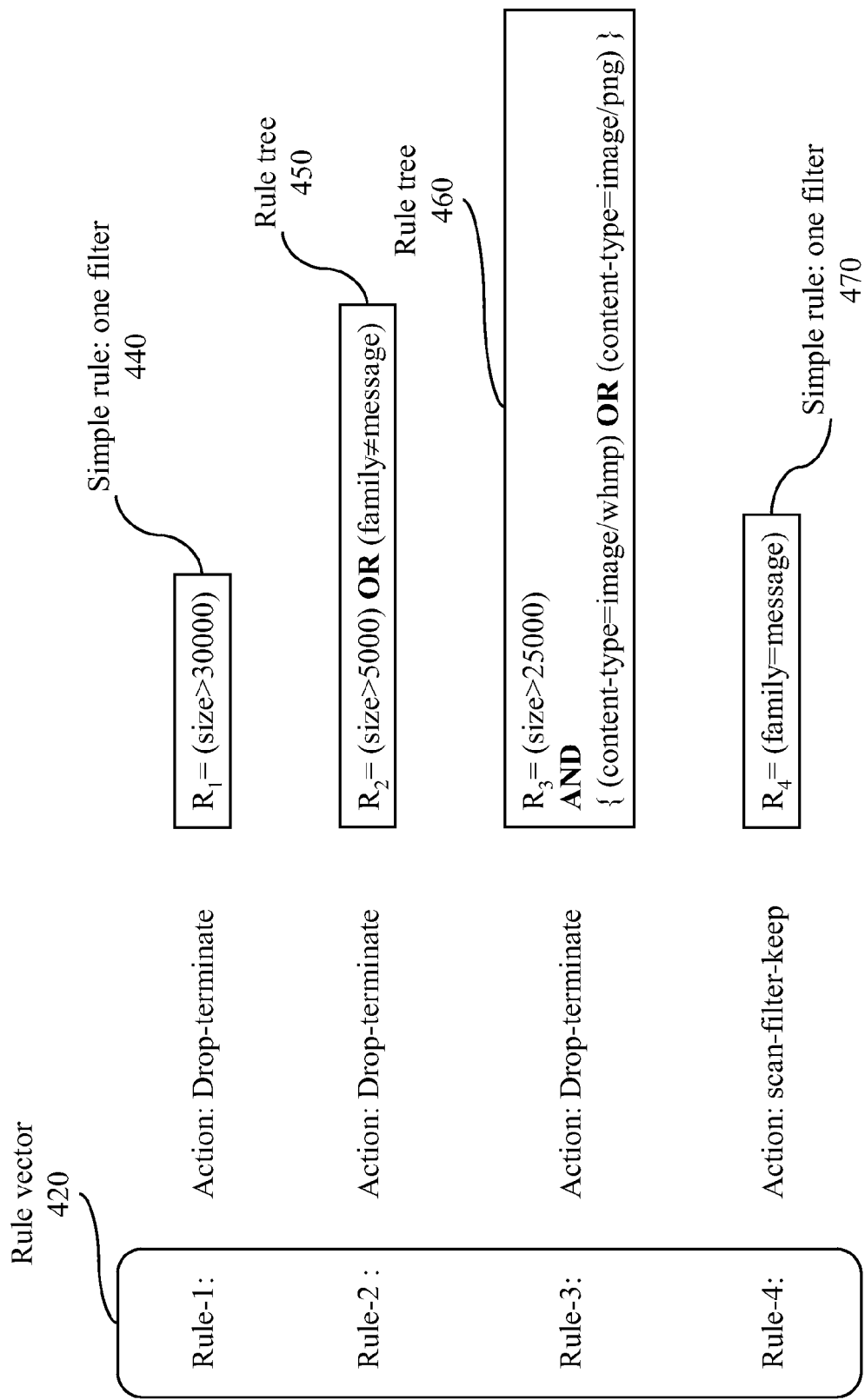
FIG. 4 illustrates algebraic forms of Boolean expressions associated with a set of rules applicable to a data container, in accordance with an embodiment of the present invention.

FIG. 4 illustrates algebraic forms of Boolean expressions associated with a set of four rules, stored in a rule vector 420, applicable to a component of a data container. The same set of rules may also be applied to at least one other component of the rule filter.

A first rule, Rule-1, is defined by a single filter (size>30000), where the content descriptor is the size of the component, the operator is "GREATER THAN" and the criterion is 30000 (reference numeral 440). The respective action, if the rule result is Boolean "true" is to drop the component and terminate processing of the remaining rules for the component under consideration.

A second rule, Rule-2, is defined by a Boolean expression 450 of two filters (size>5000) and (family message). The descriptor of the first filter is "size", the criterion is "5000", and the operator is "GREATER THAN". The descriptor of the second filter is "family", the criterion is "message", and the operator is "NOT EQUAL". The Boolean expression contains a single operator "OR". The action associated with Rule-2 is the same as that of Rule-1.

A third rule, Rule-3, is defined by a Boolean expression 460 of three filters: (size>25000), (content-type=image/wbmp), and (content-type=image/png). The descriptor of the first filter is "size", the criterion is "25000", and the operator is "GREATER THAN". The descriptor of the second filter is "content-type", the criterion is "image/wbmp", and the operator is "EQUAL". The descriptor of the third filter is "content-type", the criterion is "image/png", and the operator is "EQUAL". The Boolean expression contains two operators "AND" and "OR". The action of Rule-3 is the same as the action of Rule-1. It is noted that "wbmp" refers to Wireless Bitmap (Wireless Application Protocol, WAP, graphic format), and "png" refers to "Portable Network Graphics".

A fourth Rule, Rule-4 is defined by a single filter (family=message), where the content of the descriptor is "family", the criterion is "message", and the operator is "EQUAL" (reference numeral 470).

Figure 5:
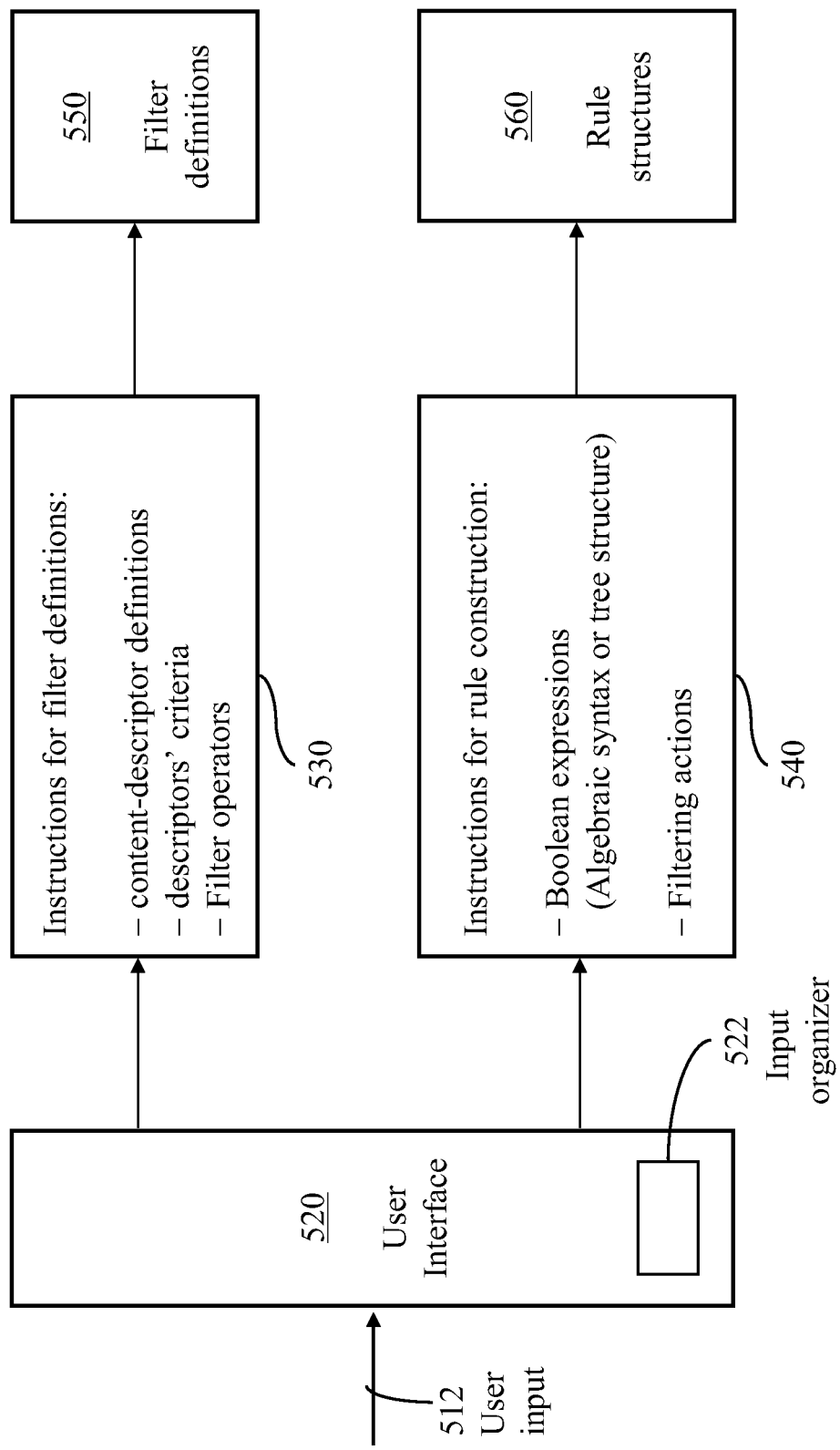
FIG. 5 illustrates basic components of a content-filtering process, in accordance with an embodiment of the present invention.

FIG. 5 illustrates the basic components of a data acquisition sub-system incorporated in operation manager 230 of FIG. 2 and comprising a user interface 520, a filter-creating module 530 for acquiring filter definitions, a rule-construction module 540 for acquiring rule definitions, a memory division 550 for storing filter definitions, and a memory division 560 for storing rule definitions (rule structures). The user interface 520 enables an installer (a user) to provide input data 512 to define a set of filters and a set of rules. The filter-creation module 530 comprises computer readable instructions stored in a computer readable storage medium, which, when executed, cause a processor to prompt the installer to enter content-descriptor definitions, a criterion for each definition, and an operator. The values of the descriptors are determined according to the content of a received container.

The rule-construction module 540 contains computer-readable instructions stored in a computer readable storage medium, which, when executed, cause a processor to prompt the installer to enter a Boolean expression for each rule, and select an action from a set of predefined actions. The computer-readable instructions also cause the processor to parse the Boolean expression and determine a sequence of executing terms of the expression.

The filter definitions are stored in a memory division 550 of a memory device, and the rule definitions are stored in a memory division 560 of the same memory device, or of any other memory device.

Figure 6:
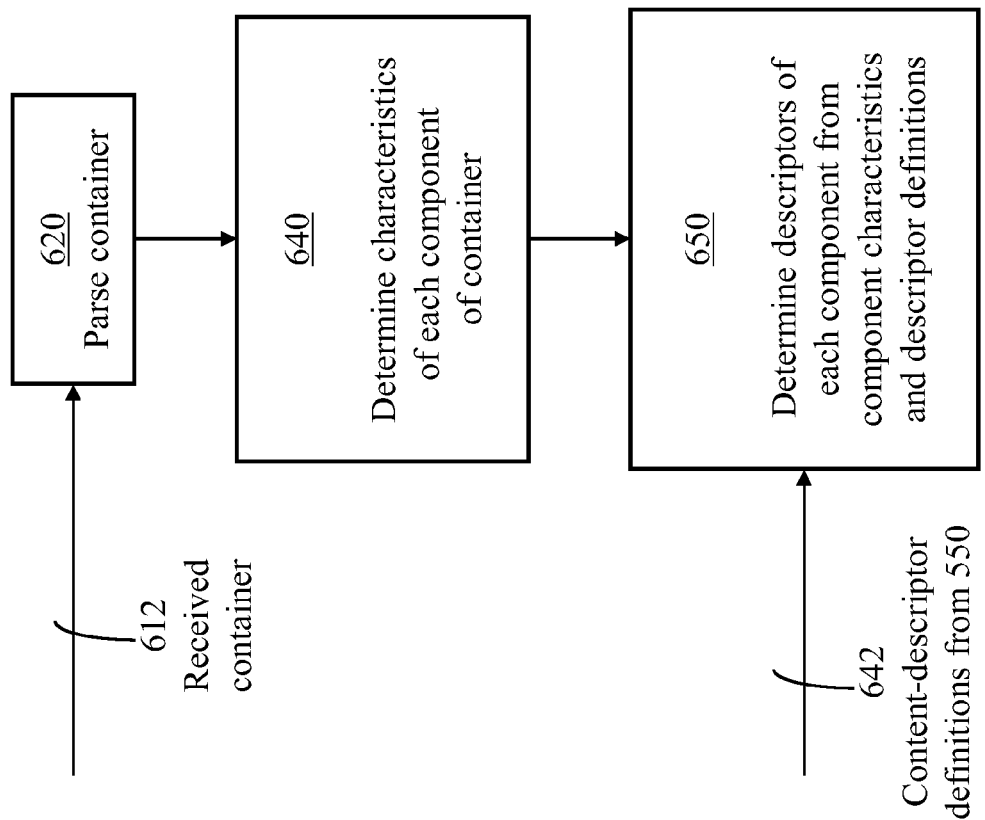
FIG. 6 illustrates a process of deriving descriptors of container content, in accordance with an embodiment of the present invention.

FIG. 6 illustrates a process of determining values of content descriptors of a received container 612 using definitions of the content descriptors stored in memory division 550. The received container 612 is parsed in step 620 to identify the components of the container. Each component is analyzed in step 640 and in step 650 the results are paired with content-descriptor definitions read from memory division 550.

Figure 7:
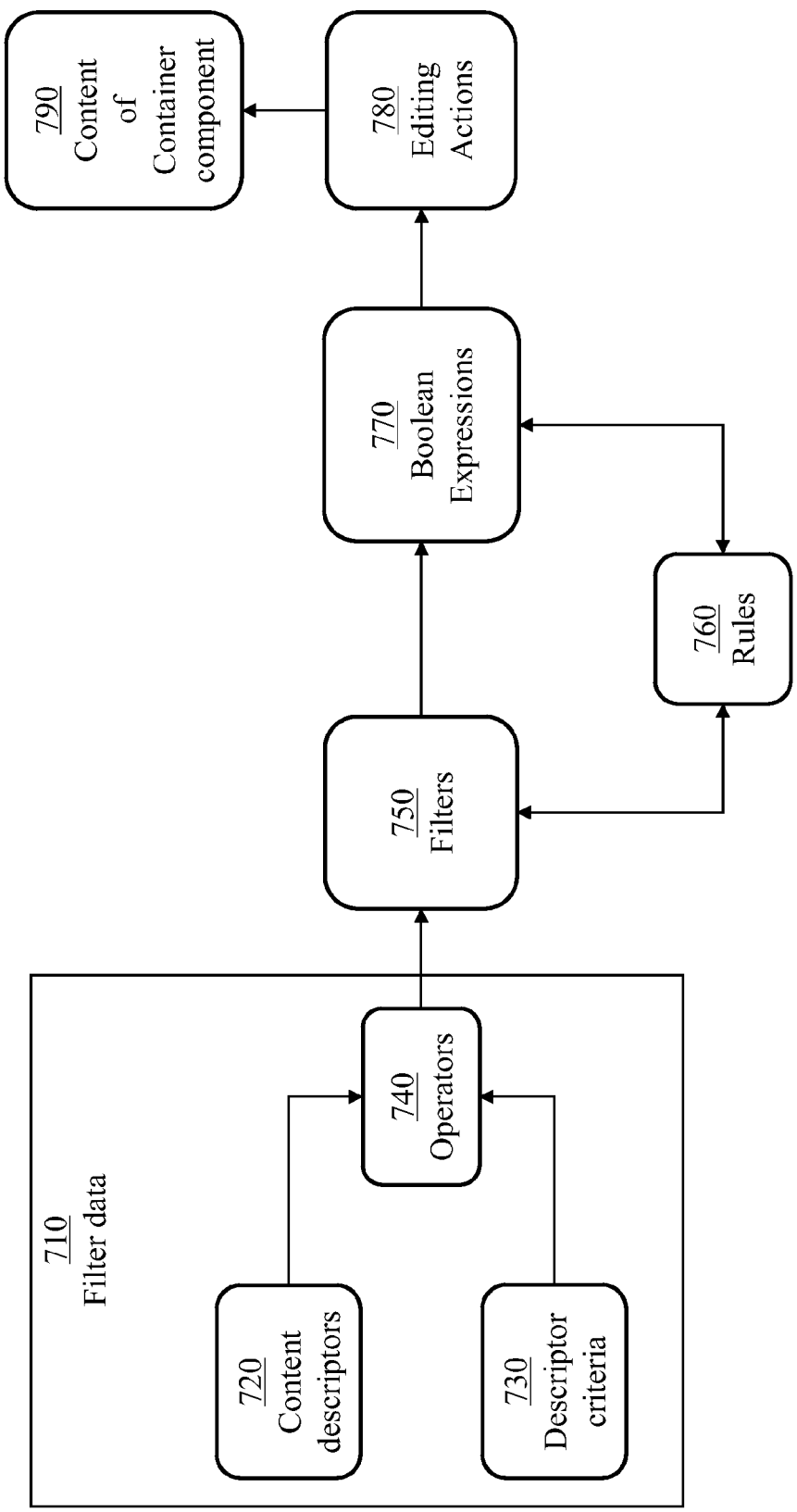
FIG. 7 illustrates a system for content filtering, in accordance with an embodiment of the present invention.

FIG. 7 illustrates the overall organization of a system for content filtering in accordance with an embodiment of the present invention. A memory 710 stores data for all relevant filters. Each filter is defined by an operator from a set of operators 740 determined by module 530 of FIG. 5, a content descriptor from a set of content descriptors 720 are determined in step 650 of FIG. 6, and a descriptor criterion from a set of descriptor criteria 730 determined in module 530 of FIG. 5. The binary value of each filter ("true" or "false") is stored in a memory device 750 for use in executing a set of rules defined in module 540 of FIG. 5.

Each rule is defined by a subset of filters, a Boolean expression, and an action. A memory 770 stores encoded Boolean expressions determined in module 540 of FIG. 5 according to system installer (user) input. A memory 760 stores identifiers of filters used in each rule and respective Boolean expressions. A memory 780 stores indications of editing actions to be performed subject to respective results of evaluating the Boolean expressions. The execution of each Boolean expression yields a binary result and a respective editing action. Upon completion of an editing action, the edited content is placed in a memory 790.

Figure 8:
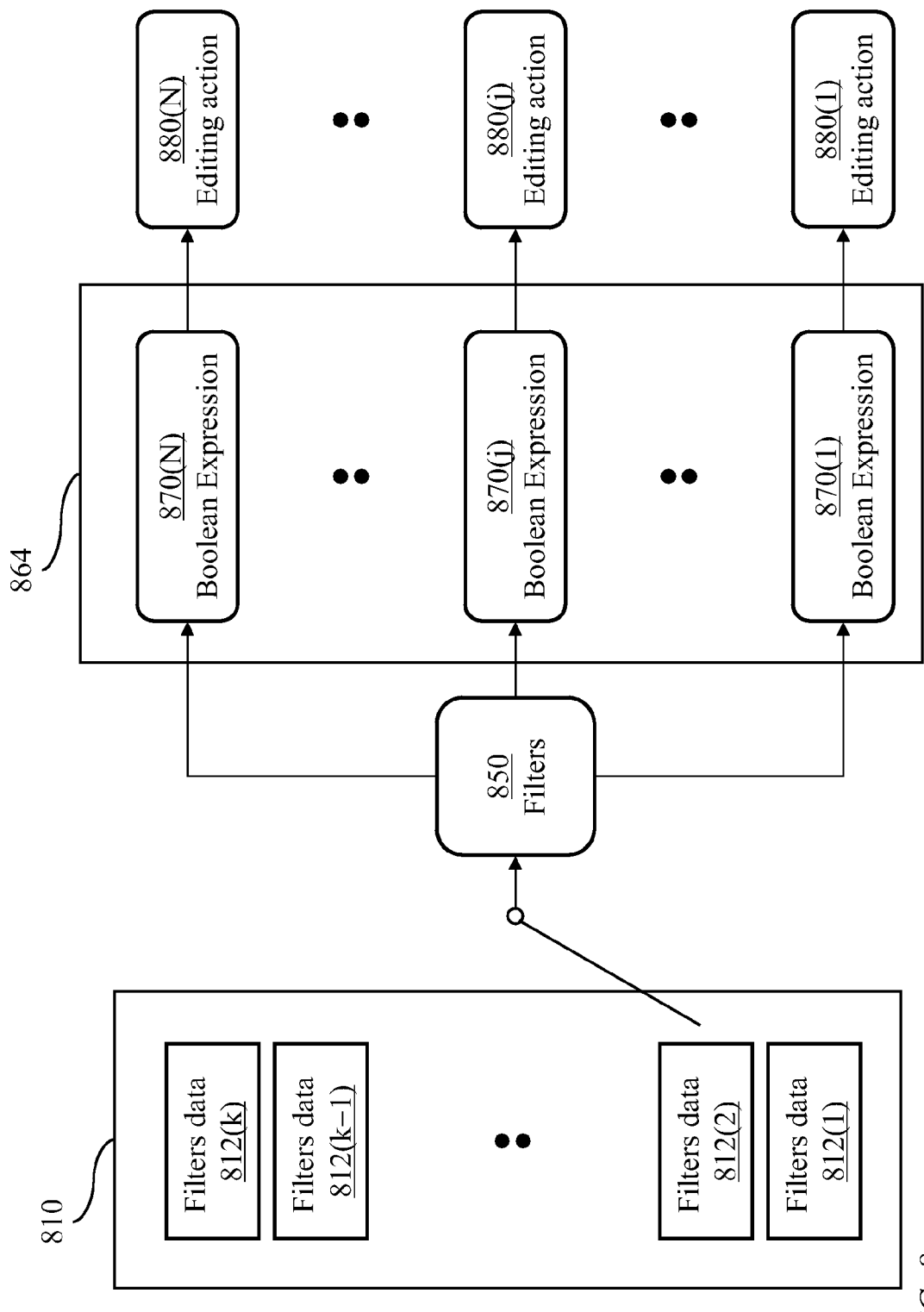
FIG. 8 illustrates a system similar to the system of FIG. 7 adapted for containers having multiple components, in accordance with an embodiment of the present invention.

While FIG. 7 illustrates the system for content filtering, according to an embodiment of the invention, as applied to a single component, FIG. 8 illustrates the system for content filtering of FIG. 7 as applied to k>1 container components. A memory device 810 stores data of all relevant filters of each of the k container components. The data pertinent to each filter is individually identified as 812(1) to 812(k). The components of the container are processed sequentially. The results of applying the operator of each filter, for a component under considerations, are held in a memory 850. A set of N>1 encoded Boolean expressions is stored in a memory 864. The Boolean expressions are individually identified as 870(1) to 870(N), each associated with a respective editing action from N editing actions, individually identified as 880(1) to 880(N).

Figure 9:
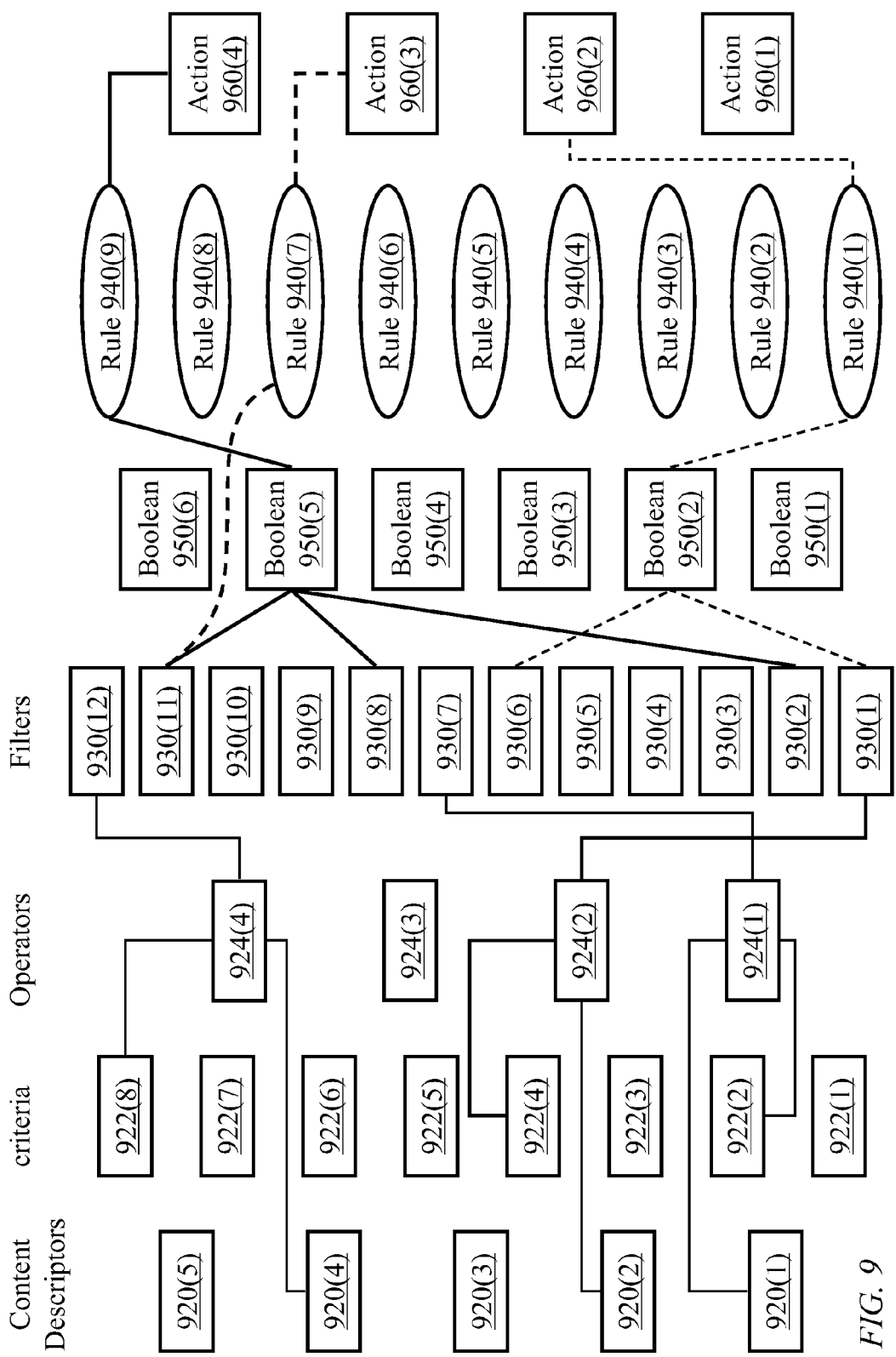
FIG. 9 details a content-filtering process, in accordance with an embodiment of the present invention.

FIG. 9 illustrates an exemplary process of content filtering. An installer (a user) of the system for content filtering of FIG. 7 or FIG. 8 has initially defined five content descriptors, individually identified as 920(1) to 920(5), eight descriptor criteria individually identified as 922(1) to 922(8), and four operators individually identified as 924(1) to 924(4). The installer has defined twelve filters, individually identified as 930(1) to 930(12), each filter specifying one of the content descriptors 920, one of the criteria 922, and one of the operators 924. Upon determining values of the five content descriptors 920(1) to 920(5), as described in step 650 of FIG. 6, the binary values of the twelve filters are determined.

The installer has defined six Boolean expressions, individually identified as 950(1) to 950(6), where each Boolean expression is associated with a subset of the 12 filters. For example, Boolean expression 950(2) is associated with two filters, 930(1) and 930(6), and Boolean expression 950(5) is associated with filters 930(2), 930(8), and 930(11). The installer defined four actions individually identified as 960(1) to 960(4). The installer then defined nine rules, individually identified as 940(1) to 940(9), using rule-construction module 540 of FIG. 5. Each rule is associated with a single Boolean expression 950 and a single action 960. For example, rule 940(1) specifies Boolean expression 950(2) and action 960(2), while rule 940(9) specifies Boolean expression 950(5) and action 960(4).

A rule may be based on a single filter, where the result of the rule is the binary value of the filter. For example, rule 940(7) depends solely on filter 930(11).

Boolean Expression Representation

An installer of the system for content filtering of FIG. 7 or FIG. 8 may provide a Boolean expression 950 according to conventional algebraic syntax or according to a tree structure. The user interface 520 of FIG. 5 comprises a first module (not illustrated) for encoding a Boolean expression presented in algebraic form and a second module (not illustrated) for encoding a Boolean expression presented as a tree structure. Each of the two modules provides a respective template to enable the installer to properly specify a Boolean expression.

A Boolean expression comprises simple operations, compound operations, and complex operations. A simple operation is exhibited as an operator and two operands with the operator and operands bounded by two delimiters (such as two brackets). The operator and operands may be listed in any order and the two delimiters need not be distinguished from each other. The two operands are Boolean variables representing two filters. A compound operation comprises an operator and two simple operations with the operator and two simple operations bounded by two delimiters. A complex operation comprises an operator and two operations all bounded by two delimiters where either of the two operations may be a simple operation or a compound operation. The two operations constituting a complex operation may also be complex operations. Delimiters of a simple operation, compound operation, or complex operation may be identical.

Figure 10:
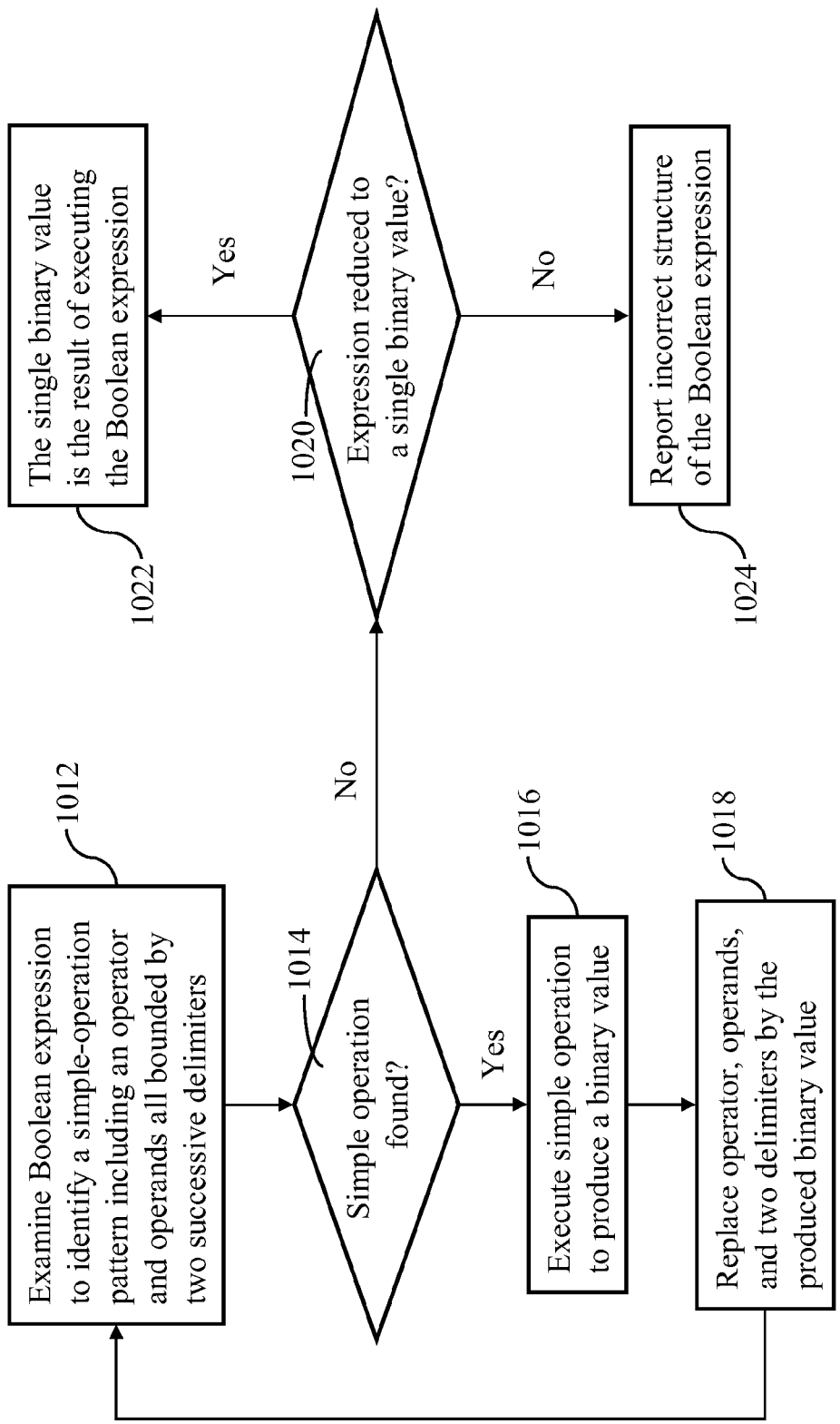
FIG. 10 illustrates a method of evaluating a Boolean expression of a rule, in accordance with an embodiment of the present invention.

FIG. 10 illustrates a method of evaluating the Boolean expressions, according to an embodiment of the present invention, which requires only recognizing and performing simple operations. According to the method, an encoded Boolean expression is parsed to identify simple operations. The operator of an identified simple expression is applied to the respective operands (filters) to produce a binary value of "true" or "false" (for example, represented as "1" and "0"). The operator, operand, and two delimiters of the identified simple operation, thus processed, are deleted and replaced by the result of the operation. The process continues recursively until the encoded Boolean expression reduces to a single simple operation, the result of which becoming the outcome of the Boolean expression.

In step 1012 of FIG. 10, a Boolean expression is examined to identify a simple operation. If a simple operation is found (step 1014), step 1016 executes the simple operation and produces a binary value. Step 1018 replaces the operator, operands, and delimiters of the simple operation by the binary value. Step 1012 is then revisited to look for another simple operation in the reduced Boolean structure. If step 1014 determines that no further simple operations are found in the current form of the Boolean expression, step 1020 examines the current form to determine if it has indeed reduced to a single binary value ("true", false" or "1", "0"). If so, step 1022 reports the single binary value as the result of executing the Boolean expression. If step 1020 determines that the processed Boolean expression contains more than a single binary value, step 1024 reports an indication that the Boolean expression has not been correctly formed.

The process of FIG. 10 is preferably performed during data entry so that the user (the installer) can correct the Boolean expression. The user interface 520 or some other component of the editing engine may be provided with computer instructions to analyze an erroneously formed Boolean expression and locate an error.

Figure 11:
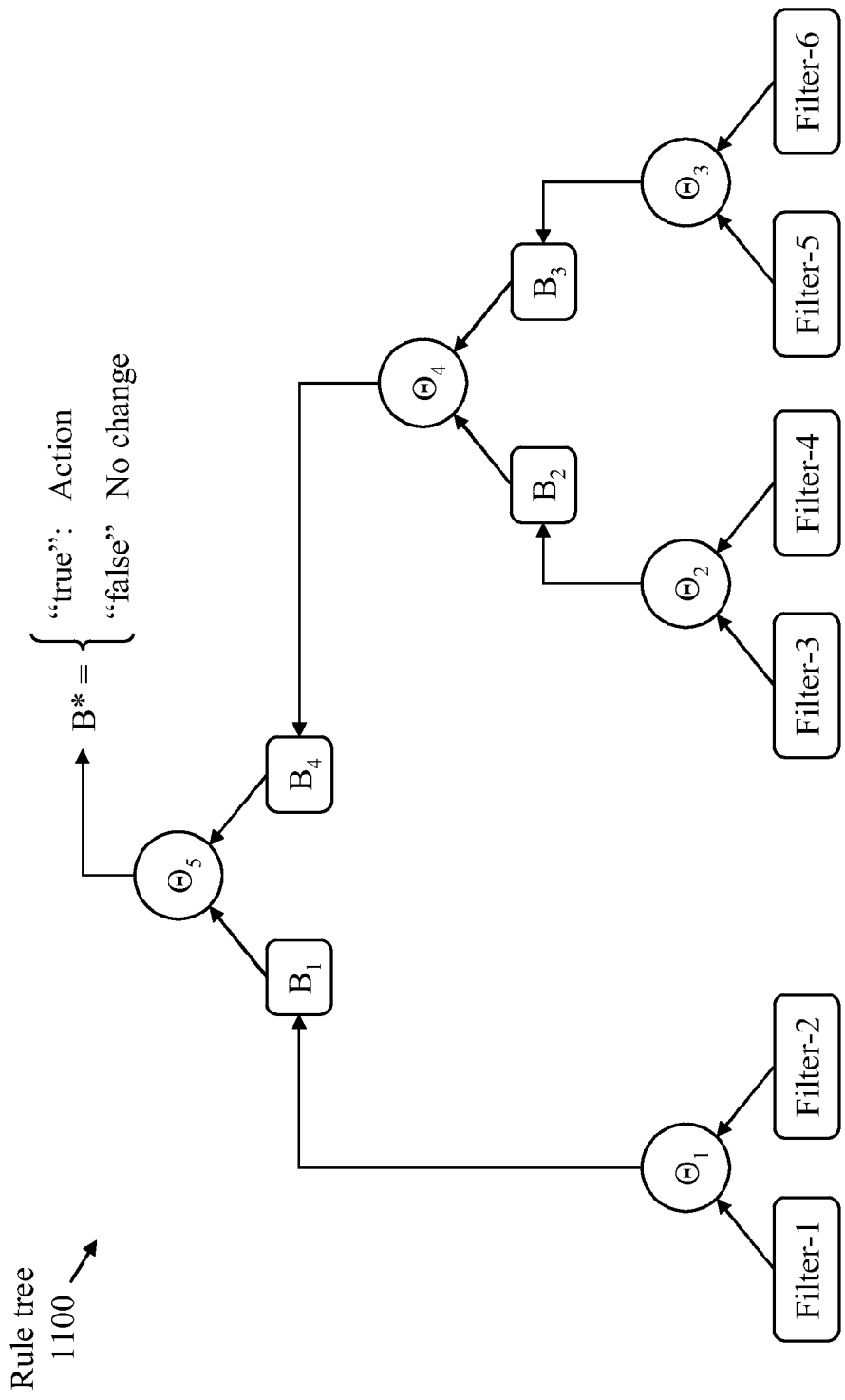
FIG. 11 illustrates a first exemplary rule-tree structure for encoding a filtering rule, in accordance with an embodiment of the present invention.

An alternative method of encoding and evaluation Boolean expressions, according to an embodiment of the present invention, relies on a graphical tree representation of a Boolean expression. An exemplary rule tree 1100 is illustrated in FIG. 11, which depicts a Boolean expression of six operands (six filters) identified as Filter-1 to Filter-6 each being a leaf of the tree. Three operators, denoted $\Theta_1$, $\Theta_2$, and $\Theta_3$, define three operations {Filter-1, $\Theta_1$, Filter-2}, {Filter-3, $\Theta_2$, Filter-4}, and {Filter-5, $\Theta_3$, Filter-6}. An immediate successor of each operator is defined. For example, the successors of $\Theta_1$, $\Theta_2$, and $\Theta_3$, are operators $\Theta_5$, $\Theta_4$, and $\Theta_4$, respectively, and the successors of operators $\Theta_4$ and $\Theta_5$ are $\Theta_5$ and "NULL", respectively. An operator having a "NULL" successor produces a result of the Boolean expression.

Operator $\Theta_1$ produces a binary output B1, which is an operand of operator $\Theta_5$. Operator $\Theta_2$ produces a binary output B2 which is an operand of $\Theta_4$. Operator $\Theta_3$ produces a binary output B3 which is another operand of operator $\Theta_4$. Operator $\Theta_4$ produces a binary output B4 which is another operand of operator $\Theta_5$. Operator $\Theta_5$, produces binary output B*, which is the result of the Boolean expression represented by the tree.

Figure 12:
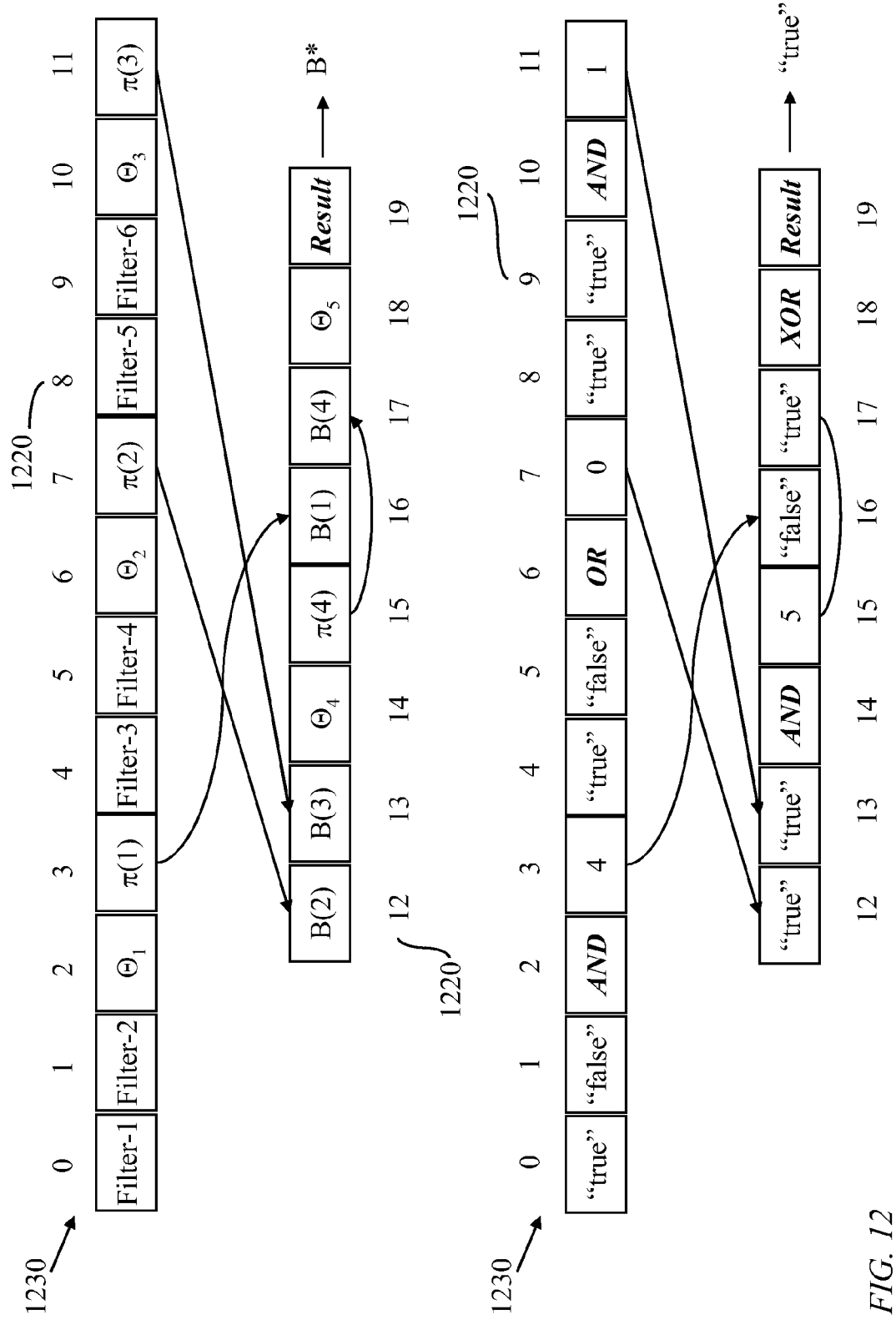
FIG. 12 illustrates a first data structure for encoding the rule-tree structure of FIG. 11.

FIG. 12 illustrates a template array 1230 for representing the rule tree 1100 of FIG. 11. An index 1220 of the template array 1230 varies from 0 to 19 as indicated in FIG. 12. The template array 1230 is divided into a number of records equal to the total number of operators (five in the exemplary tree of FIG. 11), each record corresponding to an operator and representing a simple operation having two operands. The binary values of filters are known after a container under consideration is processed. Thus, record includes indices of respective filters, an operator definition, and a pointer to another record corresponding to an immediately succeeding operator. A "NULL" pointer indicates that a current record is the last record to be processed. A user may enter the records in any order, and a module (not illustrated) within the user interface 520 of FIG. 5 reorganizes the records so that the records may be processed sequentially, and when any record is processed, the values of the respective operands would have been already determined.

As illustrated in FIG. 12, the first three records correspond to operators $\Theta_1$, $\Theta_2$, and $\Theta_3$ applicable to the six filters forming the leaves of the tree. Pointer $\pi(1)$ of the first record points to index 16 of the array which holds the binary result B(1) of operator $\Theta_1$. Pointer $\pi(2)$ of the second record points to index 12 of the array which holds the binary result B(2) of operator $\Theta_2$. Pointer $\pi(3)$ of the third record points to index 13 of the array which holds the binary result B(3) of operator $\Theta_3$. Thus, when the fourth record is reached, the two operands B(2) and B(3) would have already been computed. The binary result B(4) of operator $\Theta_4$ is written in location $\pi(4)=17$. Thus, when the fifth record is reached, the respective two operands B(1) and B(4) would be already known. The binary output of operator $\Theta_4$ is the result of the Boolean expression because operand $\Theta_4$ has no successor (i.e., a null successor).

An exemplary activation of the template array 1230 is also illustrated in FIG. 12. The values of Filter-1 to Filter-6, determined according to the process of FIG. 6 are "true", "false", "true", "false", "true", and "true", respectively. The Boolean operators $\Theta_1$ to $\Theta_5$ are specified by a user as "AND", "OR", "AND", "AND", and "XOR", respectively. Operator "XOR" produces a binary output "true" which is the result of the Boolean expression since operator $\Theta_4$ ("XOR"), has a null successor.

Figure 13:
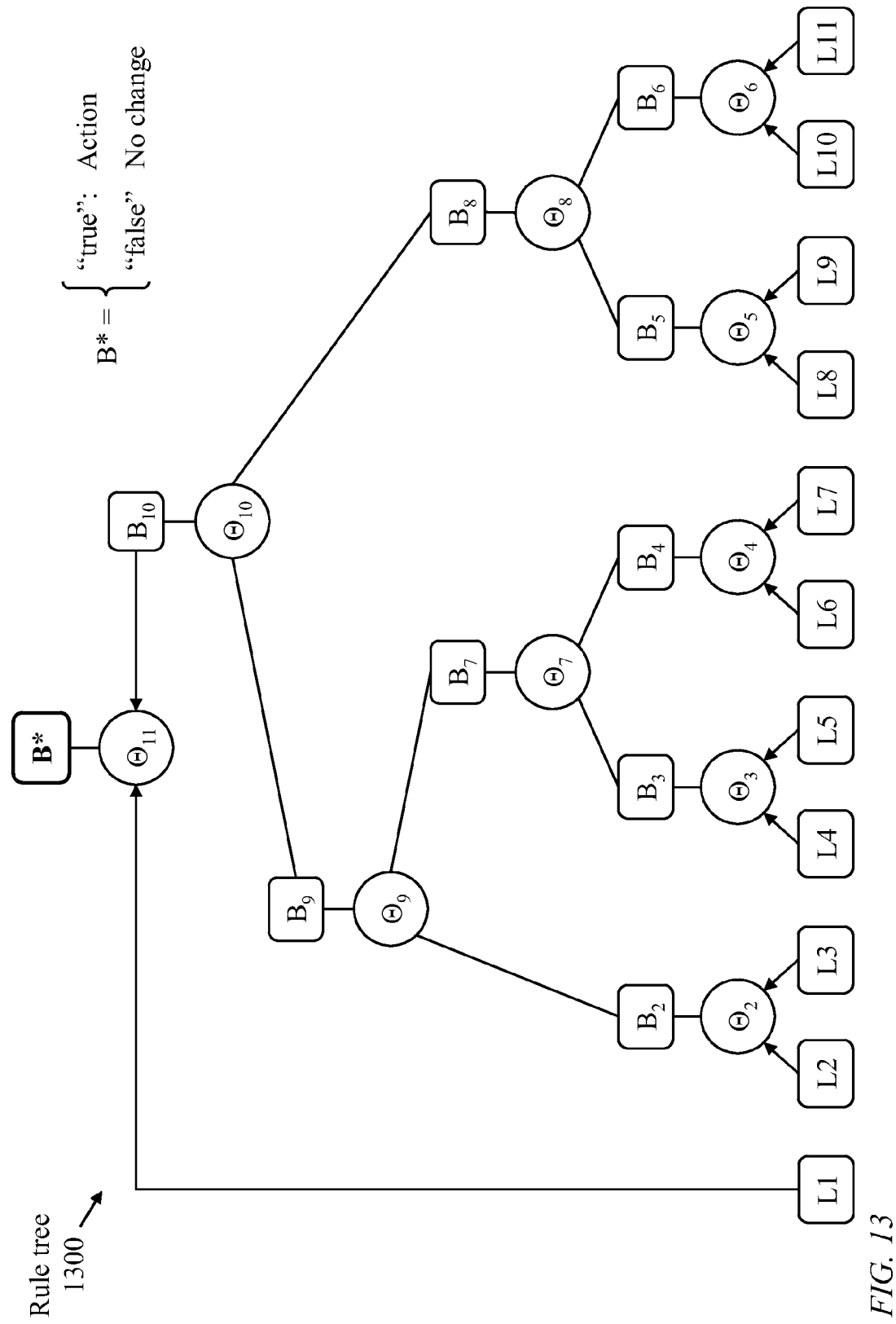
FIG. 13 illustrates a second exemplary rule-tree structure for encoding a filtering rule, in accordance with an embodiment of the present invention.
Figure 14:
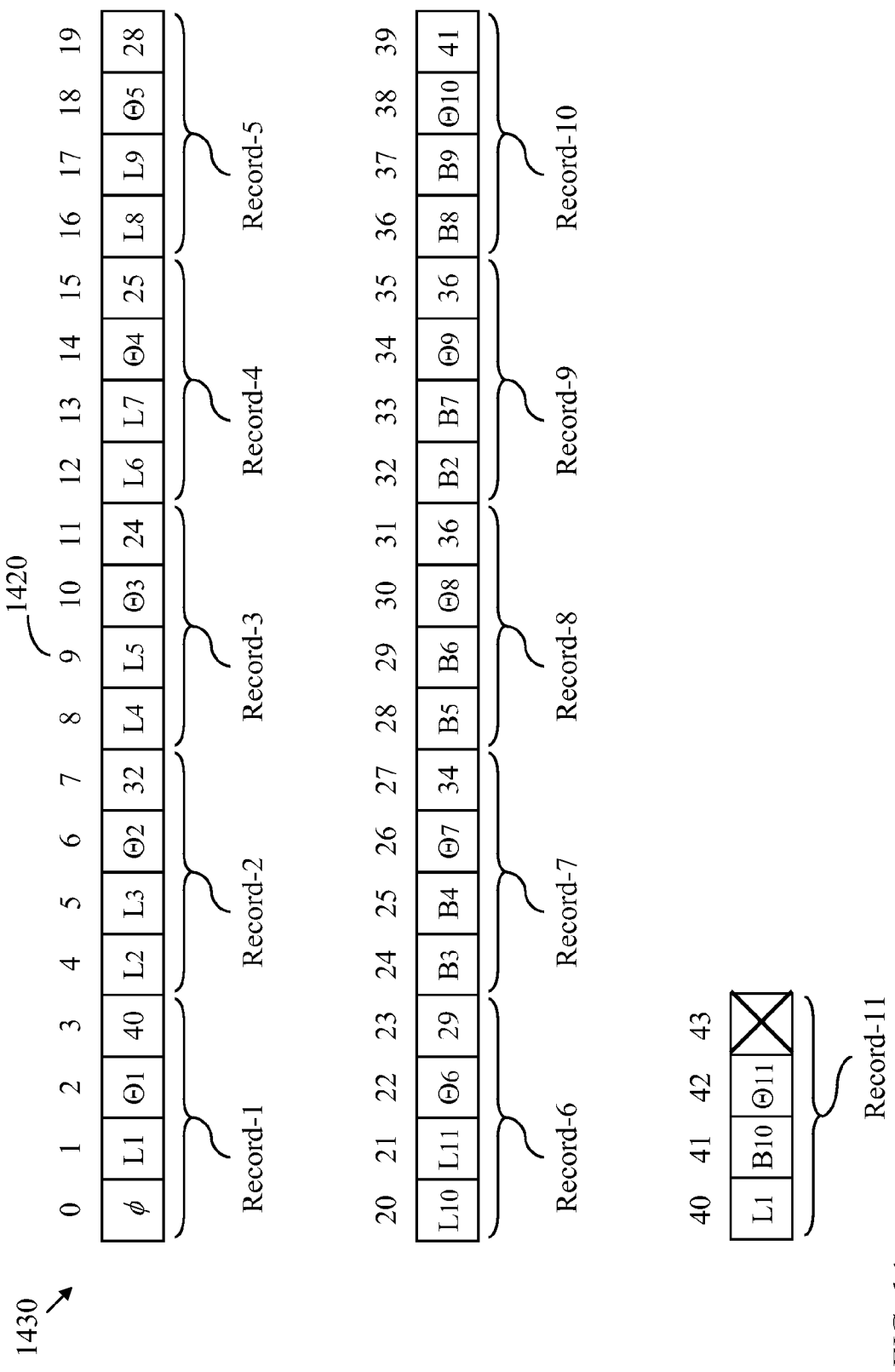
FIG. 14 illustrates the first data structure of FIG. 12 applied to the second exemplary rule-tree of FIG. 13.

FIG. 13 illustrates a second exemplary rule tree 1300 corresponding to a Boolean expression of eleven leaves (filters) denoted L1 to L11, and FIG. 14 illustrates a template array 1430, similar to the template array 1230 of FIG. 12, applied to the rule tree of FIG. 13 with an index 1420 ranging from 0 to 43. The rule tree 1300 comprises ten operators denoted $\Theta_2$ to $\Theta_{11}$. The first leaf, L1, is an operand of operator $\Theta_{11}$, which has no successor. For uniformity, a first record (denoted as Record 1 in FIG. 14) of template array 1430 of FIG. 14 representing the rule tree 1300 is conceptually viewed to include operand L1 together with a "don't care" operand $\phi$ and a permissive non-existent operator $\Theta_1$, which conveys the value of L1 as an operand of successor operator $\Theta_{11}$. As known in the art, a "don't care" value assigned to the operand $\phi$, may be conveniently either a "true" state or a "false" state. The remaining ten records, Record-2 to Record-11 of template array 1430, correspond to operators $\Theta_2$ to $\Theta_{11}$. Each entry L1, L2, to L11, in template array 1430 of FIG. 14 is an index (pointer) to a filter. As described above, with reference to FIG. 12, an input organizing module 522 associated with user interface 520 of FIG. 5 arranges the records so that the records can be processed sequentially with each record having already determined operands.

Figure 15:
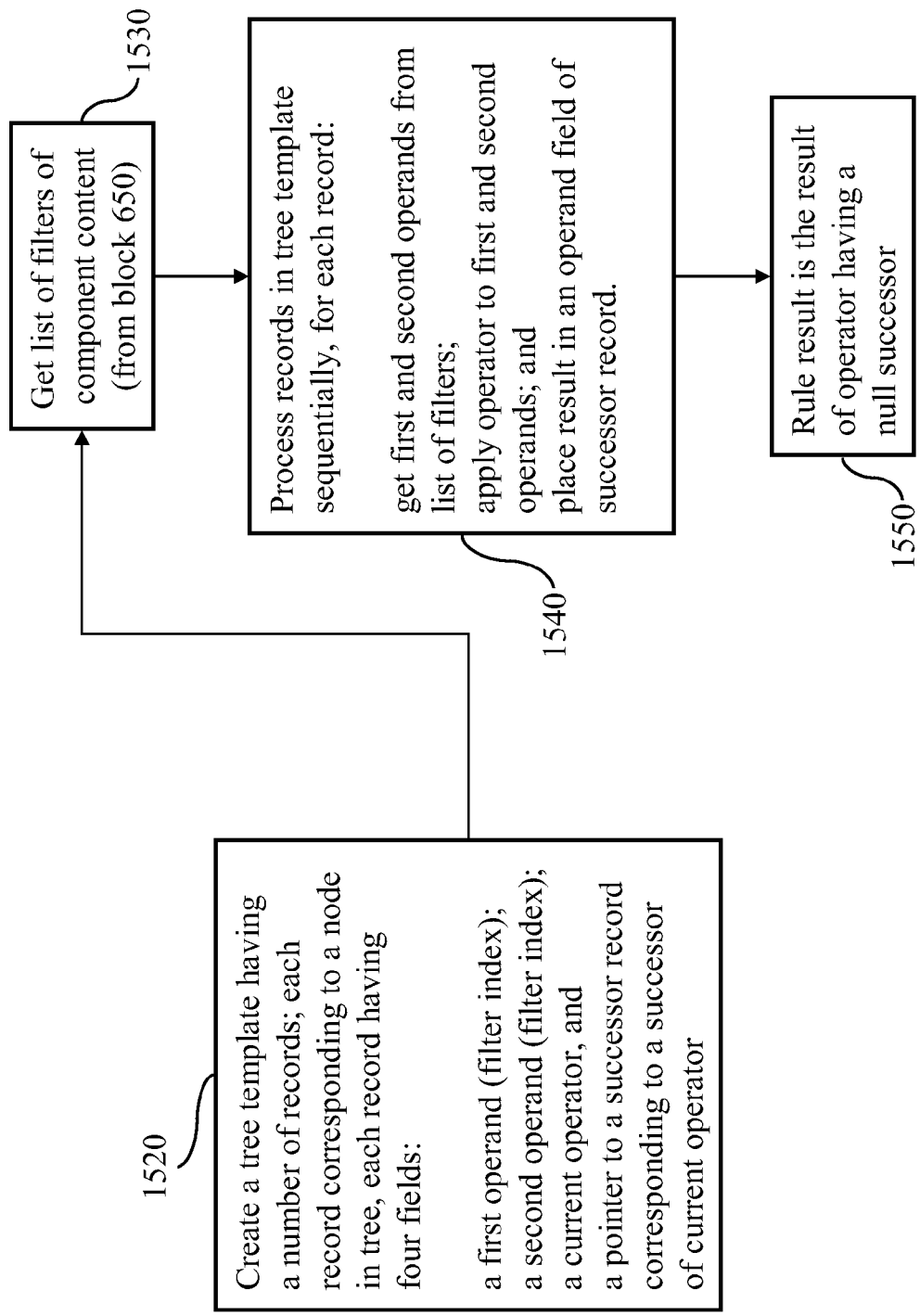
FIG. 15 illustrates a process of applying the first data structure exemplified in FIG. 12 and FIG. 14, in accordance with an embodiment of the present invention.

FIG. 15 summarizes the tree encoding method using the template array 1230 (FIG. 12) or 1430 (FIG. 14). In step 1520, a template having a number of records, each corresponding to a node in the tree is created. Each record comprises four fields containing indices of two filters, a current operator, and a pointer to a successor record corresponding to a successor of the current operator. In step 1530, a list of filters determined according to the process of FIG. 6 is prepared for a container under consideration. In step 1540, the records of the tree template are processed sequentially. The operands of each record are acquired by indexing the list of filters. A respective operator is applied to the operands and the binary result is placed in an operand field of a successor record. In step 1550, the result of the operator of the last record is presented as the result of the Boolean expression represented by the tree.

Figure 16:
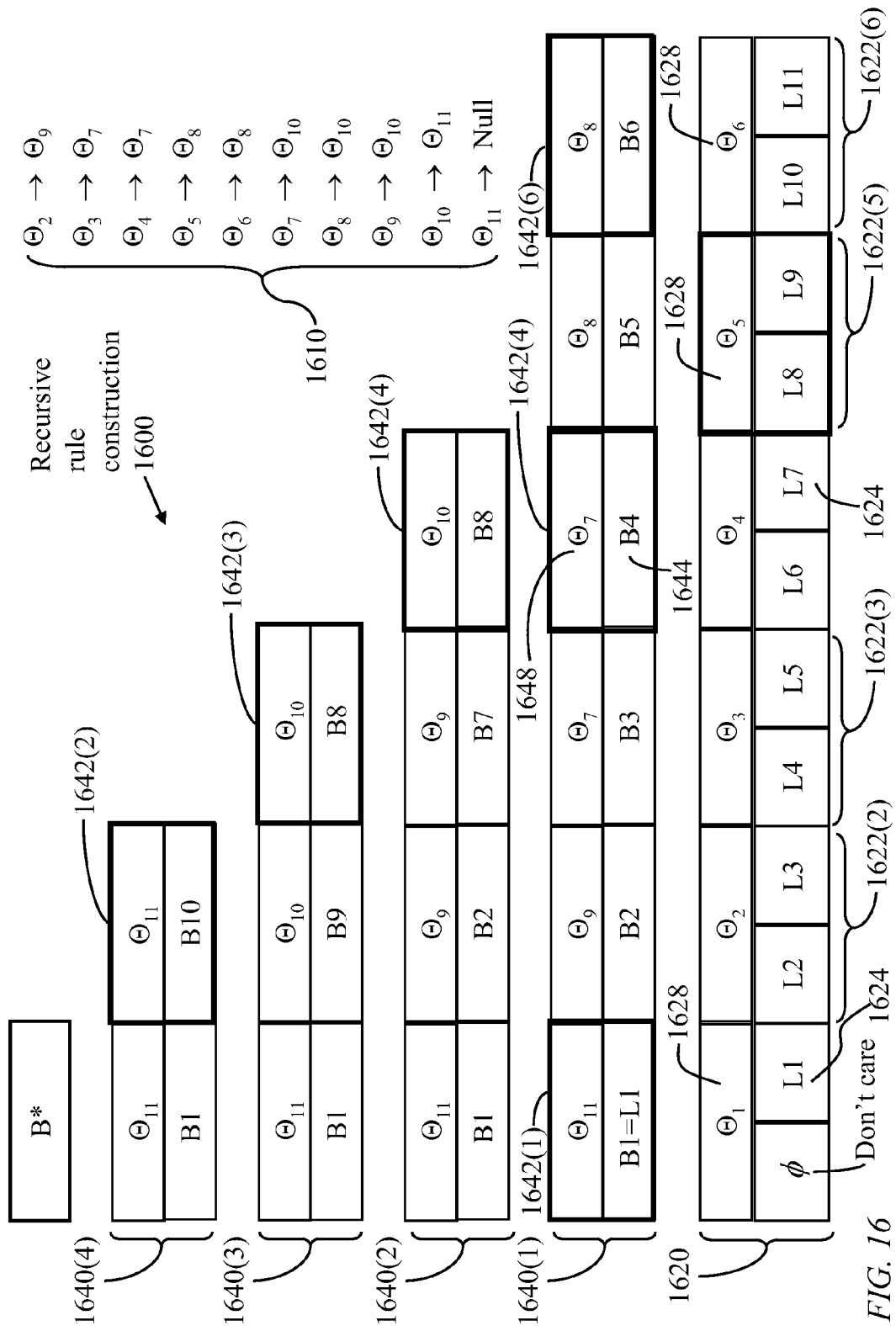
FIG. 16 illustrates a second data structure for encoding a rule tree, in accordance with an embodiment of the present invention.

FIG. 16 illustrates an alternative method of representing a rule tree structure according to an embodiment of the present invention. A set of filters (conditions) relevant to a rule is defined based on content descriptors, descriptor criteria and filter operators as described earlier. Definitions of the set of filters are stored in a filter-definition array. A set of Boolean operators, denoted $\Theta_1, \Theta_2, \Theta_3, \Theta_4, \Theta_5, \Theta_6, \Theta_7, \Theta_8, \Theta_9, \Theta_{10}$, and $\Theta_{11}$, is defined with one operator, $\Theta_{11}$, designated a null successor and each other operator designated a successor from the set of Boolean operators. The filters form leaves of a tree and are divided into subsets of filters where the filters of a subset form operands of a Boolean operator from among the set of Boolean operators. Notably, if each subset of filters includes two filters, then the total number of Boolean operators equals the total number of filters minus 1.

Considering a set of M filters, M>1, a template of a leaf vector 1620 comprising N leaf records 1622 is formed; 1<N<M. Each leaf record 1622 includes a leaf operator 1628 from among the set of Boolean operators and a respective subset of the filters. At the installation stage, each leaf record 1622 includes an operator and indices of the operands (filters) in the filter definition array. The values of the filters of each leaf record 1622 are determined for individual container components.

A node vector 1640 having a number of node records 1642 equal to the number N of leaf records is formed. Each node record 1642 has a node-operator field 1648 and a node-state field 1644. At the installation stage, the node records 1642 are empty, containing no data. The Boolean operators 1648 and the node states 1644 of the node records 1642 are initially determined during processing of the leaf records. The N node records 1642 may be arranged in any order. However, it is convenient to let the node records 1642 initially have a one-to-one correspondence to the leaf records 1622. Thus, the Boolean operator of node record 1642(j) is a successor the Boolean operator of leaf record 1622(j), 1≤j≤N.

Upon determining the values of the filters, each leaf operator 1628 is applied to respective filters (respective binary conditions) and a result is placed in a node-state field 1644 of a node record 1642. A successor of each leaf operator 1628 is placed in node-operator field 1648 of the node record.

After processing all leaf records 1622 (1622(1) to 1622(6) in the example of FIG. 16), the node records 1642 (1642(1) to 1642(6) in the example of FIG. 16) are processed. Specific node records, herein called "connected node records", having a common operator are then identified. The common operator is then applied to the node states of all the connected node records to produce a new state. The operator field of a selected node record, from the connected node records, is replaced by a successor of the common operator and the node-state field of the selected node record is replaced by the new state just determined. The remaining connected node records are deleted from the node vector. Thus, with the replacement of each set of connected node record with a combined node record, the number of node records in the node vector is reduced. The process of identifying connected node records continues recursively until the node vector contains only one node record. The result of applying the Boolean operator in the operator field of the remaining one node record is the sought result of evaluating the Boolean expression. The Boolean operator of the last node record has a null successor.

FIG. 16 illustrates a recursive rule construction 1600 for encoding a rule tree for the exemplary tree of FIG. 13, which represents a Boolean expression of eleven filters forming the leaves of the tree. The leaves (filters) are denoted L1 to L11. In the tree of FIG. 13, leaf L1 is not associated with any other leaf. For uniformity, leaf L1 is artificially associated with a leaf, φ, with which it shares a passive operator $\Theta_1$. The inserted leaf φ is assigned a "don't care" value. As well known in the art, a "don't care" value may be conveniently assigned either a "true" state or a "false" state.

A set of Boolean operators $\Theta_2$ to $\Theta_{11}$ is defined by a user. Operators $\Theta_2$ to $\Theta_6$ are associated with leaf records 1622(2) to 1622(6) while operators $\Theta_7$ to $\Theta_{11}$ are associated with node records 1642(2) to 1642(6). Operator $\Theta_{11}$ has a null successor and each other operator $\Theta_2$ to $\Theta_{10}$ has a successor from the set of operators $\Theta_7$ to $\Theta_{11}$ as illustrated in list 1610 of FIG. 16.

The leaf vector 1620 comprises six leaf records 1622, individually identified as 1622(1) to 1622(6), assigned operators $\Theta_1$ to $\Theta_6$ placed in the operator fields 1628 with indices of corresponding operands placed in operand fields 1624. The operands in the operand fields of the six leaf records are {φ, L1}, {L2, L3}, {L4, L5}, {L6, L7}, {L8, L9}, and {L10, L11}.

When the binary values of the filters are determined (FIG. 5 and FIG. 6), the leaf records 1622 are processed. Starting with leaf record 1622(1), the artificial passive operator $\Theta_1$ simply passes the value of L1 to the node-state field of node record 1642(1). Operator $\Theta_{11}$, which is the successor of $\Theta_1$, is placed in the operator field of node record 1642(1). The second leaf record 1622(2) is then processed where operator $\Theta_2$ is applied to leaves L2 and L3 (filters L2 and L3) to produce a binary value B2 to be placed in the node-state field of node record 1642(2). The successor of operator $\Theta_2$, which is operator $\Theta_9$, is placed in the operator field of node record 1642(2). The process continues until all the node records 1642(1) to 1642(6) are determined.

The process continues recursively using only the node vector 1640; the leaf vector 1620 is no longer needed. The operator $\Theta_{11}$ in node record 1642(1) is not paired in the node vector 1640(1). Thus, node record 1642(1) remains unchanged. Likewise, node record 1642(2) remains unchanged because none of the node records 1642 includes an operator $\Theta_9$. Node records 1642(3) and 1642(4) have a common operator $\Theta_7$, which is applied to operands B3 and B4 to produce a binary result B7 to be placed in the node-state field of node record 1642(3), replacing B3. The successor operator of operator $\Theta_7$, which is $\Theta_9$, is placed in the operator field of node record 1642(3), replacing $\Theta_7$. Node record 1642(4), which is now consumed in the new combined record 1642(3), is deleted. Likewise, node records 1642(5) and 1642(6) are combined in a new node record having the successor operator $\Theta_{10}$ of operator $\Theta_8$ and a node state B8 determined by applying the common operator $\Theta_8$ to operands B5 and B6. The node vector now shrinks to four node records and is identified by the reference numeral 1640(2). Node vector 1640(2) simply over-writes node vector 1640(1).

The process continues recursively with node records 1642(2) and 1642(3) combined to produce new combined node record 1642(2) while node records 1642(1) and 1642(4)

remain unchanged; the two unchanged node records are now node records 1642(1) and 1642(3) in the reduced node vector 1640(3).

Node records 1642(2) and 1642(3) have a common operator $\Theta_{10}$. Operator $\Theta_{10}$ is applied to operands B9 and B8 to produce a new state B10 which is placed in the node-state field of node record 1642(2). The successor operator $\Theta_{11}$ of operator $\Theta_{10}$ is placed in the node operator field of node record 1642(2). The common operator $\Theta_{11}$ of node records 1642(1) and 1642(2) is applied to operands B1 and B10 to produce the output B* of the Boolean expression.

Figure 17:
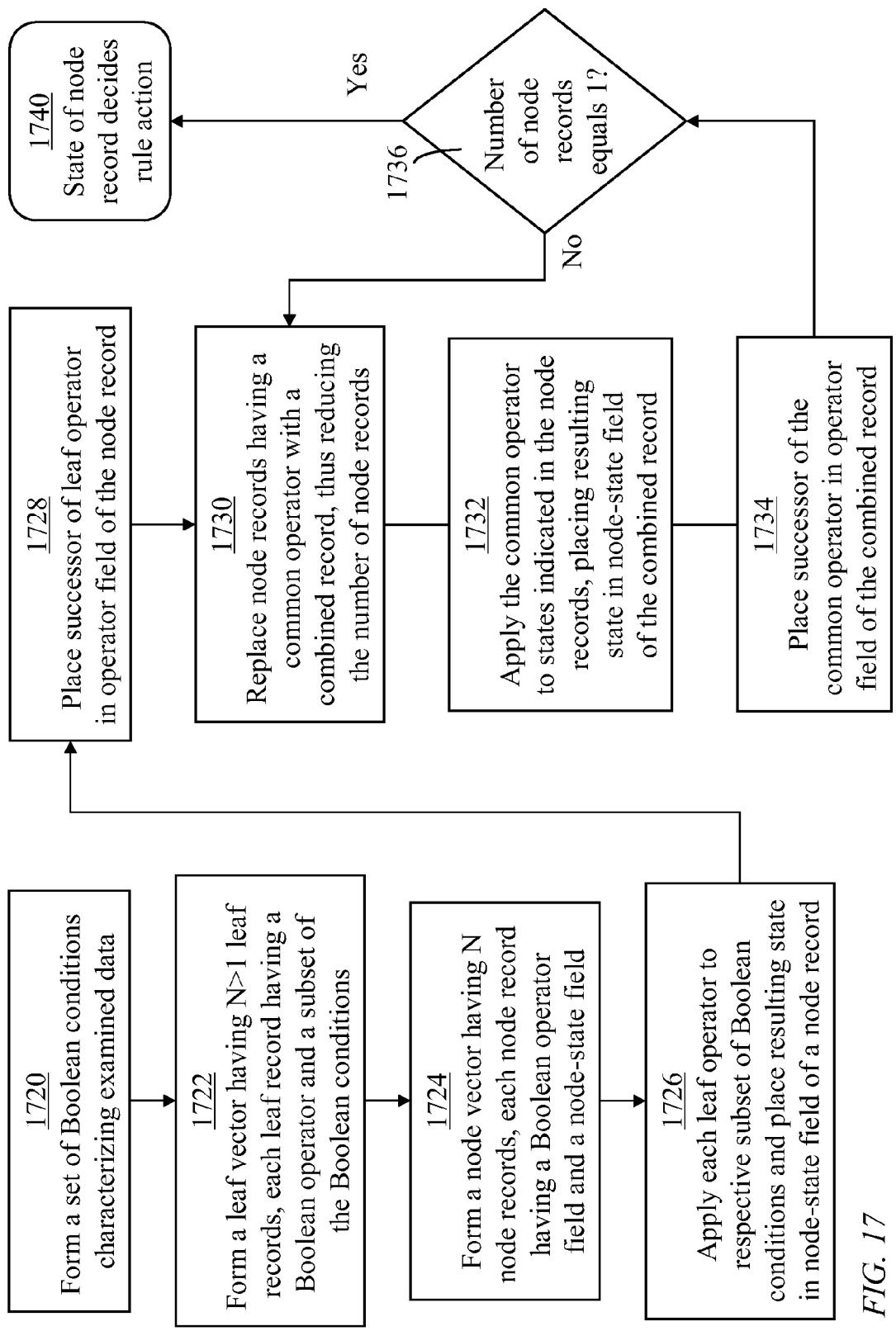
FIG. 17 illustrates a process of applying the second data structure exemplified in FIG. 16, in accordance with an embodiment of the present invention.

FIG. 17 illustrates the process of determining the output of a rule tree using the leaf-vector 1620 and node-vector 1640 of FIG. 16. In step 1720, the set of Boolean conditions (Boolean filters L2 to L11) characterizing the data content under consideration are determined. In step 1722 leaf vector 1620 having N>1 leaf records 1622 is formed. Each leaf record 1622 includes a Boolean-operator field 1628 and fields for a subset of Boolean conditions (a subset of filters L2 to L11). In step 1724 a node vector 1640 of N node records 1642 is formed. Each node record 1642 includes a Boolean operator field 1648 and a node-state field 1644. In step 1726, each leaf operator is applied to a respective subset of Boolean conditions (Boolean filters) which are determined from characteristics of content data as described above with reference to FIG. 5 and FIG. 6. The binary result is placed in a node-state field of a selected node record 1642. In step 1728, a successor of each leaf operator is placed in the operator field of the selected node record. In step 1730, node records having a common operator are replaced with a combined record, thus reducing the number of node records 1642 of the node vector 1640. In step 1732, the common operator is applied to the node states of the replaced node records and the binary result is placed in operator field of the combined record. In step 1734, a successor of the common operator, determined from list 1610 of FIG. 16, is placed in the operator field of the combined node record. In step 1736, if the number of remaining node records is larger than 1, step 1730 is revisited to continue the process of combining node records of a common operator. If the number of remaining records is 1, the operator of the remaining node record is applied to the node-states of the node record, and the result determines whether an editing action need be performed (step 1740).

Figure 18:
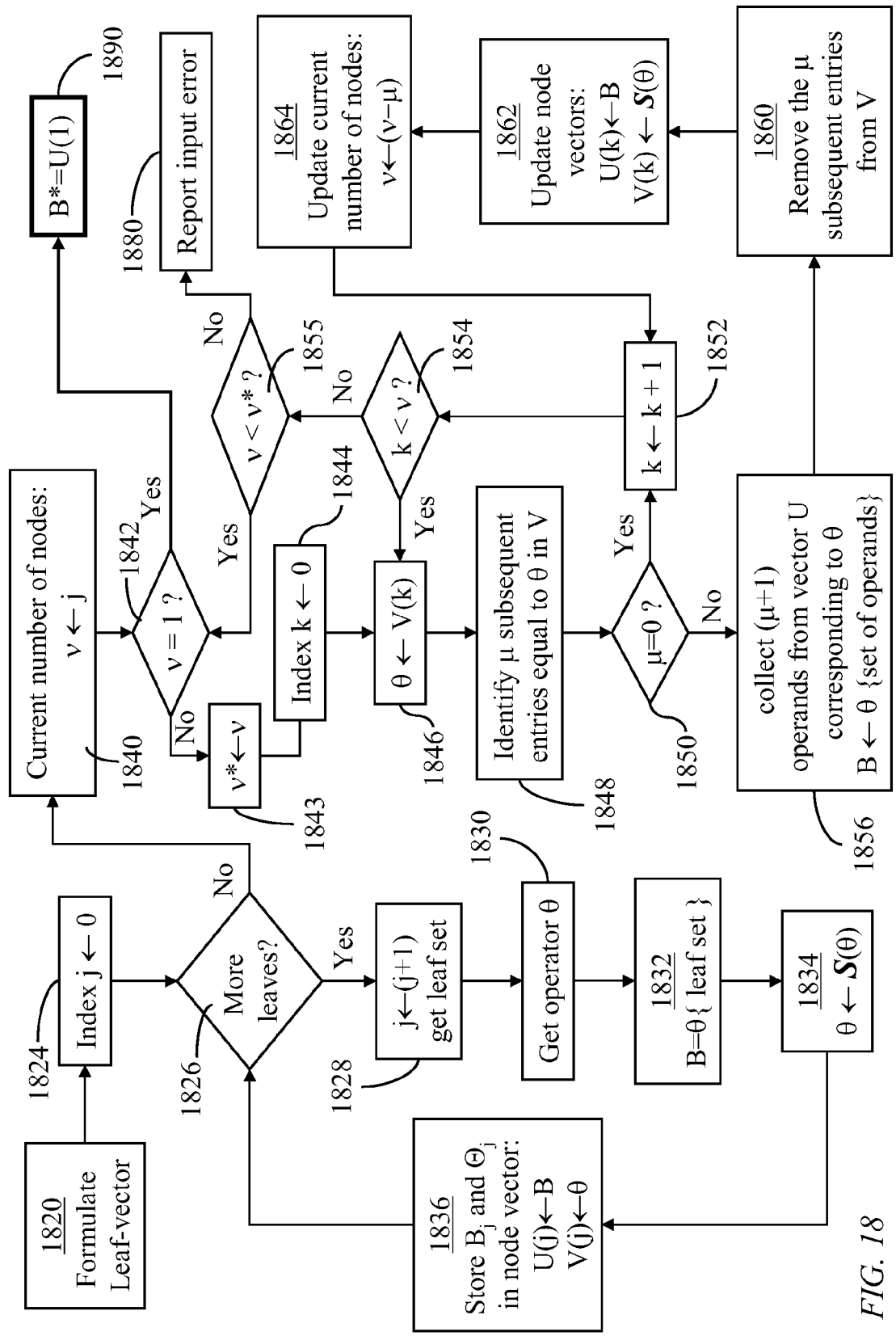
FIG. 18 illustrates a process of using a rule tree to determine a rule result, in accordance with an embodiment of the present invention.

FIG. 18 is a flow chart detailing the process of FIG. 17. In step 1820, to be detailed in FIG. 19, a leaf-vector 1620 is formulated. The leaf records 1622 (1) to 1622(N) are considered sequentially. In step 1824, and index j is set to equal 0. If step 1826 determines that more leaf records are to be processed, step 1828 increases index j by 1 and acquires a leaf set (a filter set) corresponding to leaf indices of a current leaf record and step 1830 acquires the operator $\theta$ (one of the operators $\Theta_1$ to $\Theta_6$) of the current leaf record. Step 1832 applies the operator to the acquired leaf set, resulting in a binary output B. In step 1834, successor $S(\theta)$ is determined from list 1610 of FIG. 16.

The node-state fields and the operator fields of node vector 1640 are herein denoted U(j), V(j), $1 \leq j \leq N$, i.e., U(j) and V(j) define node record 1642(j), $1 \leq j \leq N$. In step 1836, the value of B is placed in node-state field U(j) of node-vector 1640 and the value of $S(\theta)$ is placed in operator field V(j) of node vector 1640. When all leaf records 1622(1) to 1622(N) are processed, the index j equals the number of leaf records N and each node record 1642 of node vector 1640 has a respective node operator and a node state. In step 1840, the current number v of node records 1642 of node vector 1640 is set to equal j (which equals N). In step 1842, if the current number of node records v is larger than 1, the node vector is scanned to collect all node records 1642 having the same operator and combine such records. Before scanning, a current number v*=v of node records is noted (step 1843) to enable detecting a change in the number of node records. An index k is set to equal zero in step 1844, and step 1846 records operator $\theta$=V(k) of node record 1642(k). Step 1848 examines subsequent node records of the node vector 1640 to identify a number, of subsequent node records having the same operator 8. If the number μ of identified subsequent node records is zero (step 1850), the index k is increased by 1 in step 1852 and if the index k is less than the current number v of node records, step 1846 is revisited. Otherwise, step 1856 collects the (μ+1) operands of the node records of the same operator 8 and applies the operators $\theta$ to the (μ+1) operands to determine a new state B of a combined node record. In step 1860, the subsequent μ identified node records are deleted and step 1862 inserts the new state B in the node-state field U(k) of node record 1642(k) and a successor operator $S(\theta)$ in the operator field V(k) of node record 1642(k). The number of remaining node records is determined as (v−μ) in step 1864. Steps 1852 and 1854 are applied after step 1864 to determine if the node vector 1640 contains further node records of a common operator. If step 1854 determines that k is less than v, scanning the node vector continues from step 1846. Otherwise, if step 1854 determines that k=v (k cannot exceed v), step 1855 ensures that the current value of v (last updated in step 1864) is less than the previous value v*. Otherwise, an error is reported in step 1880. Notably, the requirement v<v* of step 1855 is not met if the user-provided representation of the Boolean expression is incorrect. If v<v*, step 1855 is followed by step 1842. If step 1842 determines that the number of remaining node records is 1, the operator of the remaining node record is applied to respective operands to determine a state B* (step 1890), which determines a respective editing action.

Figure 19:
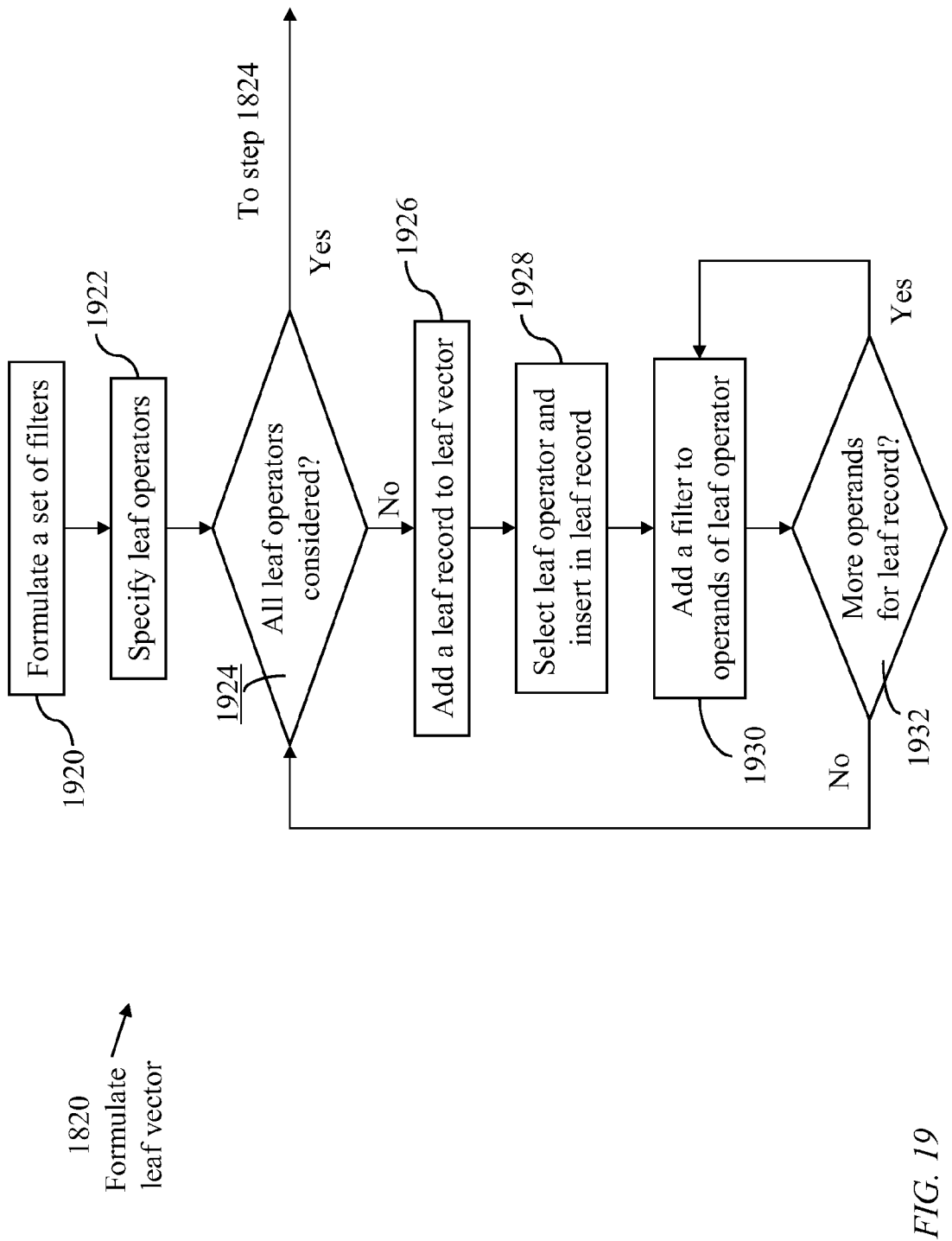
FIG. 19 details a step of forming a leaf vector associated with the process of FIG. 18, in accordance with an embodiment of the present invention.

FIG. 19 details the step 1820 of FIG. 18 of formulating leaf vector 1620 of FIG. 16. In step 1920, a set of filters (conditions) is formulated and in step 1922 the leaf operators are determined based on user input as described with reference to FIG. 5 and FIG. 6. The leaf operators are applied sequentially to generate corresponding leaf records 1622. If step 1924 determines that at least one operator is not yet applied, step 1926 adds a new leaf record 1622 to the leaf vector. Step 1928 selects one of the remaining operators, and step 1930 adds a filter associated to an operand field 1624 of the leaf record. Step 1930 is repeated until step 1932 determines that all filters belonging to the selected operator have been included in the current leaf record 1622. When the current leaf record 1622 is completed, as determined in step 1932, step 1924 is revisited. When step 1924 determines that all leaf operators have been considered, the completed leaf vector 1620 is presented to step 1824 of FIG. 18.

Figure 20:
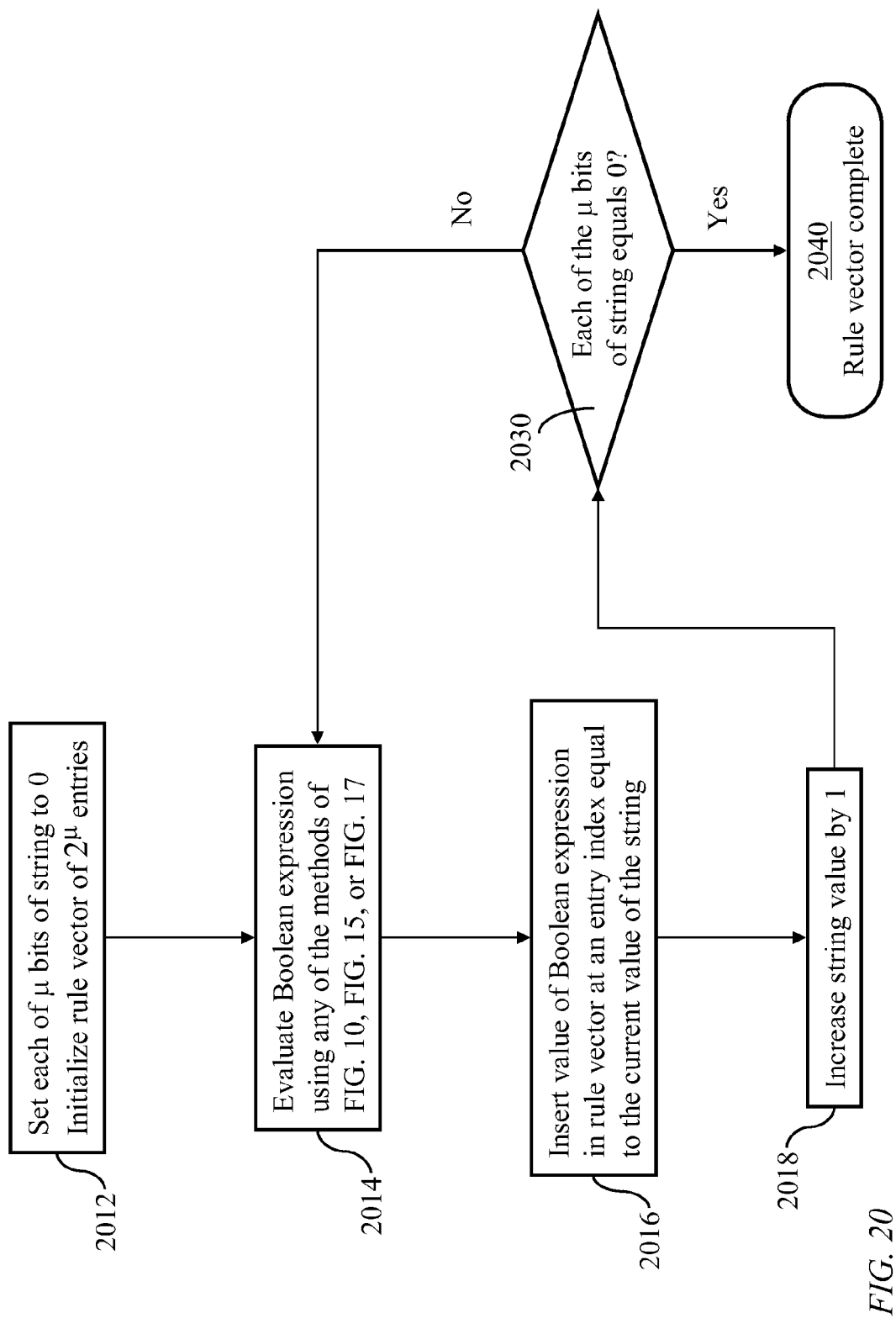
FIG. 20 illustrates a method of preprocessing Boolean expression for fast run-time rule execution, in accordance with an embodiment of the present invention.

FIG. 20 illustrates a method of pre-computing a binary value of a Boolean expression of a rule for each value of a set of filters. The set of filters is represented by a bit string having a number of bits bearing a one-to-one correspondence to the filters, so that each bit in the string corresponds to one filter. With μ>1 filters, the string contains μ bits and assume values ranging from 0 to $2^\mu-1$. In step 2012, a starting string value of 0 (μ bits all set to zero) is set, and each entry of a rule vector having $2^\mu$ entries is initialized to "0". In step 2014, the Boolean expression is evaluated using one of the methods described with reference to FIG. 10, 15, or 17. In step 2016, the binary result ("true", "false") is stored in a rule vector at a position corresponding to a current value of the string (0 to $2^\mu-1$). In step 2018, the string value is increased by adding 1. When step 2030 determines that each of the μ bits of the string has a value of 0, the generation of the rule vector is complete (step 2040). Notably, a string with each of the bits having a value of "1" corresponds to the $(2^\mu-1)^{th}$ entry of the rule vector and adding 1 in step 2018 resets the string to $\mu$ zeros. Alternatively, the string may have ($\mu$+1) bits with the most-significant bit used to indicate completion of the rule-vector generation. The rule vector may then be used to directly determine a binary value of a Boolean expression at run time, thus increasing the throughput of the content-filtering system.

In summary, the method of filtering contents of data containers then comprises the following steps:

(1) A set of filters (binary conditions) is defined where each filter is a function of a selected descriptor of the content and a respective criterion of the descriptor.

(2) A set of rules, each rule specifying a Boolean expression and a corresponding content-filtering action, is defined.

(3) The Boolean expressions are considered one at a time.

(4) Consider a Boolean expression of $\mu$ of filters (binary conditions). The filters are represented as a string of $\mu$ bits, $\mu$>1.

(5) Evaluate the Boolean expression for each of $2^\mu$ values of the string to produce a rule vector of $2^\mu$ entries, each entry being a state of a content metric corresponding to one of the $2^\mu$ values of the string.

(6) Repeat step (5) for all Boolean expressions.

(7) Receive and parse a data container.

(8) Select a rule and determine values of the specified $\mu$ filters of the selected rule according to content of the data container.

(9) Index a rule vector corresponding to the selected rule and determine a value of the entry in the rule vector corresponding to an index determined by the string of bits.

(10) Execute a content-filtering action according to a value of the entry.

(11) Repeat steps (8) to (10) if a new rule need be applied to the received container.

Figure 21:
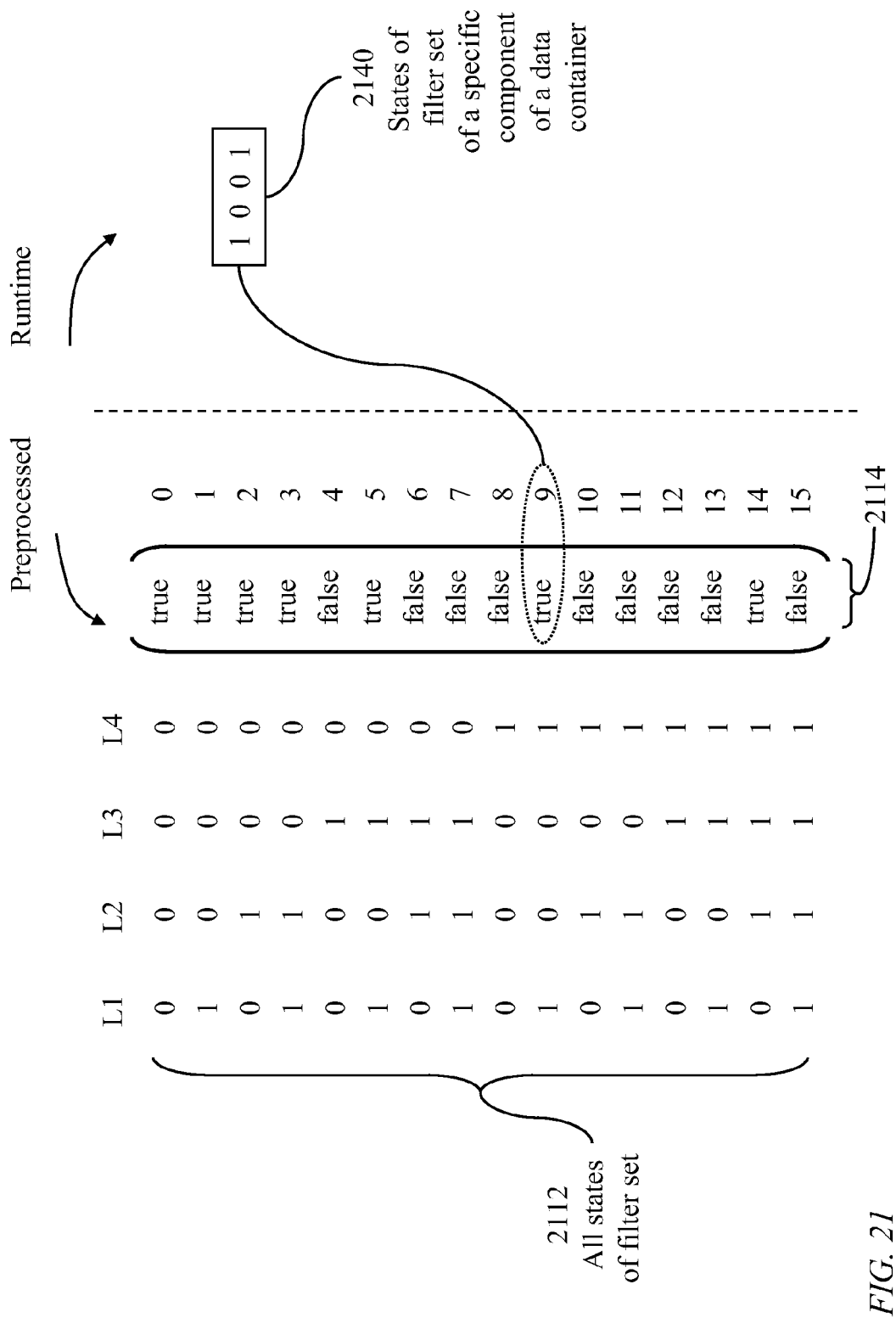
FIG. 21 illustrates an exemplary implementation of the method of FIG. 20.

FIG. 21 illustrates a rule vector for a rule specifying a Boolean expression of a set of four filters ($\mu$=4) denoted L1, L2, L3, and L4. The set of filters is represented by a string of four bits. The Boolean expression is evaluated for each of the 16 values 2112 of the string, ranging from '0000' to '1111' to yield a binary output 2114(j), indicated as "true" or "false", corresponding to string value j, 0≤j<$\mu$ of the string.

Upon receiving a container, the content of a container component is examined to determine a set of four filters for the rule considered in FIG. 21. If, for example, the set of four filters have values of "1", "0", "0", and "1", yielding a string 2140 of "1001", the value of the Boolean expression is read directly from position 9 (binary 1001) of the binary rule vector 2114.

The method of FIG. 20, with the exemplary illustration of FIG. 21, is suitable for rules employing Boolean expressions of a moderate number of operands (filters). For example, with 8 filters, the binary rule vector 2114 would be relatively short, having only 256 bits. If a Boolean expression has more than 16 operands, for example, it may be preferable to evaluate the Boolean expression each time it is needed rather than storing a large binary rule vector. A number of operands, per Boolean expression, exceeding 16 may be unlikely.

Figure 22:
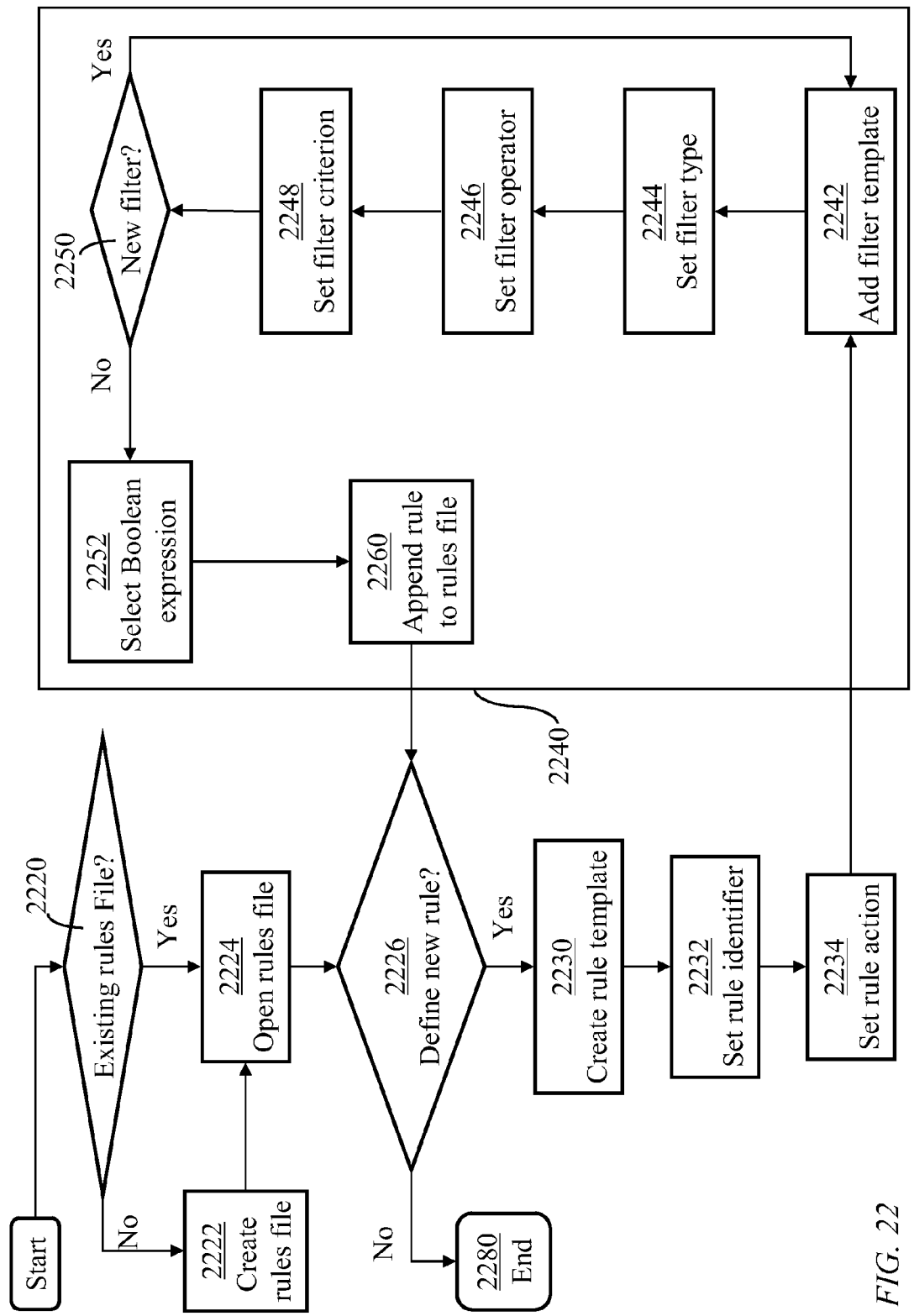
FIG. 22 illustrates a process of data entry relevant to filter definitions and rule definitions, in accordance with an embodiment of the present invention.

FIG. 22 illustrates a process of data entry relevant to filter definitions and rule definitions. The process starts with determining whether a rules file has already been created (step 2220). If a rules file has not yet been created, step 2222 creates a file using conventional methods known in the art. The next step is to add rules to the rules file. Populating or updating the rule file starts in step 2224. Step 2224 opens the rules file and directs the process to step 2226, which prompts a user to indicate whether a new rule is to be encoded and added to the rule file. Populating or updating the rule file is terminated by the user (step 2280). If more rules are to be added, a data-acquisition module (not illustrated) placed in the user interface 520 (FIG. 5) or in the operation, administration, and maintenance module 230 (FIG. 2) creates a rule template (step 2230). The rule template may optionally take one of many forms, which may be decided by the user. The form of a rule template depends on: (1) whether rules specified by the user are to be applied sequentially or according to a hierarchical order; and (2) whether the Boolean expression of a rule is to be entered in an algebraic-analytical format or in a tree-structure format where a node of a tree represents an operator and respective operands. In either case, the data-acquisition module may provide a respective template with instructions to facilitate data entry. For example, the data-acquisition module may guide the user into constructing an algebraic form of a Boolean expression by prompting the user to enter simple operations, each comprising an operator and a set of operands, then progressing towards the desired expression. The validity of the constructed expression may be verified with each addition of a new operator. If the Boolean expression is presented as a tree-structure, the data-acquisition module may display a generic tree structure, which may be pruned and validated as the user enters data relevant to selected nodes of the tree.

In step 2232, a rule identifier, encoded in any suitable format, is provided. In step 2234, a rule action is specified, and step 2240 defines a Boolean expression associated with the rule. The rule action of a specific rule is applied according to a value of the associated Boolean expression. Step 2240 comprises steps 2242, 2244, 2246, 2248, 2250, 2252, and 2260. Step 2242 created a filter template as illustrated in FIG. 3, reference numeral 340. Step 2244 sets a type of the filter, which may be one of many descriptors of a content of a container under consideration. Step 2246 sets the filter's operator, which may be selected from a menu of unary operators, binary operators, arithmetic operators, comparison operators, logical operators, set operators, and user-defined operators. Step 2248 sets the filter's criterion, which is a target value or a threshold relevant to a descriptor selected in step 2244. Step 2250 prompts the user to either define a new filter for the rule or proceed towards defining the Boolean expression to be applied to the set of filters so far specified. To add another filter, steps 2242 to 2248 are revisited until the user determines in step 2250 that all relevant filters are present. Step 2252 prompts the user to enter the Boolean expression according to one of the formats described above. It is noted that a rule may be based on only one filter, as illustrated in FIG. 9, in which case the Boolean expression reduces to a passive operator, which simply uses the value of the single filter to determine whether the rule action specified in step 2234 is to be applied.

Step 2260 appends the rule just constructed to the rule file opened in step 2224. It is noted that the values of the filters of each rule thus constructed are to be determined at "run time" upon processing received containers. The encoded rules includes filters identifiers, which may simply be indices of an array (not illustrated) storing the filters.

The process of FIG. 22 is performed during system installation or update. The rules encoded and stored in the rules file are activated in "real-time".

Figure 23:
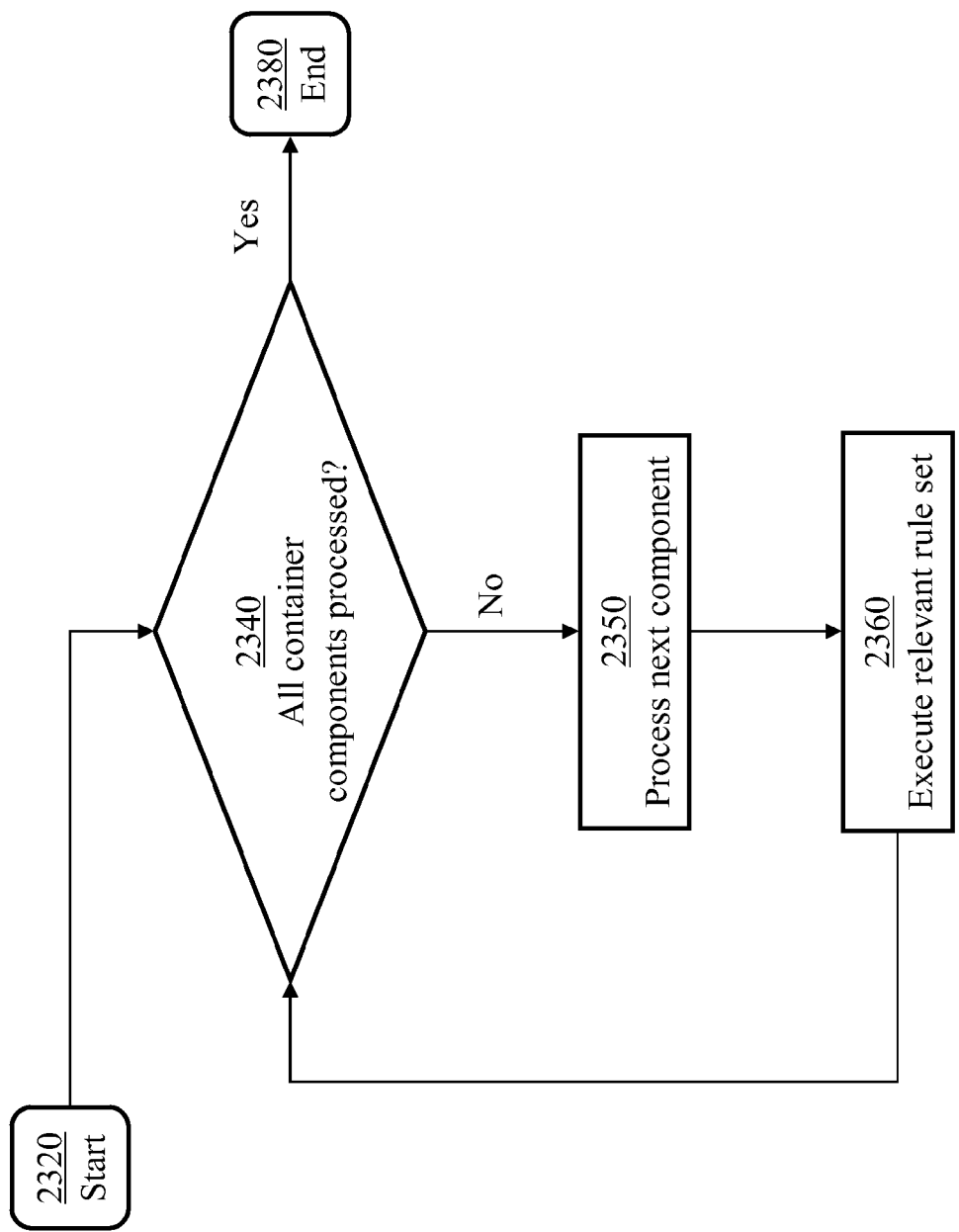
FIG. 23 illustrates a process of sequential filtering of components of a multimedia container.

FIG. 23 illustrates a process of sequential filtering of components of a received multimedia container having a number of components. The order of processing of the components of the container for content filtering is arbitrary and may be set by the user. The order of processing of components would be consequential if an overall constraint on the entire container is imposed for some operational reasons.

The process of content filtering starts in step 2320 when prompted by a controller 240 (FIG. 2). Having selected the order, in which the components are to be processed, step 2340 determines whether at least one component is yet to be processed in step 2350. Otherwise, step 2380 ends the process and reports results. In step 2360, all rules of a rule set applicable to a component under consideration are executed, and step 2340 is revisited to determine whether another component need be processed. A module inserts a notification indicating any filtering action applied to a component.

Figure 24:
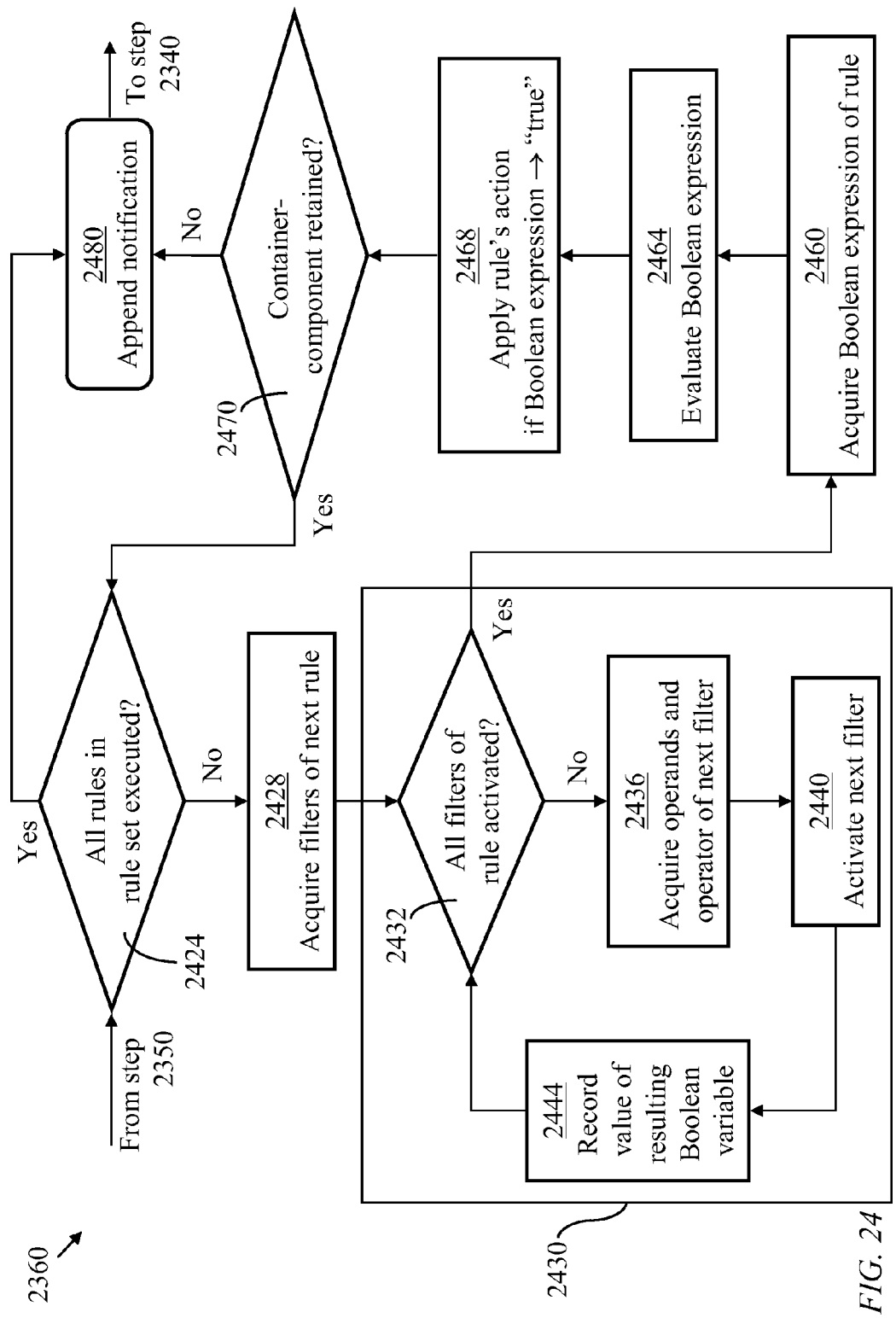
FIG. 24 illustrates a process of applying multiple rules for content filtering, in accordance with an embodiment of the present invention.

FIG. 24 details the step 2360 (FIG. 23) where a set of rules is applied to content of a container. Step 2360 applies to a component of a container. Step 2424 determines whether the entire rule set has been applied. If so, step 2480 appends a notification to the container indicating any content-filtering actions resulting from executing the set of rules. Otherwise, step 2428 selects a current rule and acquires definitions of all relevant filters associated with the selected current rule. Notably, the rules may be arranged in a specific order if the result of one rule influences selection of another rule. Additionally, the rule inter-dependence may be represented by a formal graph rather than a simple array as will be described with reference to FIG. 25.

Step 2430 executes the selected current rule. Step 2430 includes steps 2432, 2436, 2440, and 2444. Step 2432 determines whether all filters identified in step 2428 have been activated to determine a binary value of each filter. A filter is said to be activated when its operator is applied to respective operands to produce a binary value of the filter. If all filters relevant to the current rule have been activated, step 2432 transfers control to step 2460. Otherwise, steps 2436, 2440, and 2444 are exercised to produce a value of a filter under consideration. Step 2436 acquires the operator and values of respective operands based on characteristics of the container content under consideration as described with reference to FIG. 5 and FIG. 6. Step 2440 applies the operator to the operands, and step 2444 records the value of the current filter for use in evaluating the Boolean expression of current rule.

Step 2460 acquires the Boolean expression according to one of the encoding methods of FIG. 10, FIG. 15, or FIG. 17. Step 2464 evaluates the Boolean expression. Step 2468 may apply the content-filtering action associated with the current rule to the content of the content under consideration subject to the value of the Boolean expression as determined in step 2464. In step 2470, if the content-filtering action of the current rule results in deleting the entire container component, then there is no need to execute subsequent rules, if any, and step 2360 appends a respective notification to the deleted component. If the content is not edited, or edited but not deleted, step 2424 is revisited to determine whether more rules need be applied to the content under consideration. Notably, an entire component may be deleted if it has an attachment exceeding a certain threshold, or if it has a malicious insertion that cannot be removed.

Rules Inter-Dependence

In general, rules applicable to a specific content may have complementing actions, conflicting actions, or mutually-exclusive actions. With complementing actions, the content-filtering result may be independent of the sequence of implementing the rules. With conflicting actions or mutually-exclusive actions, one action supersedes another. In accordance with an embodiment of the present invention, a user may be prompted to define the inter-relationship of rules using a graph.

Figure 25:
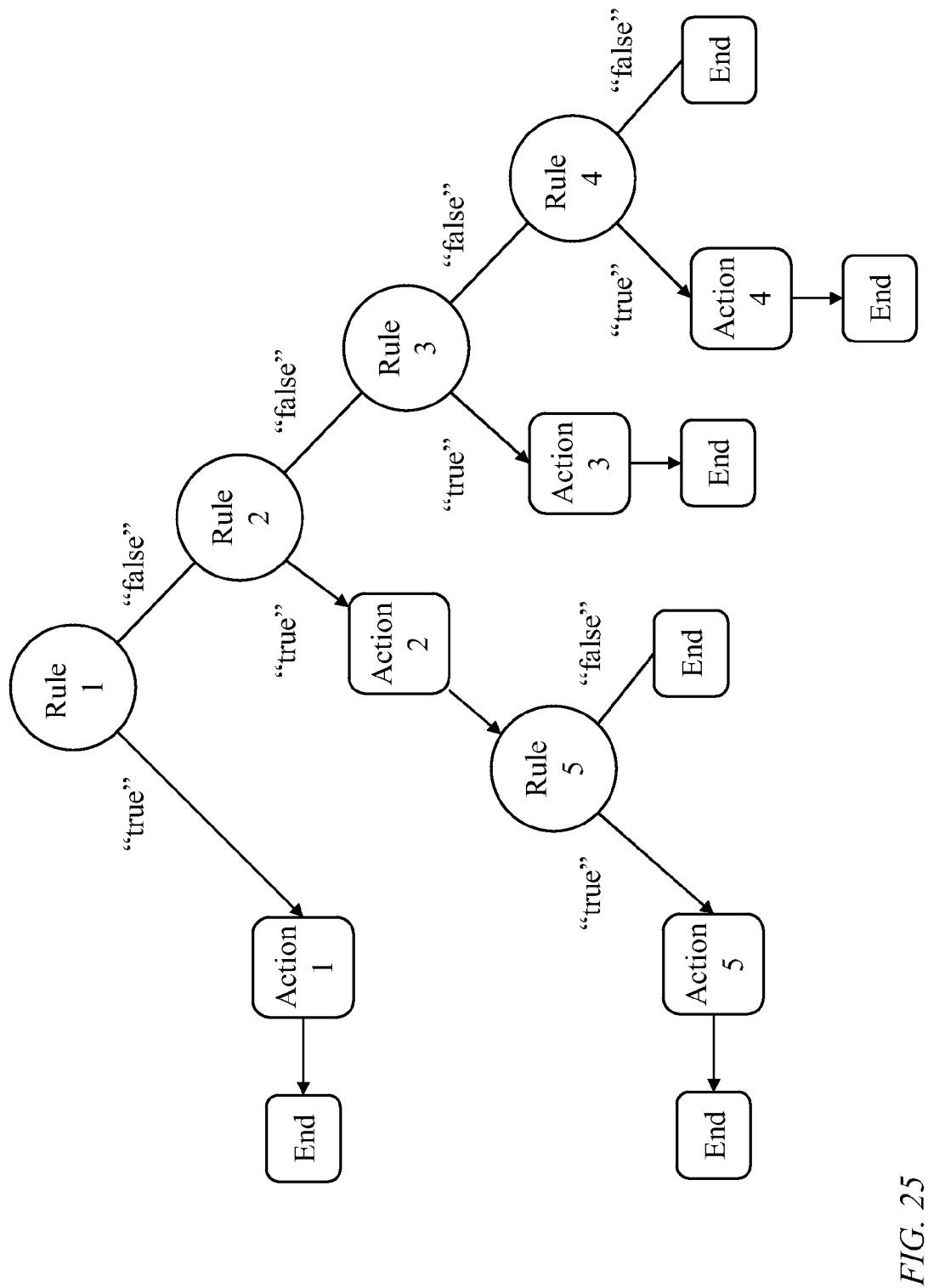
FIG. 25 illustrates a graph depicting interdependence of rules determining content-filtering actions, in accordance with an embodiment of the present invention.

FIG. 25 illustrates a graph indicating a hierarchical arrangement of five rules denoted Rule 1 to Rule 5. A state of a rule is herein defined as the binary value resulting from executing the Boolean expression of the rule.

A state of "true" of Rule 1 results in an action labeled "action 1" after which step 2360 is considered complete. "Action 1" may call for one of two opposing extremes; the first being deleting the entire component either because it is too large or is irreparable, or determining that the component is acceptable because it is too short to contain malicious insertions. A state of "false" of Rule 1 indicates that the content passes a first test and should be subjected to a second test of Rule 2.

A state of "true" of Rule 2 results in an action labeled "action 2" followed by implementing Rule 5. A state of "false" of Rule 2 indicates that the content passes the second test and should be subjected to a third test of Rule 3, and so on. The process ends without editing the content if the state of Rule 4 is "false". The process may also end after implementing (only) one: {action 1}, {action 2 and action 5", "action 3", and "action 5".

Figure 26:
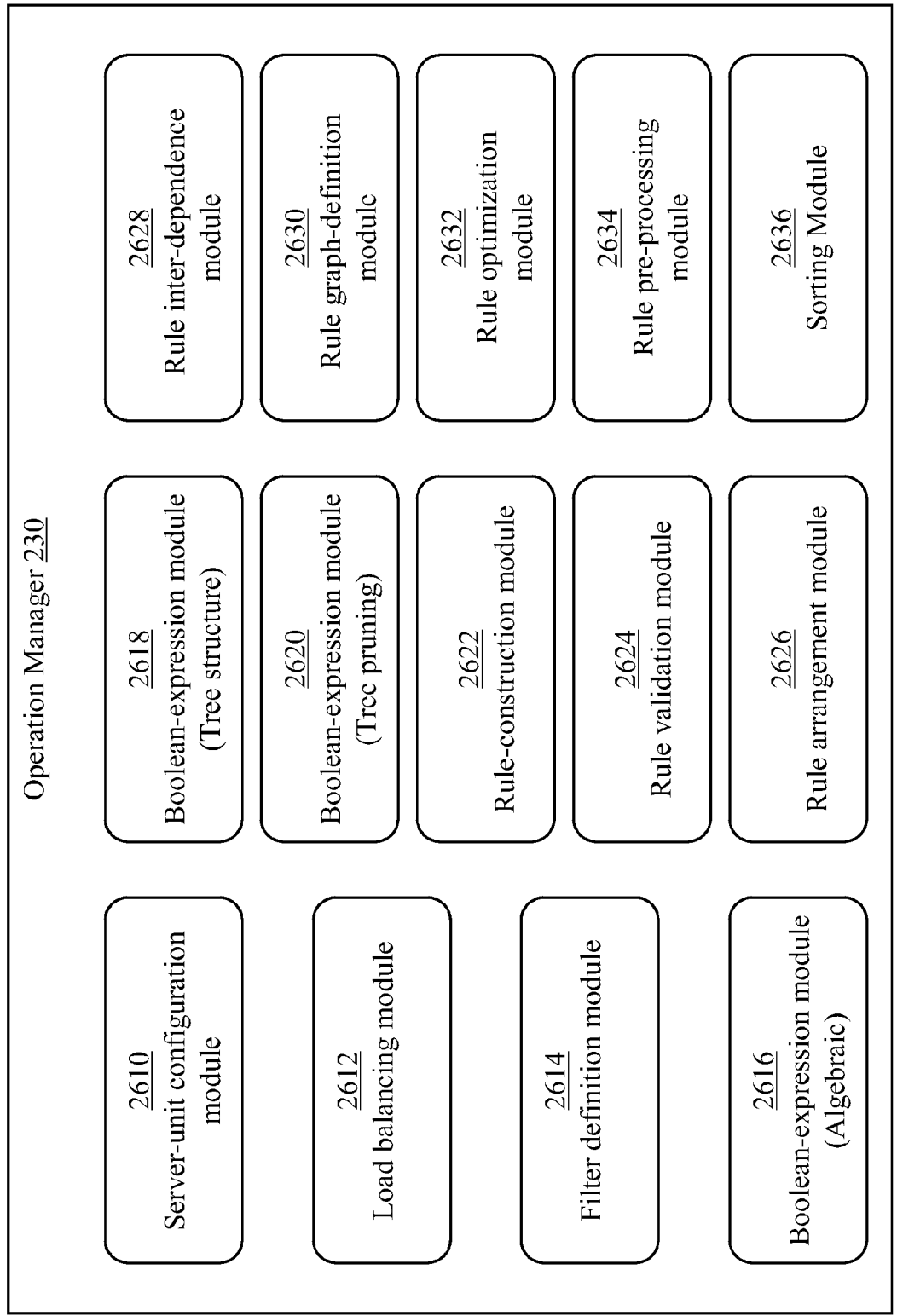
FIG. 26 illustrates modules of an operation manager of the engine of FIG. 2, in accordance with an embodiment of the present invention.

FIG. 26 illustrates modules, listed below, used by the operation manager 230. Each module comprises computer readable instructions stored in a computer readable storage medium.

(1) Server-unit configuration module 2610 for configuring a server unit to accept multimedia data containers formed according to a specified protocol.

(2) Load balancing module 2612 for equitably distributing multimedia data containers among server units identically-configured to process data containers of a common type.

(3) A filter-definition module 2614 for acquisition of definitions of a set of filters from a user, each filter specifying a definition of a content descriptor, a descriptor criterion, and an operator.

(4) Boolean-expression acquisition module 2616 for enabling a user to provide a Boolean expression according to algebraic syntax.

(5) Boolean-expression acquisition module 2618 for enabling a user to provide a Boolean expression in the form of a tree structure.

(6) Boolean-expression acquisition module 2620 for enabling a user to enter a Boolean expression by editing and pruning a drawing of a generic tree, where each node of a tree representing an operator and a respective set of operands.

(7) Rule-construction module 2622 for acquisition of a set of content-filtering rules from a user, each rule specifying a Boolean expression of a subset of filters and a filtering action.

(8) Rule-validation module 2624 for validating correctness of a Boolean expression specified for a rule.

(9) Rule-arrangement module 2626 for arranging rules in an order according to which a specific filtering action performed by a rule precludes execution of at least one subsequent rule.

(10) Rule inter-dependence module 2628 for prompting a user to specify a successive rule of a given rule conditional on a value of a respective Boolean expression of the given rule.

(11) Rule graph-definition module 2630 for presenting a set of content-filtering rules in the form of a formal graph (FIG. 25).

(12) Rule-optimization module 2632 for optimizing a Boolean expression of each rule, using conventional logic-optimization techniques, to minimize processing effort.

(13) Rule pre-processing module 2634 for selecting specific rules each specifying a subset of filters comprising at most a preset number of filters, evaluating, for each of the specific rules, a Boolean expression of a subset of filters for all values of the subset of filters to produce an array of $2^m$ bits, m>1 being a number of filters in the subset of filters, and storing the array of bits in a memory device (FIGS. 20 and 21).

(14) Sorting module 2636 for sorting containers into container types, each container type corresponding to a protocol according to which a container is formulated at source, and directing containers of a specific type to a specific controller from among a plurality of containers. The sorting module 2636 may be associated with the network interface 210 or the operation manager 230.

Figure 27:
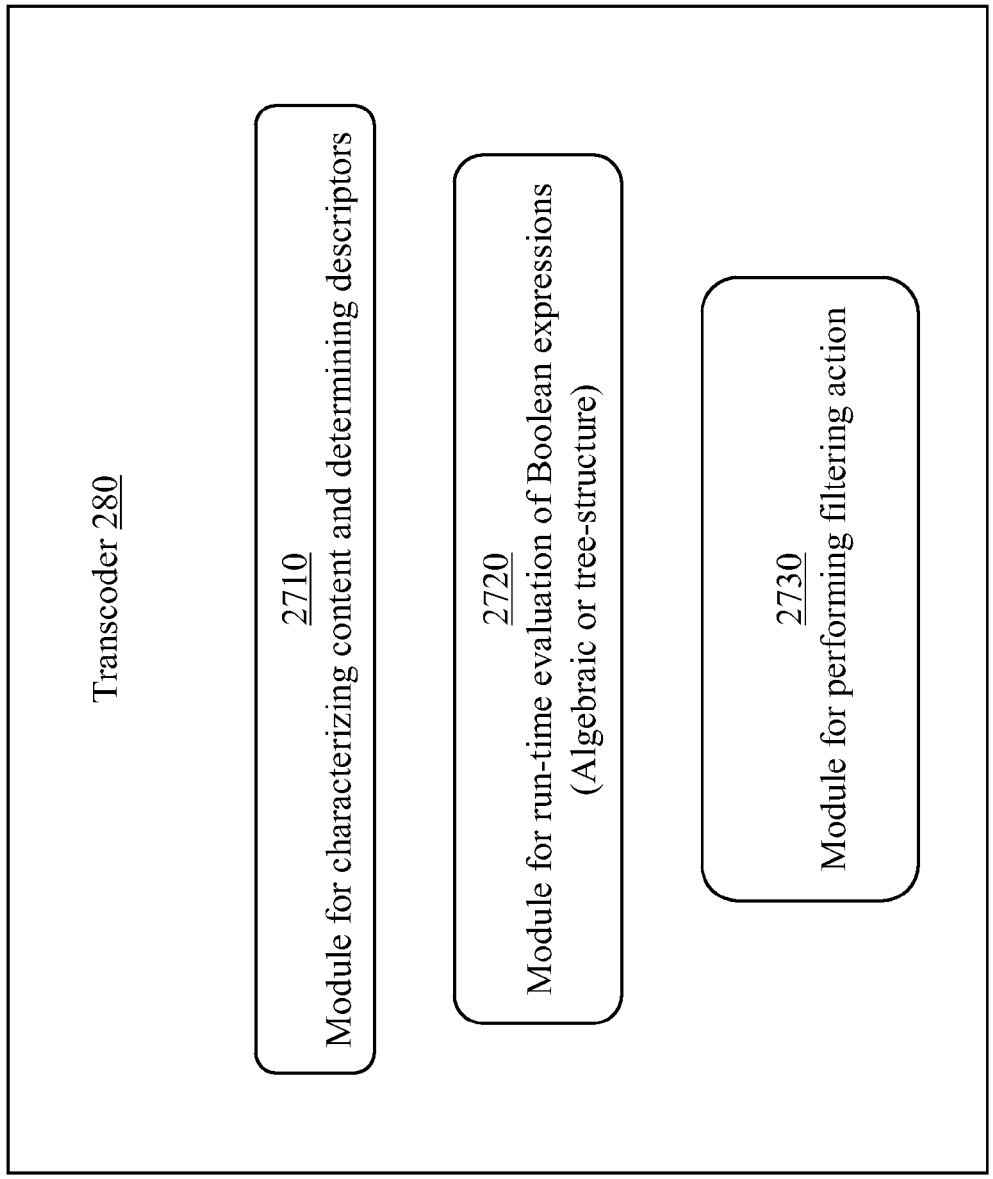
FIG. 27 illustrates modules of a transcoder of the engine of FIG. 2, in accordance with an embodiment of the present invention.

FIG. 27 illustrates modules, listed below, used by a transcoder 280, in accordance with an embodiment of the invention. Each module comprises computer readable instructions stored in a computer readable storage medium.

(a) Module 2710 for characterizing content of each component of a multimedia data container, determining content descriptors, applying an operator, and determining a state of a filter.

(b) Module 2720 for run-time evaluation of Boolean expressions and determining a binary output of a rule. The Boolean expression may be presented according to algebraic syntax or as a tree structure.

Figure 28:
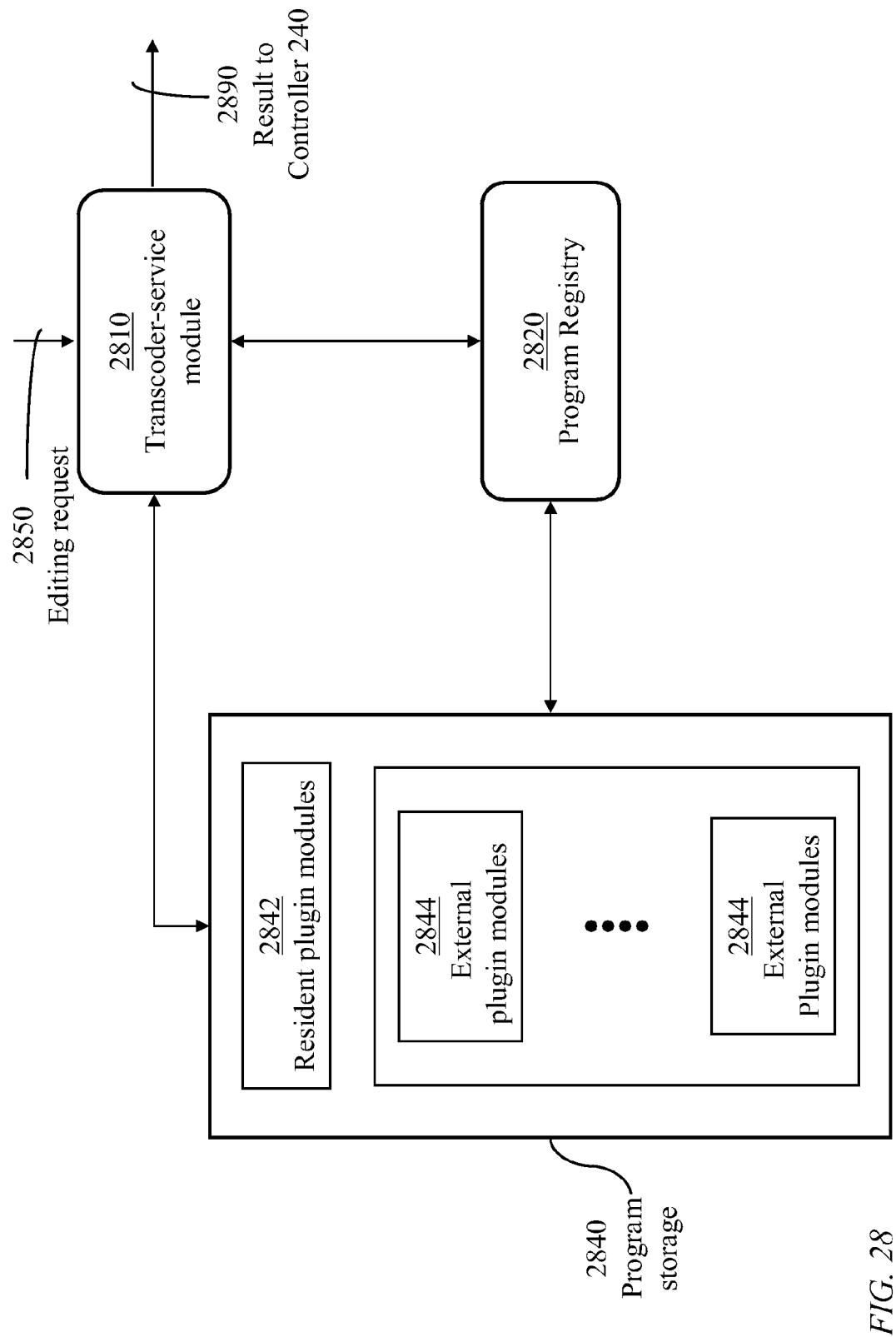
FIG. 28 illustrates modules of a transcoder of the engine of FIG. 2, in accordance with an embodiment of the present invention.

(c) Module 2730 for performing a filtering action relevant to a given container content, subject to a preset value a Boolean expression of a respective rule FIG. 28 illustrates a transcoder 280 comprising a transcoder-service module 2810, a program registry 2820, and program storage 2840, in accordance with an embodiment of the invention. The transcoder-service module comprises computer readable instructions stored in a computer readable storage medium, which, when executed, cause a core of the processor to: receive a specific container and an editing request from a specific controller from the plurality of controllers; select and execute programs relevant to the editing request; and return a result to the specific controller. The program registry comprises computer readable instructions which, when executed, causes a processor to organize programs according to respective functions; and replace existing programs with respective new programs.

A controller 240 (FIG. 2) forwards an editing request to a transcoder 280. Upon receiving an editing request 2850, the transcoder-service module 2810 identifies which plugin program to execute using information contained in the editing request. The transcoder-service module 2810 executes the selected plugin program and returns the result to a respective controller 240.

A "plugin" is defined herein as a self-contained module devised to perform a specific task. Program storage 2840 comprises computer readable instructions stored in a computer readable storage medium and includes two types of plugins:

(a) resident plugins 2842 which are loaded initially; and (b) external plugins 2844 which are loaded dynamically, external plugins may replace resident plugins.

Resident plugins provide basic functions, and external plugins provide additional functions, content filtering and virus scanning are two examples of such functions.

Plugins are registered with the program registry 2820 which manages plugin registration and access. The program registry 2820 organizes plugins based on their characteristics. Plugins may be arranged in plugin groups.

Plugin programs organize execution of plugins in a predefined fashion. Plugin programs are built from a simple set of instructions which determine the execution logic for a predefined set of plugins having specific goals.

An example of instructions of a simple program that uses plugins is presented next.

(01) OnErrorGoto TERMINATION_PLUGIN
(02) Execute DEFAULT_SETUP_INITIAL_PROFILE
(03) Execute DEFAULT_SETUP_SESSION
(04) Execute DEFAULT_PRE_PROCESS_DECODE_PLUGIN
(05) ExecuteGroup GROUP_HOT_PIPELINE_DUAL_LOAD_AROUND_CREATE
(06) Execute DEFAULT_TRANSFORMER_PLUGIN
(07) Execute DEFAULT_CREATOR_PLUGIN
(08) ExecuteGroup GROUP_HOT_PIPELINE_CREATOR
(09) ExecuteGroup GROUP_HOT_PIPELINE_DUAL_LOAD_AROUND_CREATE
(10) Execute DEFAULT_CHARGE_DATA_RECORD_PLUGIN
(11) Execute DEFAULT_OPTIMISER_PLUGIN
(12) ExecuteGroup GROUP_HOT_PIPELINE_ANALYSER
(13) Execute DEFAULT_ENCODE_PLUGIN
(14) Label TERMINATION_PLUGIN
(15) Execute DEFAULT_CHARACTERIZE_PLUGIN
(16) ExecuteGroup GROUP_HOT_PIPELINE_TERMINATOR
(17) Execute DEFAULT_UNSETUP_SESSION
(18) Execute DEFAULT_CHARGE_DATA_RECORD_PLUGIN It is noted that the numbers on the left are introduced only for ease of reference and do not necessarily constitute a part of the instructions.

Each "Execute" command has the name of a plugin as an argument that always refers to resident plugin names. An external plugin is never directly referenced by name since it is optional, and is thus executed only if present. Each "ExecuteGroup" command has the name of a plugin group as argument. Command "Execute Group" executes all the plugins that belong to that group.

Line 1 states that on any error the program is to jump to line 14 and resume execution with lines 15 to 18. Lines 2 and 3 perform setup of the adaptation to be done; Line 4 performs decoding of input if required, for example if the input is EMAIL then it is broken into its sub-components; Line 5 and line 9 execute a plugin group to which Content Filtering plugin belongs to. So if present, it starts execution on line 5 and terminates on line 9; Line 6 and line 7 are used respectively to perform setup operations necessary for the creation of an adaptation pipeline and to actually create it. The adaptation pipeline contains a set of operations to be executed to perform the required adaptation; Line 8 is meant to execute any external plugin that has an effect on the adaptation pipeline before it is executed; Line 10 provides details of input components that will take part in the adaptation. Line 18 performs a similar task on the output components. Such information may be analyzed for reporting, billing and other purposes not necessarily related to the adaptation function; Line 11 performs adaptation-pipeline optimization; Line 12 executes any external plugin that performs analysis and optimization of the adaptation pipeline before its execution; Line 13 executes the adaptation pipeline; Line 15 characterizes the output components generated as a result of the execution of the adaptation pipeline; Line 16 executes any external plugin that has an effect on the output components that were generated; and Line 17 performs additional steps completing the adaptation (such as providing a detailed adaptation record).

Rules are permanently stored in "Rule Files". A rule file may apply to more than one controller. Content filtering, using a rule file, applies the rules contained in the rule file against media (content). If a given rule evaluates to "true", a corresponding action is performed. An action may include removing undesirable content such as viruses (including mobile specific viruses); removing media of a particular type (such as games); using third party applications to perform actions on media (such as scanning a media for viruses). However, a content of a particular type may pass-through without processing.

The definition of rules is done in the operation manager 230 (FIG. 2). The application of rules to affect content editing (filtering and adaptation) is done in a transcoder 280. Once a rule file is created then the user optionally configures one of the controllers 240 to send the rule file along with any adaptation request to a transcoder 280 it selects.

An action "Drop" ensures that a media is not part of the output of a content adaptation process. An action "scan keep" results in scanning a media for viruses. This assumes that the Anti-virus external plugin is installed. The media is actually "marked" as "scan for virus", so that at the point of the execution of the appropriate plugin program where the anti-virus plugin is executed all media marked as "scan for virus" are scanned for viruses.

An example of a rule called rule 1 is given below.

```
Rule Name="MaxFileSize50000" Action="Drop"
    Filter Type="MaxFileSize" Operator="GreaterThan" Value="50000"
    Filter FilterOperator="AND" Type="Family" Operator="NotEqual"
    Value="MESSAGE"
```

The name associated with rule 1 is "MaxFileSize50000" whereas the action corresponding to the rule is "Drop" for removing any media that match the filter(s) contained in the rule. This rule specifies two filters. The first filter is of type "MaxFileSize" that is applied against the size of a file. The filter operator is "GreaterThan" where as the value is "50000". The second filter is characterized by a type called "Family". This filter is applied against the media family (ex: IMAGE, AUDIO, etc). The operator associated with the filter is not "NotEqual" and the value is "MESSAGE. The filters are combined by using a boolean operator "AND". Thus, if a file has a size greater than 50000 and is not of family "MESSAGE" then the specified action is performed.

Another rule, called rule 2 is described next:

```
Rule Name="MaxFileSize25000AndContentTypes"
Action="Drop"
    Filter Type="MaxFileSize"
    Operator="GreaterThan" Value="25000"
        BracketOpen
        FilterOperator="AND"
        Filter Type="ContentType"
        Operator="Equals" Value="image/wbmp"
        Filter FilterOperator="OR"
        Type="ContentType" Operator="Equals"
            Value="image/png"
        BracketClose
```

The name of the rule is "MaxFileSize25000AndContent Types" and the corresponding action is "Drop". The purpose of rule 2 is to remove any media that match the filter(s) contained in the rule. A detailed description of the structure of rule 2 is presented next.

Only the following filters are specified.
1$^{st}$ filter:
  filter type is "MaxFileSize" and the filter is applied against the size of a file;
  operator is "GreaterThan";
  the value is "25000";
Bracket Open with "AND" boolean filter operator
2$^{nd}$ filter:
  filter type is "ContentType" and the filter is applied against the content type (equivalent to mimetype) of a media;
  operator is "Equals";
  the value is "image/wbmp";
3$^{rd}$ filter:
  has Boolean filter operator "OR";
  filter type is "ContentType" and the filter is applied against the content type (equivalent to mimetype) of a media;
  operator is "Equals";
  the value is "image/png";
Bracket Close.

Thus, if a file has a size greater than "25000" AND (has a content-type equal to "image/wbmp" OR has a content-type equal to image/png) then the action specified in the rule is performed. Actions can affect the media or any of its attachments if the media is a container such as an email or an MMS. Actions can include: keep (adapt the media); keep & scan (scan the media for viruses before adapting); drop (do not include the attachment in the final message); pass-through (do not adapt the media, leave it unchanged).

An example rule 3 that is defined in a common rule file is described next.

```
Rule Name="MaxFileSize300000" Action="Drop"
    Filter Type="MaxFileSize" Operator="GreaterThan"
    Value="300000"
```

Another example, rule 4, that completes that common rule file is presented.

```
Rule Name="VirusScan" Action="ScanKeep"
    Filter Type="Family" Operator="Equals" Value="MESSAGE"
```

In this case a common rule file contains:
rule 3 which "drops" all files that have a size greater than 300000; and
rule 4 which performs a virus scan on any media that are messages.

Consider a case where a common rule file is applied to all controllers and that some controller "X" has defined a rule file that contained rules 1 and 2. When sending an adaptation request to a selected Transcoder, that controller would send a rule file called "RuleFile1" that contained rules 1 to 4. The structure of "RuleFile1" is presented.

```
Rule Name="MaxFileSize50000" Action="Drop"
    Filter Type="MaxFileSize" Operator="GreaterThan" Value="50000"
    Filter FilterOperator="AND" Type="Family" Operator="NotEqual"
        Value="MESSAGE"
Rule Name="MaxFileSize25000AndContentTypes" Action="Drop"
    Filter Type="MaxFileSize" Operator="GreaterThan" Value="25000"
    BracketOpen FilterOperator="AND"
        Filter Type="ContentType" Operator="Equals"
        Value="image/wbmp"
        Filter FilterOperator="OR" Type="ContentType"
```

```
    Operator="Equals"
                  Value="image/png"
    BracketClose
Rule Name="MaxFileSize300000" Action="Drop"
    Filter Type="MaxFileSize" Operator="GreaterThan"
    Value="300000"
Rule Name="VirusScan" Action="ScanKeep"
    Filter Type="Family" Operator="Equals" Value="MESSAGE"
```

In the context of an embodiment that provides this feature, XML is used to manage the structure of rules inside rule files. This ensures portability and scalability. An XML version of RuleFile1 is presented next.

```
<?xml version="1.0" encoding="UTF-8"?>
<ContentFiltering xmlns:xsi="http://www.w3.org/2001/XMLSchema-instance"
     xsi:type="ContentFiltering">
    <CompatibilityVersion>7.0</CompatibilityVersion>
    <Version>7.0</Version>
    <Name>RuleFile1</Name>
    <FilterRule Name="MaxFileSize50000" Action="Drop">
        <Filter Type="MaxFileSize" Operator="GreaterThan"
        Value="50000"/>
        <Filter FilterOperator="AND" Type="Family"
        Operator="NotEqual"
            Value="MESSAGE"/>
    </FilterRule>
    <FilterRule Name="MaxFileSize25000AndContentTypes"
    Action="Drop">
        <Filter Type="MaxFileSize" Operator="GreaterThan"
        Value="25000"/>
        <Bracket FilterOperator="AND">
           <Filter Type="ContentType" Operator="Equals"
           Value="image/wbmp"/>
           <Filter FilterOperator="OR" Type="ContentType"
Operator="Equals"              Value="image/png"/>
        </Bracket>
    </FilterRule>
    <FilterRule Name="MaxFileSize300000" Action="Drop">
        <Filter Type="MaxFileSize" Operator="GreaterThan"
Value="300000"/>
    </FilterRule>
    <FilterRule Name="VirusScan" Action="ScanKeep">
        <Filter Type="Family" Operator="Equals"
        Value="MESSAGE"/>
    </FilterRule>
</ContentFiltering>
```

An example of content filtering is presented below. Consider a multimedia container:
  MMS Characteristics:
  Name: mms1.mms
  Family: MESSAGE
  Size: 171100
  Content-type: application/vnd.wap.multipart.mixed
  Number of attachments: 3
  MMS Attachment Characteristics:
  Name: image.jpg
  Family: IMAGE
  Size: 75000
  Content-type: image/jpg
  Name: image2.jpg
  Family: IMAGE
  Size: 45000
  Content-type: image/jpg
  Name: image.png
  Family: IMAGE
  Size: 50000
  Content-type: image/png Content filtering is performed according to the following steps:
  the MMS goes through content filtering;
  rule "VirusScan" evaluates to "true for this media since media belongs to family "MESSAGE";
  media is marked as "scan for virus".
  the attachment image.jpg goes through content filtering:
  a rule "MaxFileSize50000" evaluates to "true" since the media is not a message and its size is greater than 50000;
  media is marked as "Drop".
  the attachment image2.jpg goes through content filtering:
  none of the rules evaluates to "true" for this media;
  the second attachment image.png goes through content filtering:
  a rule "MaxFileSize25000AndContentTypes" evaluates to "true" for this media since media has size greater than 25000 and has content-type "image/png";
  media marked as "Drop".

The plugin program resumes after the execution of the content filtering plugin. This results in the scanning of the MMS media and its content for virus by the Anti-virus plugin. The adaptation process then starts. Consider the case where the adaptation and content filtering produce an output MMS that is of the following form.
  MMS Characteristics:
  Name: mmslout.mms
  Family: MESSAGE
  Size: 25175
  Content-type: application/vnd.wap.multipart.mixed
  Number of attachments: 2
  MMS Attachment Characteristics:
  Name: image2.gif
  Family: IMAGE
  Size: 24000
  Content-type: image/gif
  Name: removal_notification.txt
  Family: TEXT
  Size: 75
  Content-type: text/plain It is assumed that, as a result of content adaptation, "image2.jpg" was adapted to output "image2.gif". Note that both "image.jpg" and "image.png" were "dropped" and are not part of the output MMS resulting from the content filtering actions being applied. A new media "removal_notification.txt" is added to the output message. This results from the removal of "image.jpg" and "image.png". Transcoders are devised so that, upon removal of a media, an explanatory text notification is attached. This notification is intended to provide an explanation to the receiver of the MMS that some of the media originally in the MMS could not be adapted and were removed.

Anti-virus scanning is present in Transcoders in the form of an external plugin. In this case the plugin architecture is used to provide an interface to a third party anti-virus scanning engine such as McAffee or Kaspersky. The presence of the Anti-virus plugin is optional as with any external plugin. At the plugin program level, a plugin program that is meant to execute the Anti-virus plugin would contain a command that executes the plugin group to which the Anti-virus plugin belongs.

Execution of the anti-virus plugin does not automatically imply that the media will be scanned for viruses. Virus scanning is performed only on media that are marked as "scan for virus" by content filtering. Some third-party Anti-virus engines may be installed as stand-alone libraries. Other third-party Anti-virus engines may be installed as client-servers. The Anti-virus plugin would be written in such a way as to properly interface with the third-party Anti-virus engine. In any case, the anti-virus plugin is the transcoder's entry point to perform virus scanning on the media that go through content-adaptation.

Thus, in the above described embodiments, the following features have been provided: (1) ability to parse a message in order to check the attachments; (2) ability to characterize an attachment in order to filter it according to content type; and (3) accommodating a user-defined, expandable, and hierarchic set of rules to determine whether a media element is desirable or not.

Editing actions determine how media attachments are treated. The editing actions may include one or more of the following: presenting an attachment to the adaptation process; keeping an attachment and scanning the media for viruses before presenting to the adaptation process; and dropping an attachment. Editing actions may include invoking anti-virus and intrusion-prevention software programs.

Figure 29:
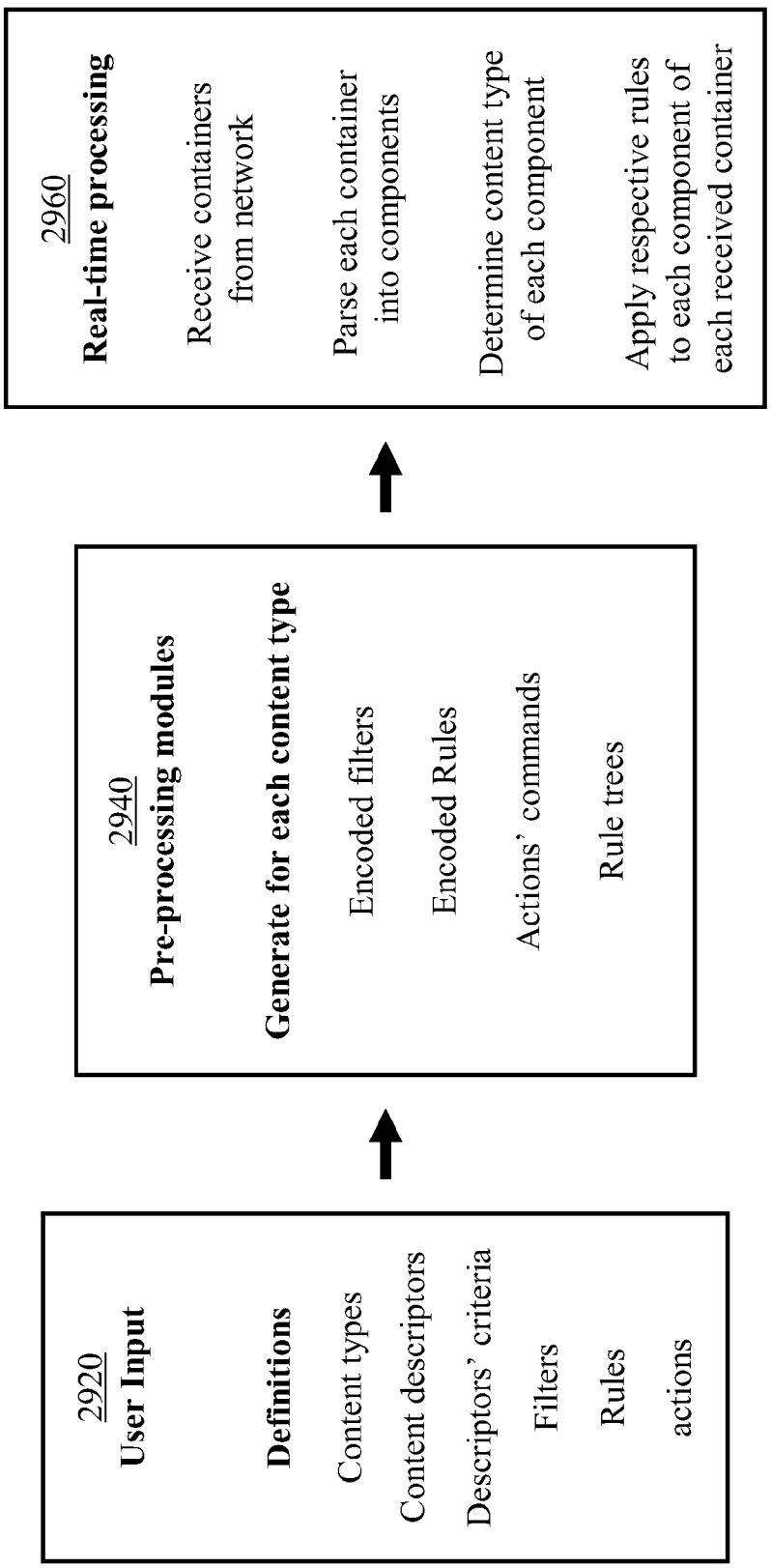
FIG. 29 provides an overview of a method for filtering a data stream structured as data containers where each data container may contain components of different content types, in accordance with an embodiment of the present invention.

FIG. 29 provides an overview of a method for filtering data streams. A data stream is structured as data containers where each data container may contain components of different content types. The method is implemented in a computing device which may be a general-purpose computer.

In step 2920, a user (installer) provides definitions of content types and content descriptors. A content descriptor, such as component size, may be common to multiple content types. A content descriptor, such as an encoding method, may be specific to a single content type. The user also provides definitions of data filters where each filter has an operator and two operands, one of which being a value of a content descriptor and the other a corresponding criterion (threshold). The operator determines a binary state of a filter. |For example, a descriptor may be component size, the criterion may be 80 kilobytes, and the operator may perform a comparison, resulting in "false" if the component size is less than 80 kilobytes, and "true" otherwise.

The user further provides rules where a rule may be based on a single filter or a Boolean function of multiple filters. If the rule is defined as a single filter, the state of the filter becomes the outcome of the rule. If the rule is based on multiple filters, the Boolean function determines the binary outcome of the rule. A rule invokes an action which depends on the binary outcome of the rule. An action may be to accept a component as received, edit the component to remove undesirable content, or re-encode the component to conform to known capability of a receiver. A component may be filtered according to multiple rules which may be independent or interrelated rules. It is plausible, however, that multiple rules applied to a component be interrelated. For example, a first rule may result in compressing a component if the size of the component exceeds a specified threshold and a second rule may result in discarding the component if the component is found to contain certain undesirable content and retaining the component otherwise. The second rule is preferably applied first.

In step 2940, processor-executable instructions installed in a memory device cause a processor to generate a set of encoded filters and a set of encoded rules based on the user input acquired in step 2920. The encoded rules may be arranged in rule trees or hierarchical rule strata as will be described with reference to FIGS. 36 to 48. The processor-executable instructions perform actions determined by each rule. Each content type is associated with a subset of the set of encoded rules. Step 2940 may be repeated periodically, or as the need arises, to account for updates of user input acquired in step 2920. Step 2940 is implemented as an "off-line" process.

Step 2960 applies filtering rules to data received from a network. A received data container is parsed into components of different content types. For each component, encoded rules designated for the content-type of the component are applied. An indication of any editing action performed for any component of the container may be appended to the data container. If an editing action results in deleting the entire data container, only an indication of editing action may be sent to an intended receiver.

Figure 30:
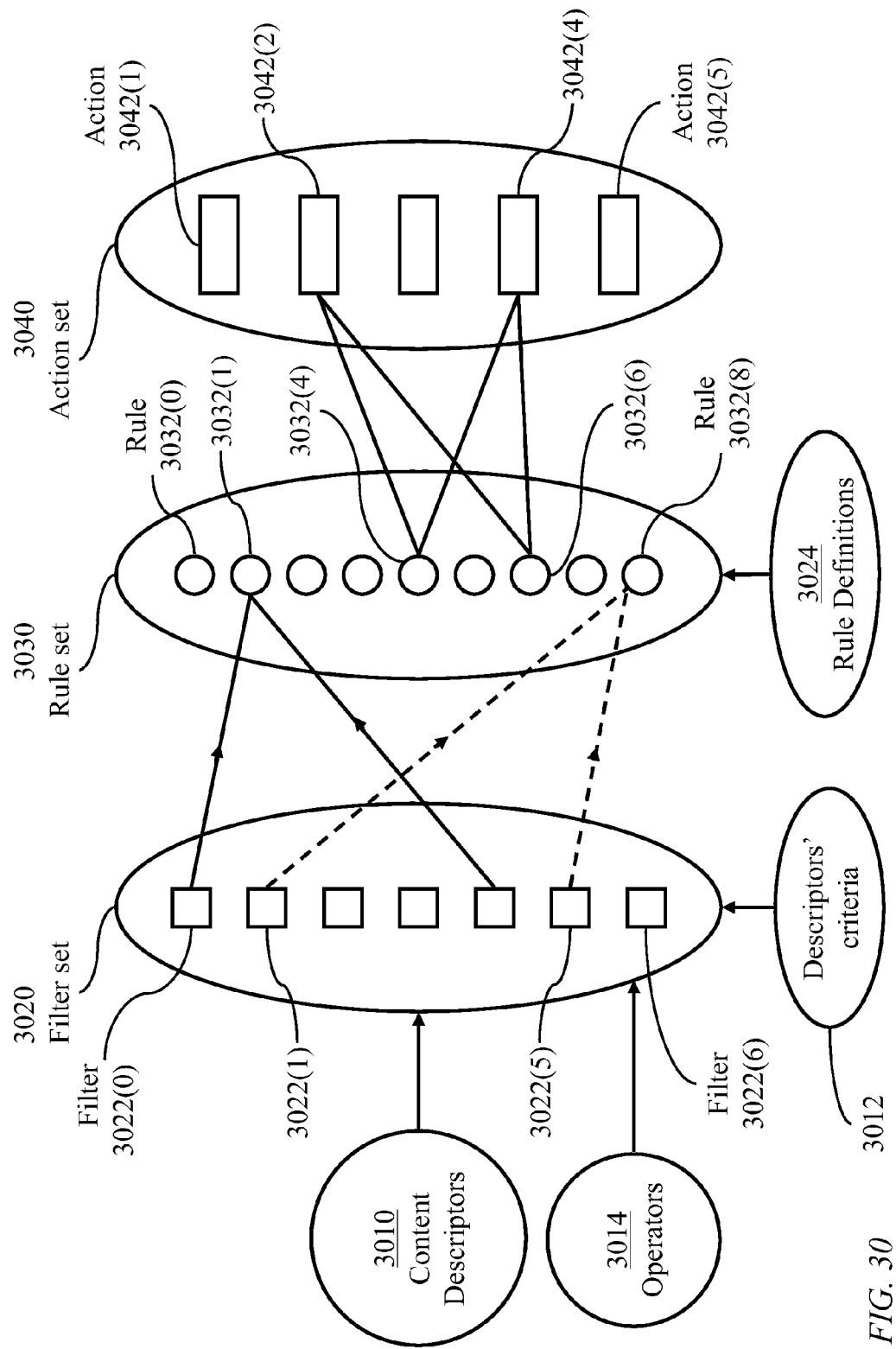
FIG. 30 illustrates interrelationships of filters, rules, and actions used in the method of FIG. 29.

FIG. 30 illustrates a filter set 3020 having seven filters 3022 individually labeled as 3022(0) to 3022(6), a rule set 3030 having nine rules 3032 individually labeled 3032(0) to 3032(8), and an action set 3040 having five actions 3042 individually labeled 3042(1) to 3042(5). One of the actions may be a passive action which does not cause any changes to a component under consideration. Content descriptors 3010, descriptor's criteria 3012, and a list of operators 3014, acquired in step 2920, form encoded filters 3022 in step 2940. Encoded filters 3022 determined in step 2940 and user-defined Boolean expressions 3024 acquired in step 2920 form encoded rules in step 2940. A filter 3022 is an independent binary variable and a rule 3032 has a binary value determined from a single filter or from multiple filters according to a respective Boolean function. A single rule applied to a component of a data container leads to one of two actions 3042 determined according to the binary value of the rule. One of the two actions may be a passive action. A subset of rules 3032 may be applied to a single component and may lead to multiple actions.

Figure 31:
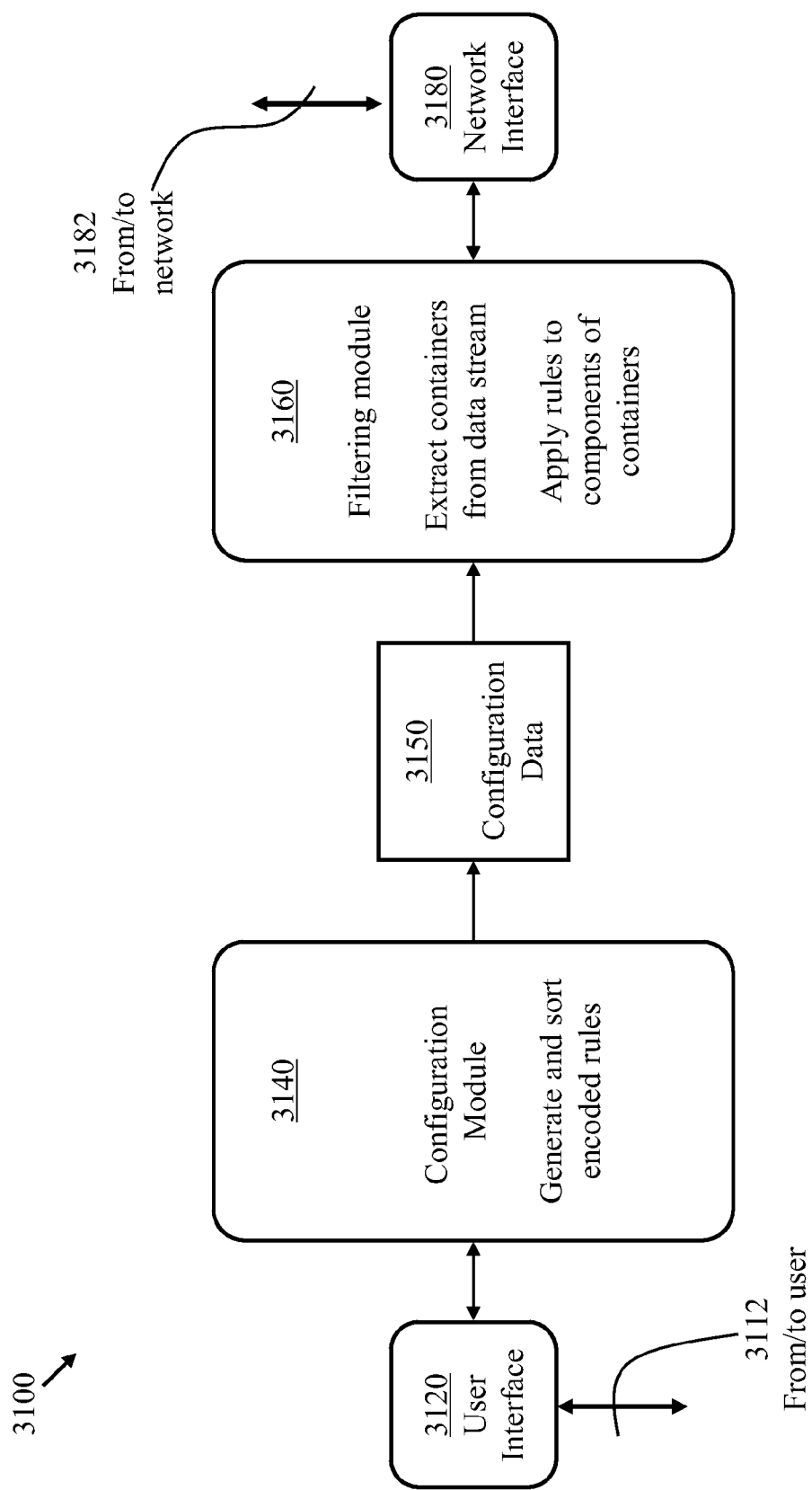
FIG. 31 illustrates a device for implementing the method of FIG. 29 in accordance with an embodiment of the present invention.

FIG. 31 illustrates a device for implementing the method of FIG. 29. A user interface 3120 receives user input 2920, verifies input sanity, and prompts the user to modify input data where necessary. The user input is forwarded to a configuration module 3140 which generates processor-readable encoded filters and encoded rules. Configuration module 3140 is activated in response to new user-data entry. Configuration module 3140 may sort and rearrange the encoded rules in the form of at least one rule tree as will be described with reference to FIG. 36 to 39, or in hierarchical rule strata as will be described with reference to FIGS. 40 to 48.

The main output of configuration module 3140 is a set of encoded rules for each content type. An encoded rule may, however, be applicable to multiple content types. The outcome of a rule may be the state of one filter or a Boolean function of a number of filters. Each filter is a function of a content descriptor, a descriptor criterion, and an operator. The descriptor criterion and operator of a filter are embedded in an encoded filter and the descriptor value is determined from content of a received container. The processor-readable encoded rules and encoded filters determined in configuration module 3140 are stored in a memory device 3150 to be used in filtering module 3160. Any of the encoded filters or encoded rules may apply to data components of different content types. Memory device 3150 also stores descriptors' definitions.

A network interface 3180 receives data streams from a network and submits received data to filtering module 3160 which extracts data containers from received data and parses each data container into components which may be of different content types. Descriptors' values of each component are determined in order to evaluate encoded filters and, hence, encoded rules. Filtering module 3160 applies encoded rules to components of each container to produce edited components which are assembled into an edited container to be transmitted to destination through network interface 3180 and a link 3182. Notably, a container may not undergo any changes in filtering module 3160; however, a notification of the editing result may optionally be appended to a container.

Figure 32:
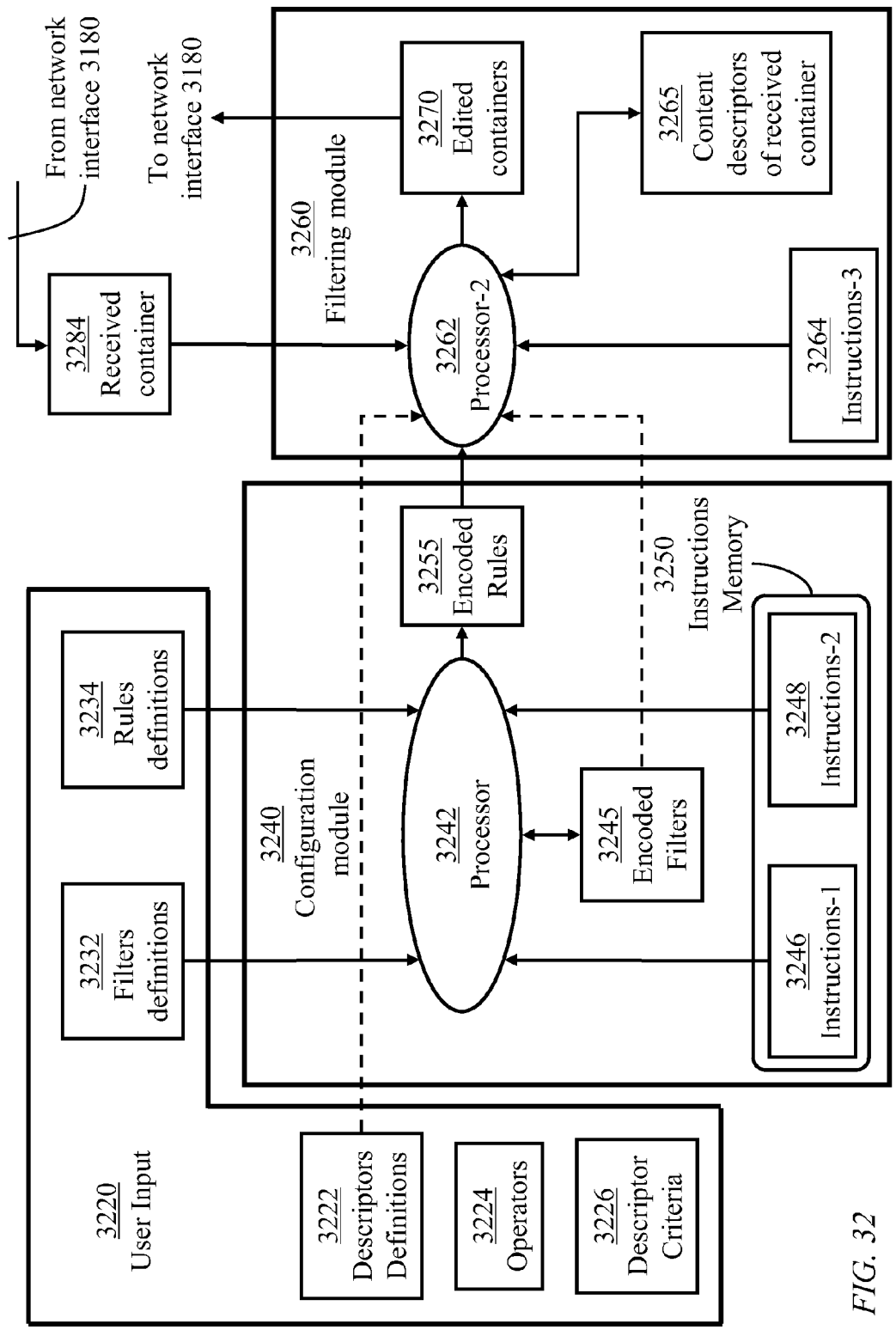
FIG. 32 illustrates details of the device of FIG. 31.

FIG. 32 illustrates an implementation of the device of FIG. 31 where configuration module 3240 and filtering module 3260 represent exemplary implementations of modules 3140 and 3160 of FIG. 31. User interface 3120 acquires input data including a list of descriptor definitions 3222, a list of descriptors' criteria 3226, a list of filter operators 3224, filter definitions 3232, and rule definitions 3234. A rule may be defined as a Boolean function of respective filters. The input data is stored in a memory device 3220. Configuration module 3240 comprises a processor 3242, a memory device 3250 storing a first set of instructions 3246 (labeled instructions-1) which cause processor 3242 to generate encoded filters based on: filter definitions 3232, descriptor definitions 3222, descriptors' criteria 3226, and operators 3224. The encoded filters are stored in a memory device 3245. Instructions memory device 3250 also stores a second set of instructions 3248 (labeled instructions-2) which cause processor 3242 to generate encoded rules using rule definitions 3234 and the encoded filters stored in memory device 3245. The encoded rules are stored in a memory device 3255. Notably, memory device 3245 storing the encoded filters and memory device 3255 storing the encoded rules may be partitions of a shared memory device.

Filtering module 3260 comprises a processor 3262 and a memory device 3264 storing instructions (labeled instructions-3) which cause processor 3262 to determine values of content descriptors 3265 of containers 3284 received from network-interface module 3180 and apply encoded rules stored in memory device 3255 to produce edited containers 3270 which are transmitted to destination through network interface 3180.

Figure 33:
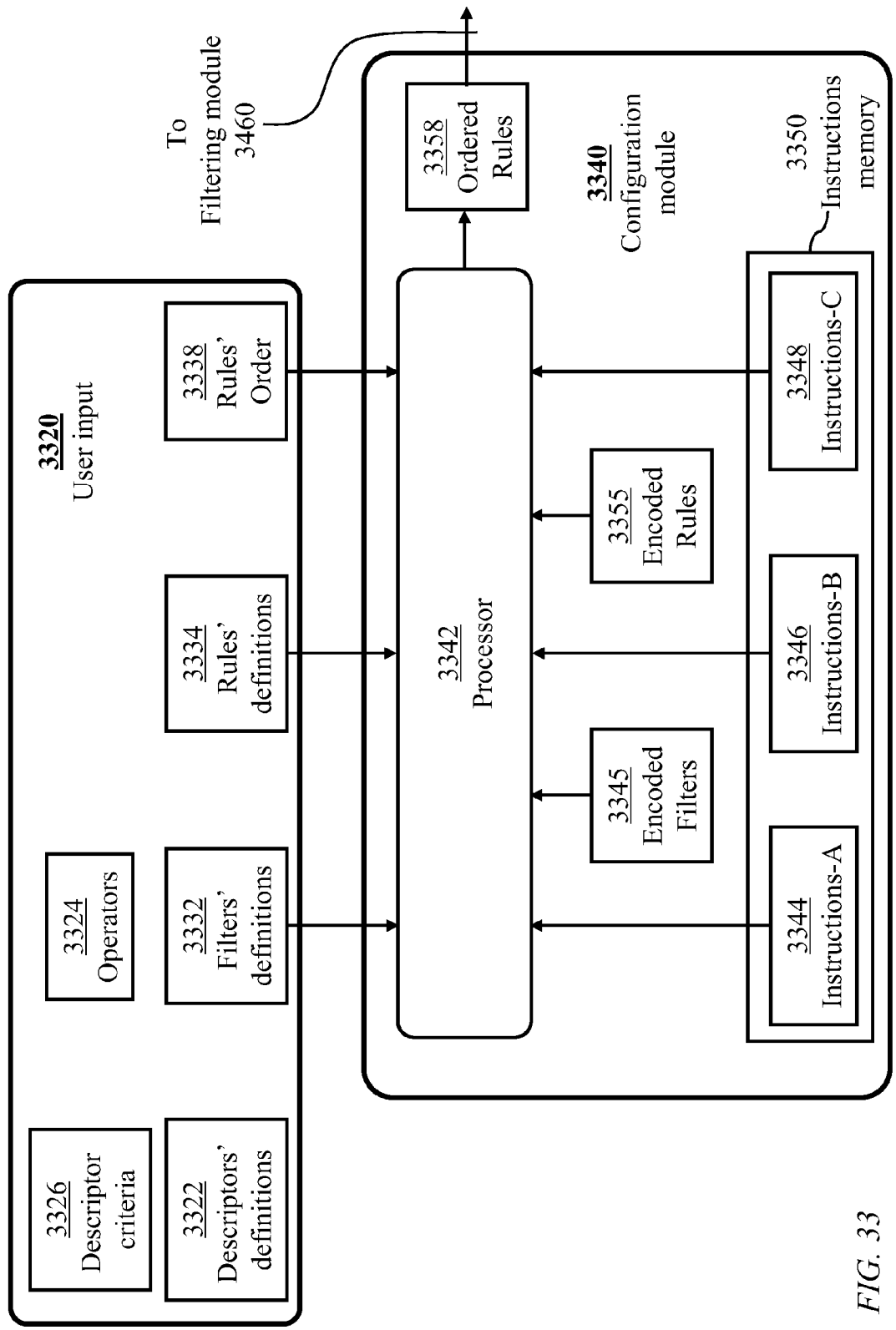
FIG. 33 illustrates an exemplary device for generating encoded rules, arranged in a predetermined order, in accordance with an embodiment of the present invention.

FIG. 33 illustrates an exemplary implementation of the device of FIG. 31 where configuration module 3340 represents an exemplary implementation of module 3140. As in the device of FIG. 32, user interface 3120 acquires a list of descriptor definitions 3322, a list of descriptors' criteria 3326, a list of filter operators 3324, filter definitions 3332, and rule definitions 3334 where a rule definition may include a Boolean function of respective filters. Additionally, user interface 3120 acquires user-defined rules' order 3338 for use in determining an order of execution of encoded rules. All user input is stored in a memory device 3320. Configuration module 3340 comprises processor 3342, a memory device 3350 storing a first set of instructions 3344 (labeled instructions-A) which cause processor 3342 to generate encoded filters based on filter definitions 3332, descriptors' definitions 3322, descriptors' criteria 3226, and operators 3324, and store the encoded filters in a memory device 3345. Memory device 3350 also stores a second set of instructions 3346 (labeled instructions-B) which cause processor 3342 to generate encoded rules using rule definitions 3334 and the encoded filters stored in memory device 3345. The encoded rules are stored in a memory device 3355. Memory device 3350 also stores a third set of instructions 3348 (labeled instructions-C) which cause processor 3342 to sort the encoded rules according to the user-defined rules' order 3338. The sorted rules are stored in a memory device 3358.

To facilitate defining the set of filters, defining the set of rules, and selecting the order of sorting and applying the encoded rules, configuration module 3240 or 3340 may display relevant data to a user through user interface 3120. Thus, a memory device (not illustrated) associated with configuration module 3240 or 3340 may be populated with processor-readable instructions which cause processor 3242 or 3342 to: display the set of content descriptors, the set of criteria, and the operators; display the set of encoded filters 3245 or 3345; and display the set of encoded rules 3255 or 3355.

Figure 34:
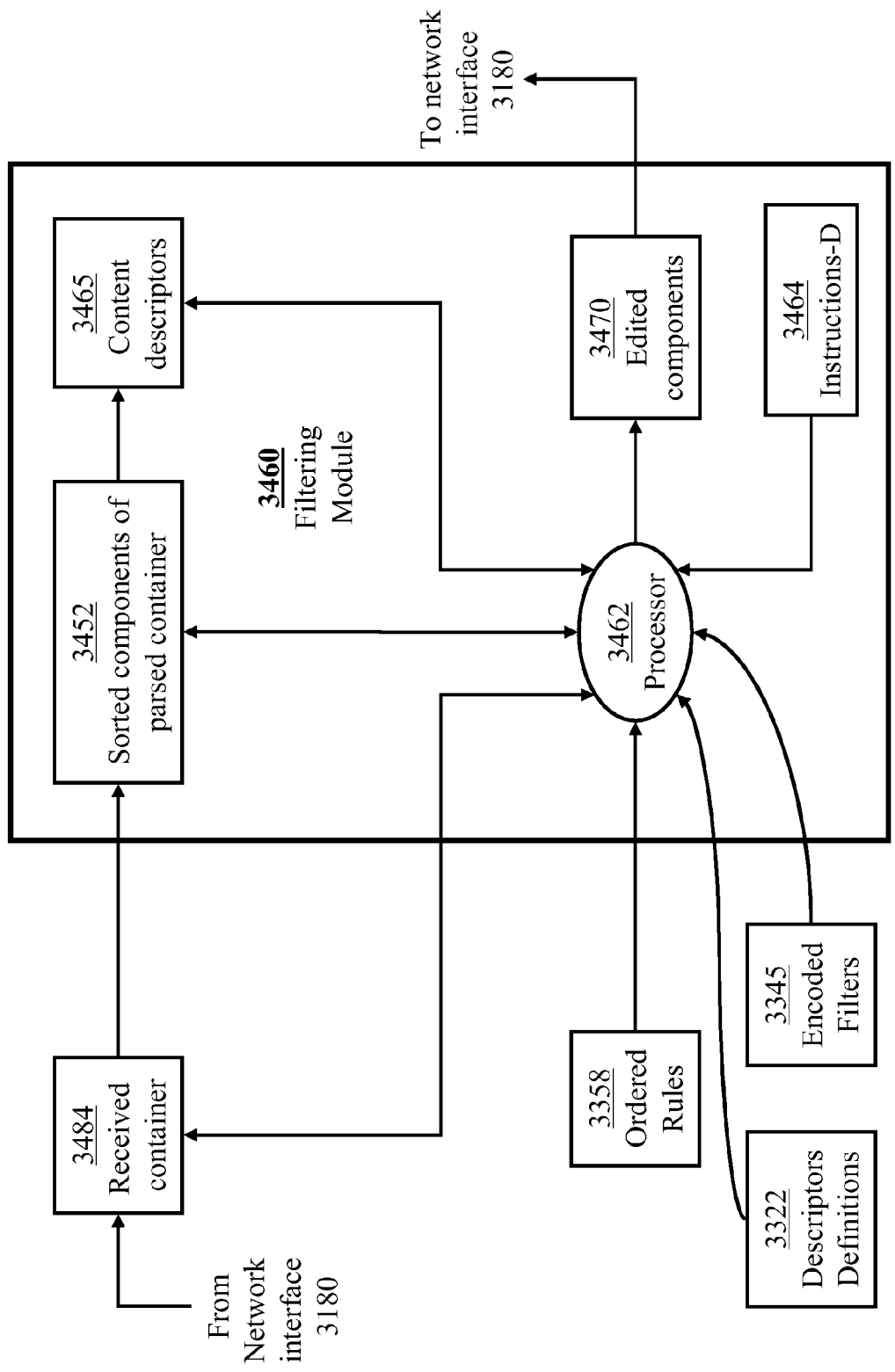
FIG. 34 illustrates an exemplary device for processing data containers of multiple components of different content types using the encoded rules generated by the device of FIG. 33, in accordance with an embodiment of the present invention.

FIG. 34 illustrates a filtering module 3460 for processing data containers of multiple components of different content types using the encoded rules generated by the configuration module of FIG. 33. Filtering module 3460 comprises a processor 3462 and a memory device 3464 storing instructions (labeled instructions-D) which cause processor 3462 to parse each container 3484 received from network-interface module 3180 into constituent components, sort the components according to a user specified component-priority order, and store the sorted components in a memory device 3452. The instructions further cause processor 3462 to: determine a value of each content descriptor of each component, using descriptors' definitions 3322, and store the descriptors' values in a memory device 3465; and apply ordered rules stored in memory 3358, using encoded filters stored in memory device 3345, to produce edited containers 3470 which are transmitted through network interface 3180 to destination.

Configuration module 3240 or 3340 may include a description-memory device for storing a set of action-descriptions where each action-description contains a natural-language description of a corresponding action within the set of actions. The instructions memory 3464 of filtering module 3460 may then store processor-readable instructions which cause processor 3462 to read a description of each action performed on a data container from the description-memory device of configuration module 3340 and insert the description of each action in the data container.

Figure 35:
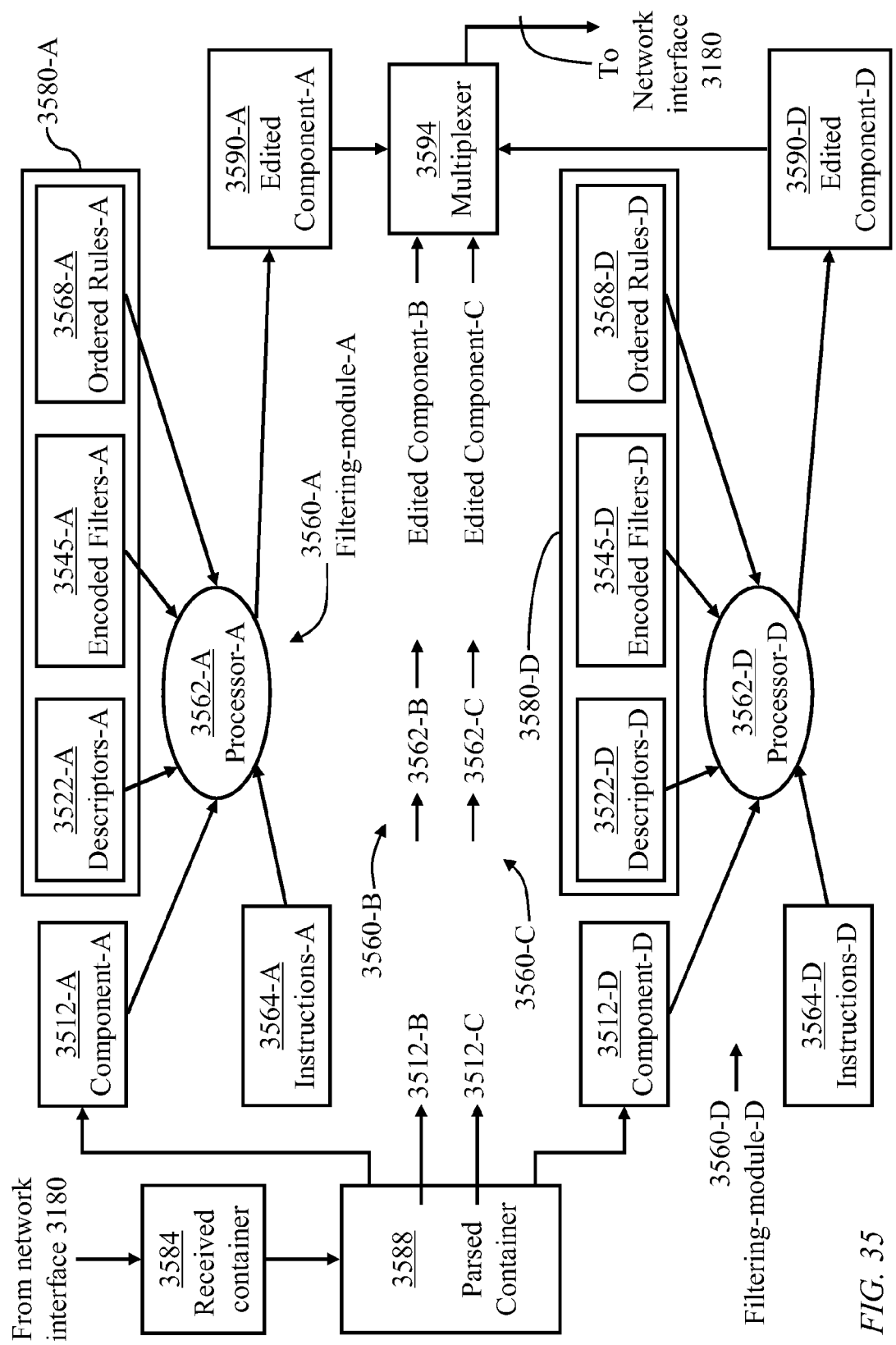
FIG. 35 illustrates an exemplary device for parallel processing of multiple components of a data container using the encoded rules generated by the device of FIG. 33, in accordance with an embodiment of the present invention.

FIG. 35 illustrates an exemplary device for parallel processing of multiple components of a data container using multiple content-specific filtering modules and the encoded rules generated by configuration module 3340 of FIG. 33. The exemplary device of FIG. 35 has four content-specific filtering modules 3560 individually labeled 3560-A, 3560-B, 3560-C, and 3560-D. Network interface 3180 (FIG. 31) receives data containers and places a received data container in a buffer 3584. A module 3588 parses a received data container into components, identifies for each component a content type from among a set of predefined content types, and directs each component to a respective filtering module 3560. FIG. 35 illustrates four buffered components, 3512-A, 3512-B, 3512-C, and 3512-D of a received container.

Each content-specific filtering modules 3560 has a corresponding processor, an instructions memory, and a data-memory. Filtering module 3560-A comprises processor 3562-A, instructions memory 3564-A, and data memory 3580-A. Filtering module 3560-B comprises a processor 3562-B, an instructions memory (not illustrated), and a data memory (not illustrated). Filtering module 3560-C comprises processor 3562-C, an instructions memory (not illustrated), and a data memory (not illustrated). Filtering module 3560-D comprises processor 3562-D, instructions memory 3564-D, and data memory 3580-D.

Component 3512-A of the received container is processed in Filtering module 3560-A. Data memory 3580-A stores, for a first content type: a set of descriptors 3522-A; a set 3545-A of encoded filters, each encoded filter specifying a content descriptor, a descriptor criterion, and an operator; and a set of ordered rules 3568-A where a rule may be encoded as a Boolean expression of binary states of respective filters. Instructions stored in instructions-memory device 3564-A cause processor 3562-A to edit component 3512-A, according to ordered rules 3568-A, to produce an edited component held in a buffer 3590-A.

Likewise, components 3512-B, 3512-C, and 3512-D are processed in Filtering modules 3560-B which handles components of a second content type, 3560-C which handles components of a third content type, and 3560-D which handles components of a fourth content type. Data memory 3580-D stores: a corresponding set of descriptors 3522-D of the fourth content type; a set 3545-D of encoded filters, each encoded filter specifying a content descriptor, a descriptor criterion, and an operator; and a set of ordered rules 3568-D where a rule may be encoded as a Boolean expression of binary states of respective filters. Instructions stored in instructions-memory device 3564-D cause processor 3562-D to edit component 3512-D, according to ordered rules 3568-D, to produce an edited component held in a buffer 3590-D. A multiplexer 3594 combines edited components produced by the four filtering modules to be transmitted to destination through network interface 3180 (FIG. 31).

Any of filtering modules 3560-A, 3560-B, 3560-C, or 3560-D may arrange respective rules into at least one rule tree where each rule has a binary outcome leading to one of two respective actions and, optionally, one of two other rules as will be described with reference to FIGS. 40 to 43.

The user-defined rules' order 3338 (FIG. 33) may be of the form of rule-succession records to be used for determining a hierarchical order of rule processing as will be described with reference to FIGS. 44 to 54.

At least one of filtering modules 3560-A, 3560-B, 3560-C, and 3560-D may perform a signal-processing function on a respective data component. This may be implemented using special-purpose digital circuitry or module processors 3562-A, 3562-B, 3562-C, and 3562-D which would execute respective instructions stored in an associated instructions memory.

Each filtering module determines characteristics of each data component, identifies descriptors of each component from the determined characteristics, determines values of the descriptors, and acquires corresponding descriptor criteria from an associated memory device. A set of filters are then determined, where each filter specifies a content descriptor, a descriptor criterion, and an operator determining a binary state of the filter. The binary values of the set of filters are used to determine values of a set of rules. Each rule is preferably encoded as a Boolean expression of binary states of respective filters. A filtering module edits each component according to respective rules to produce an edited component.

Figure 36:
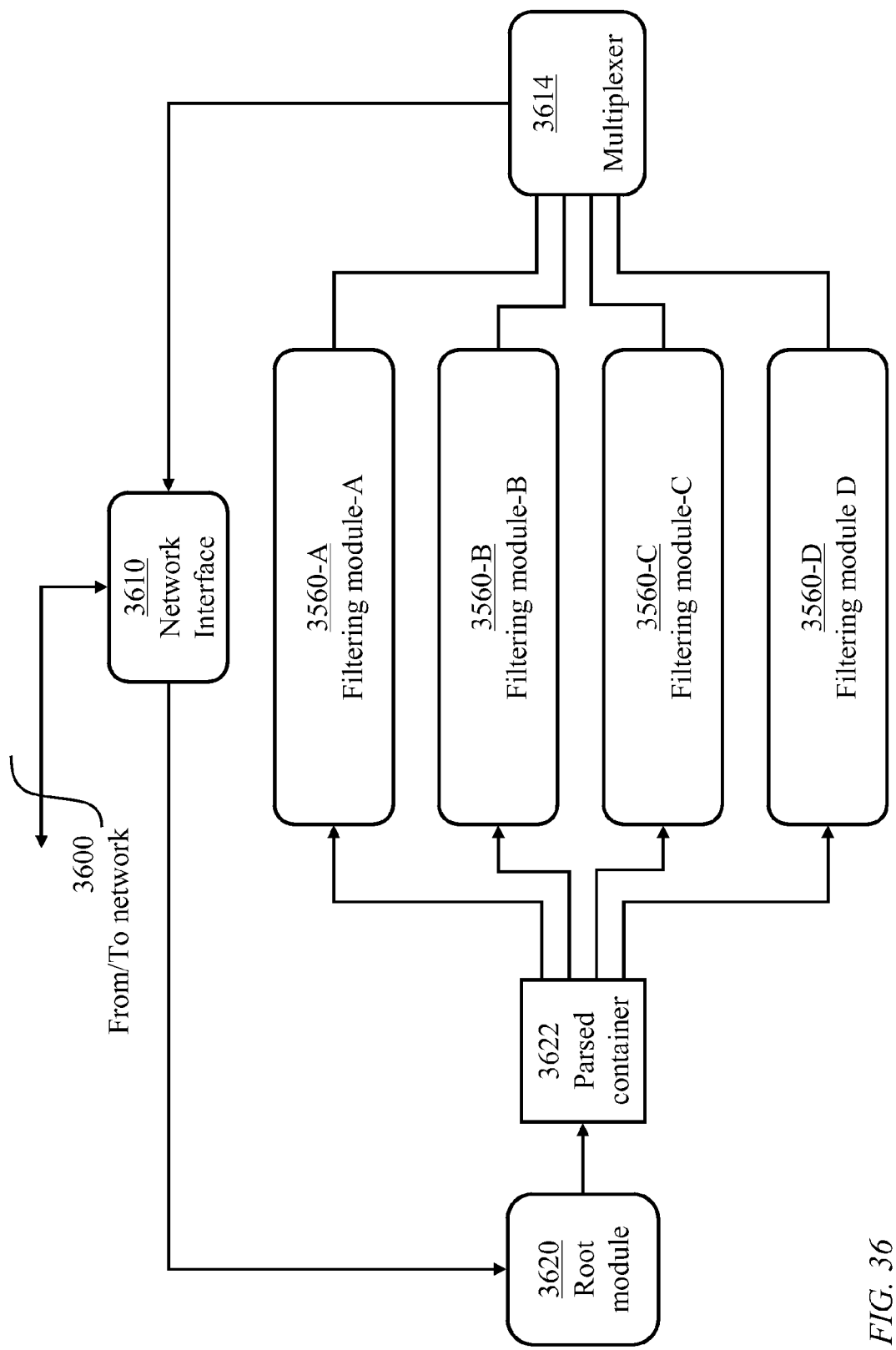
FIG. 36 illustrates a variation of the device of FIG. 35.

In the device of FIG. 35, a data container is parsed into components of different content types and individual components are directed to respective filtering modules. It may be desirable, however, to examine the entire container beforehand to determine if the container meets certain criteria, such as a size limitation or freedom from harmful content. FIG. 36 illustrates a variation of the device of FIG. 35 where a root module 3620, having its own processor, instructions memory, and data memory, applies specific rules to the entire container. The root module 3620 may delete an entire data container, delete a component, or delete an attachment of the data container. The root module 3620 may also parse a data container into its constituent components and determine if any of the components requires transcoding to be compatible with known capabilities of a receiver.

The root module 3620 stores a set of basic rules, applicable to a data container and attachments of the entire data container, and processor-executable instructions which cause the root processor to perform requisite filtering functions.

The device of FIG. 36 may also include an action memory (not illustrated) accessible to the root module and to content-specific filtering modules 3560-A, 3560-B, 3560-C, and 3560-D. The action-memory stores a set of actions where each action is presented as processor-readable instructions for performing a corresponding editing function. The action-memory may also store an array of pointers, indexed by rule identifiers, indicating actions corresponding to each rule of the set of basic rules and each rule of the set of content-specific rules.

The root module 3620 may examine received data containers and perform some or all of the following functions: deleting an attachment; deleting a component; performing a signal-processing function on a component; and appending a notification to the received data container.

The apparatus of FIG. 36 may store, in a central data memory, a superset of rules applicable to all predefined content types in a rules-memory device and a corresponding superset of actions in an actions-memory device. The rules and actions may be encoded as computer-executable instructions. The memory device of a specific filtering module 3560 need only store indices of a set of rules, within the superset of rules, applicable to the specific filtering module and indices of actions, within the superset of actions, corresponding to rules of the set of rules.

Figure 37:
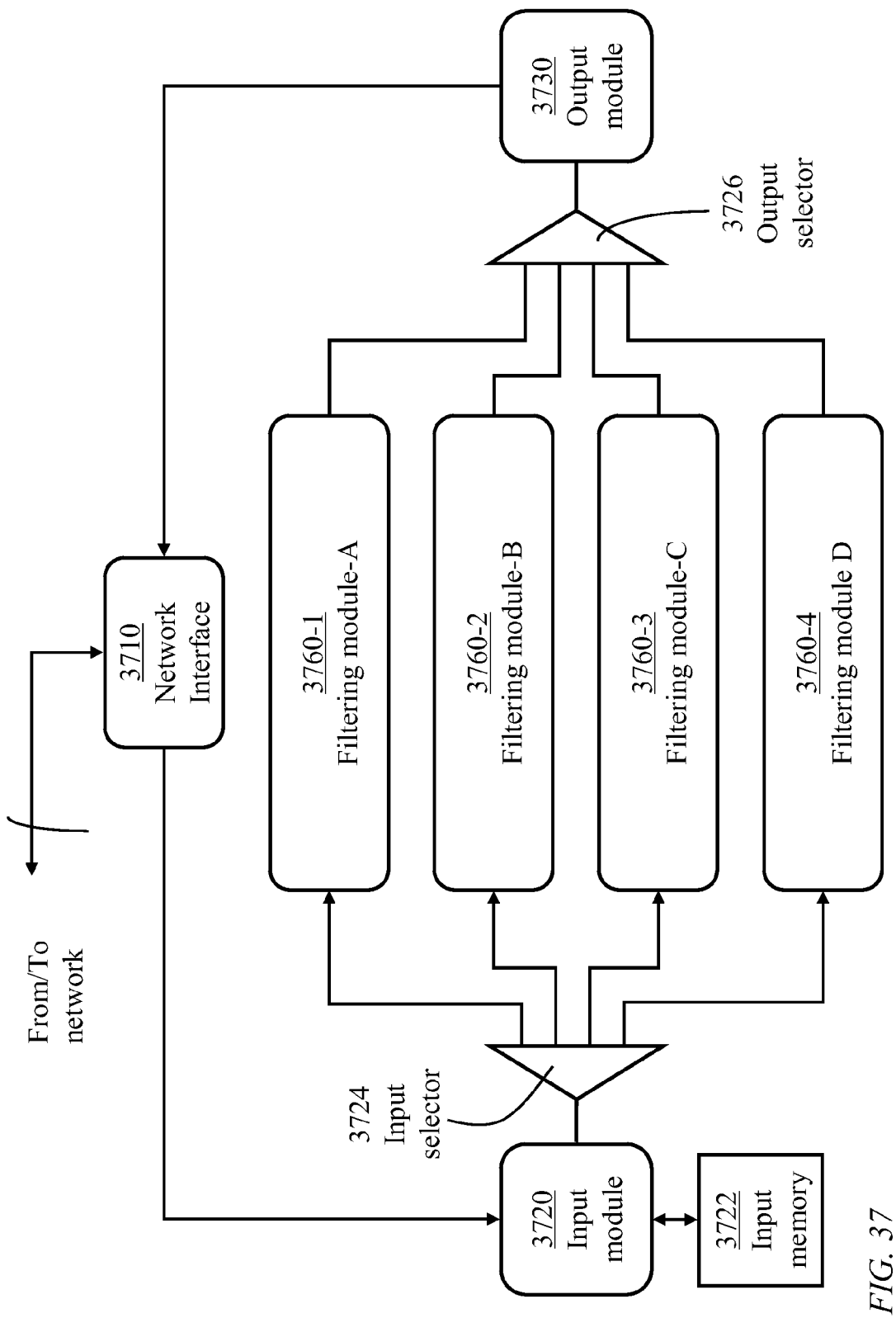
FIG. 37 illustrates an exemplary apparatus employing four filtering modules each of which configured to process components of any of specified content types, in accordance with an embodiment of the present invention.

In the device of FIG. 35 or 36, each filtering module applies to a specific content type and the filtering modules operate concurrently on different components of a data container. It may be desirable, however, to let each module sequentially handle all components of a data container and employ multiple modules to operate concurrently on different data containers. Accordingly, an instructions memory device of each filtering module stores instructions for each specified content type. An advantage of such a scheme is an improved throughput because any filtering module can handle any data container and may immediately process a new data container after completion of processing a current data container. FIG. 37 illustrates an exemplary apparatus employing four filtering modules 3760, individually identified as 3760-1, 3760-2, 3760-3, and 3760-4, each of which being configured to process components of any of specified content types. The four filtering modules are, preferably, identically configured.

Each filtering module 3760 comprises a module processor, a data memory, an instructions memory, and a buffer for holding edited data containers. The constituent elements of filtering modules 3760-1, 3760-2, 3760-3, and 3760-4 are not illustrated in FIG. 37. The data memory stores encoded rules. The instructions memory stores processor-executable instructions which cause a module processor to apply the encoded rules to a data container as a whole and to individual components of the data container to produce an edited data container.

The network interface 3710 receives data containers belonging to multiple data streams and transmits edited data containers over a network link. The input module 3720 holds received data containers in an input memory device 3722 and transfers a data container waiting in the input memory device to an unoccupied filtering module 3760-1, 3760-2, 3760-3, or 3760-4 through an input selector 3724. The output module 3730 transfers an edited data container held in a buffer of a filtering module to the network interface through an output selector 3726. The input selector 3724 and the output selector 3726 may be implemented as parts of the input module 3720 and the output module 3730, respectively.

Figure 38:
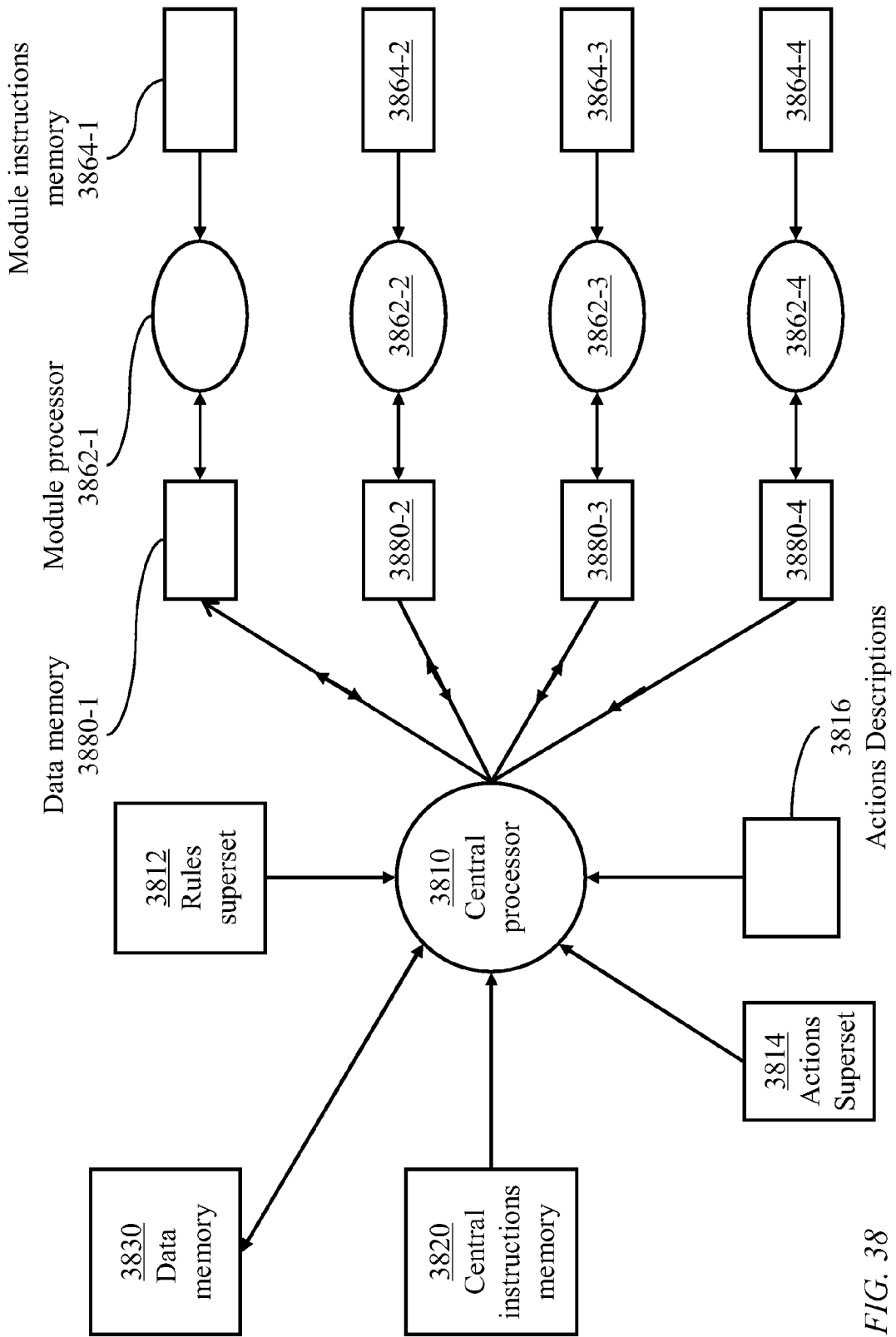
FIG. 38 illustrates a control system for the apparatus of FIG. 37, in accordance with an embodiment of the present invention.

FIG. 38 illustrates a control system for the apparatus of FIG. 37. The control system comprises a central processor 3810, a central data memory 3830, and a central instructions memory 3820 storing processor-executable instructions which cause the central processor 3810 to perform the functions of a network interface 3710, an input module 3720, and an output module 3730 (FIG. 37).

The central instructions memory 3820 may store input-module instructions which cause the central processor 3810 to affix a label to each received data container for identifying a data stream to which each received container belongs as well as a cyclic container number within the data stream. The central instructions memory 3820 may store output-module instructions which cause the central processor to use affixed labels to arrange edited data containers of each data stream in a sequential order of corresponding received data containers.

Each of filtering modules 3760-$j$, $1 \leq j \leq 4$, has a module processor 3862-$j$, a module instructions memory 3864-$j$, and a data memory 3880-$j$. The central processor 3810 communicates with the module processors 3862-1, 3862-2, 3862-3, and 3862-4 through the data memory devices 3880-1, 3880-2, 3880-3, and 3880-4 respectively. An instructions memory 3864-$j$ of a filtering module 3760-$j$ stores instructions which cause a corresponding module processor 3862-$j$ to sort the encoded rules into sets of content-specific rules and container-based rules and further sort rules within each set of content-specific rules into hierarchical strata as will be described with reference to FIGS. 44 to 54.

The central instructions memory 3820 may also store input-module instructions which cause the central processor 3810 to parse each received data container into constituent components of different content types and insert indications, in a respective label, of the position of each component within a received data container. Alternatively, data-container parsing may be implemented by each filtering module 3760 where stored instructions causing a module processor 3862 to parse a data container transferred from the input module into constituent components of different content types.

A data container may include a component requiring signal processing such as compression to reduce the components size or transcoding for compatibility with a receiver at destination. Such function is preferably performed in the input module 3720. The central instructions memory 3820 may store processor-readable instructions which cause the central processor 3810 to identify a particular data component requiring signal processing and apply a respective signal-processing function.

A data container may include attachments and it may be desirable to examine and, where necessary, edit an attachment. This may be performed in the input module 3720. Thus, the central instructions memory 3820 may store processor-readable instructions which cause the central processor 3810 to detect attachments of a received data container and, where an attachment is found, apply respective encoded rules.

A description memory device 3816 stores a set of action descriptions, where each action-description contains a natural-language description of a corresponding action within a predefined set of actions. The central instructions memory 3820 may then store processor-executable instructions which cause central processor 3810 to read a description of each action performed on each data container from the description memory device 3816 and insert the description of each action in a respective data container.

Figure 39:
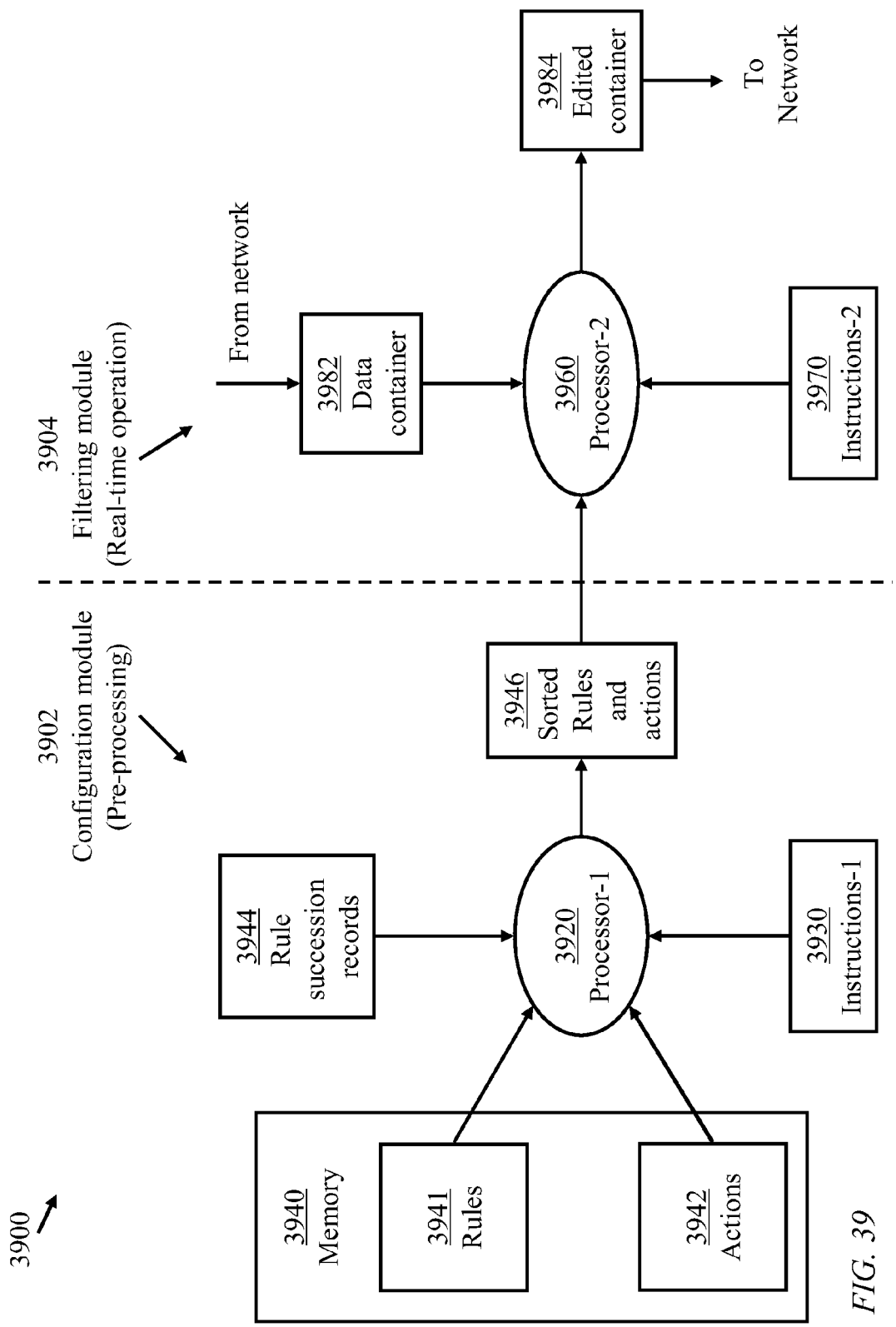
FIG. 39 illustrates an apparatus for filtering data containers, in accordance with an embodiment of the present invention.

FIG. 39 illustrates an apparatus 3900 for filtering data containers. The apparatus comprises a configuration module 3902 and a filtering module 3904. Configuration module 3902 performs "off-line" preprocessing of configuration data. Filtering module 3904 processes data containers in "real-time".

Configuration module 3902 comprises a configuration processor 3920, an instructions memory device 3930 (labeled "Instructions-1"), a data memory device 3940 storing encoded rules and actions, a memory device 3944 storing rule-succession records, and a memory device 3946 for holding sorted rules, or pointers to sorted rules, and corresponding actions.

Memory device 3940 is partitioned into a memory section 3941 storing a set of rules, each rule encoded as a set of processor-executable instructions and evaluates to a binary value, and a memory section 3942 storing a set of actions, each action encoded as a set of processor-executable instructions for editing a data component.

Memory device 3944 stores a set of rule-succession records, each rule succession record corresponding to a specific rule and contains indicator of a first action and a first succeeding rule corresponding to a value of "0" of the specific rule, and indicators of a second action and a second succeeding rule corresponding to a value of "1" of the specific rule.

Instructions memory device 3930 stores processor readable instructions which cause configuration processor 3920 to produce sorted rules and store the sorted rules in memory device 3946. The sorted rules may be arranged in rule strata where rules within each rule stratum are independent of each other and rules within each rule stratum beyond a first stratum depend on at least one rule of at least one preceding rule stratum. Alternatively, the sorted rules may be presented in the form of a rule binary tree indicating for each rule a first action corresponding to a value of "0" of the rule and a second action corresponding to a value of "1" of the rule.

Filtering module 3904 has a filtering processor 3960 for real-time processing of data containers, an instructions memory 3970 (labeled "Instructions-2"), a buffer 3982 for holding data containers received from a network, and a buffer 3984 for holding data containers edited according to rules stored in memory 3946. Instructions memory 3970 stores processor readable instructions which cause filtering processor 3960 to sequentially apply the sorted rules to data containers.

Apparatus 3900 may employ a description memory device (not illustrated), similar to memory device 3816 of FIG. 38, for storing a set of action-descriptions. Instructions memory device 3970 may then store processor-executable instructions which cause filtering processor 3960 to read a description of each action performed on each data container from the description memory device and insert the description of each action in a data container.

Figure 40:
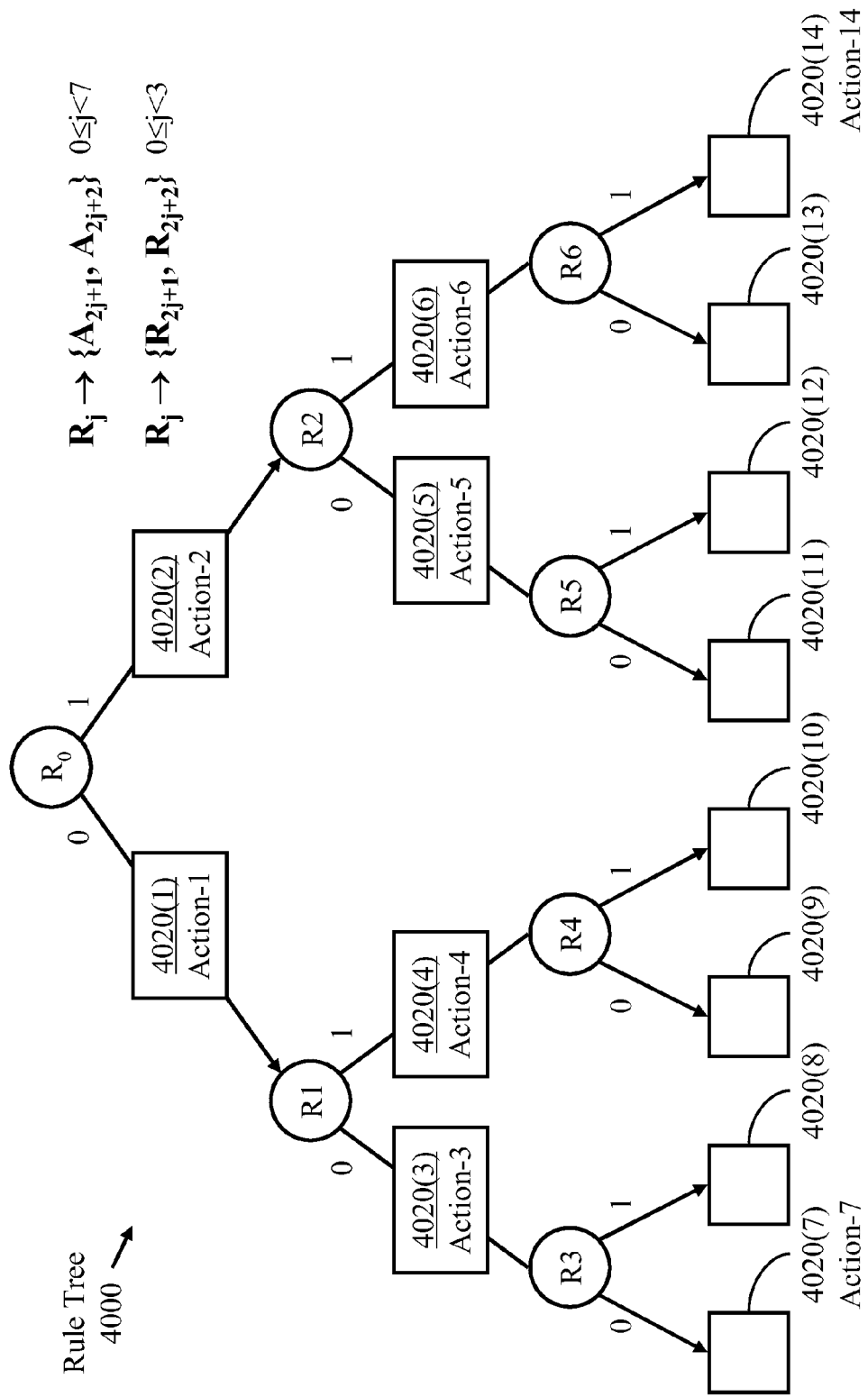
FIG. 40 illustrates an arrangement of the encoded rules generated by the device of FIG. 33 in the form of a complete rule tree in which a rule has a binary outcome and is followed by one of two actions and one of two other rules, where each leaf rule is a null rule having no successive rules and requiring no action, in accordance with an embodiment of the present invention.

FIG. 40 illustrates an arrangement of the encoded rules generated by the configuration device of FIG. 33 in the form of a complete rule tree 4000 in which a rule has a binary outcome and is followed by one of two actions and one of two other rules, where each leaf rule is a null rule (not illustrated) having no successive rules and requiring no action.

For a complete rule tree of depth d (d=3 in the rule tree of FIG. 40), the number $\mu$ of rules, excluding the null rules, is $\mu = (2^d - 1)$ and the number of actions is double the number of rules. The maximum number of rules applied to any data component is, however, equal to d, and similarly the maximum number of actions applied to any data component is d. With the $\mu$ rules labeled as $R_0$ to $R_{\mu-1}$, and the $2 \times \mu$ actions labeled as $A_1$ to $A_{2\mu}$, a rule $R_j$, $0 \leq j < \mu$, is followed by one of two actions $A_{2j+1}$ or $A_{2j+2}$, and a rule $R_j$, $0 \leq j < (2^{d-1} - 1) = (\mu - 1)/2$, proceeds to one of two rules $R_{2j+1}$ and $R_{2j+2}$. It is noted that more than one rule may lead to a same succeeding rule and multiple rules may result in a same action. Thus, the number of unique rules and the number of unique actions do not necessarily bear any specific relationship to each other.

It is noted that the notations Rj and $R_j$, j>0, are used synonymously to denote a rule of index j.

The filtering module applies action-1 (4020-1) and determines a value of rule R1 if the value of root rule R0 is "0".

Otherwise, if the value of root rule R0 is "1", the filtering module applies action-2 (4020-2) and determines the value of rule R2. Similarly, rule R1 leads to either action-3 (4020-3) and rule R3, or action-4 (4020-4) and rule R4. Rule R2 leads to either action-5 (4020-5) and rule R5, or action-6 (4020-6) and rule R6. Rule R3 leads to either action-7 (4020-7) or action-8 (4020-8), rule R4 leads to either action-9 (4020-9) or action-10 (4020-10), rule R5 leads to either action-11 (4020-11) or action-12 (4020-12), and rule R6 leads to either action-13 (4020-13) or action-14 (4020-14). Each of action-7 to action-14 is followed by a null rule R* (not illustrated).

Figure 41:
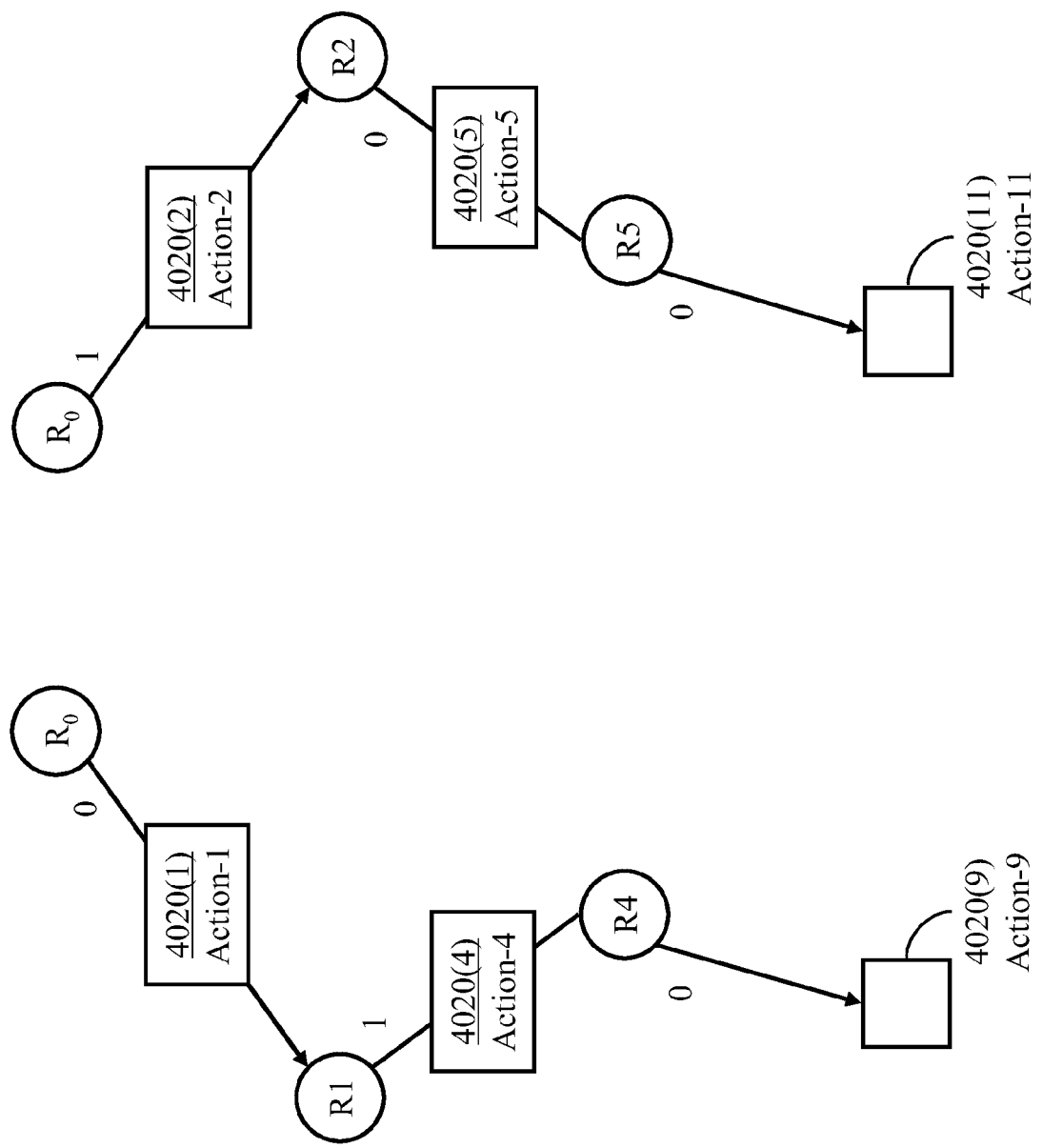
FIG. 41 illustrates two paths traversing the rule tree of FIG. 40.

FIG. 41 illustrates a first case where root rule R0 has a value of "0", leading to action-1 (4020-1) and rule R1. Rule R1 has a value of "1" leading to action-4 (4020-4) and rule R4, and rule R4 has a value of "0" leading to action-9 (4020-9). In a second case, the value of R0 is "1" leading to action-2 (4020-2) and rule R2, the value of rule R2 is "0" leading to action-5 (4020-5) and rule R5, and the value of R5 is "0" leading to action-11 (4020-11).

Figure 42:
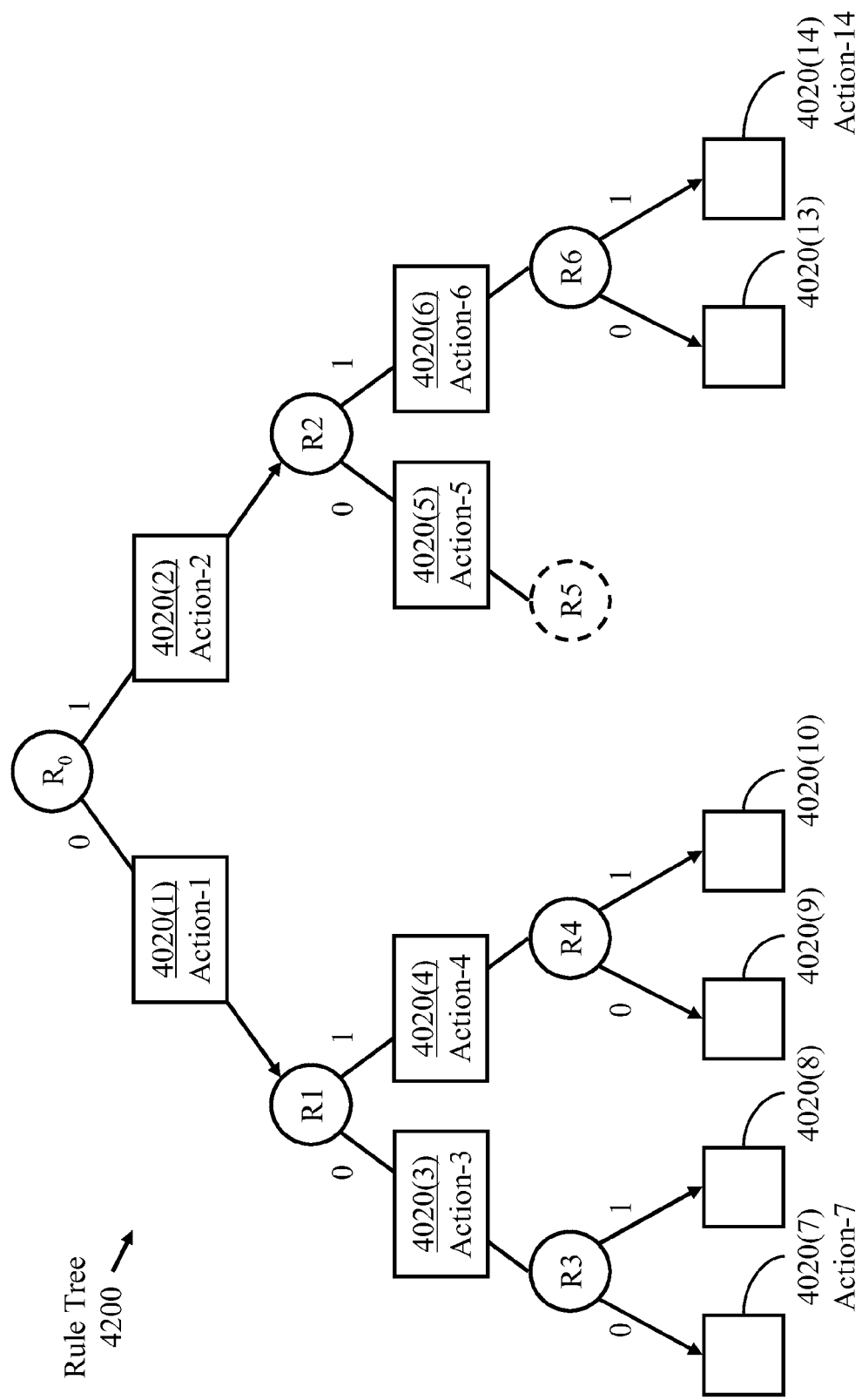
FIG. 42 illustrates an incomplete rule tree derived from the complete rule tree of FIG. 40 with one rule followed by a valid rule and a null rule.

FIG. 42 illustrates an incomplete rule tree 4200 derived from the complete rule tree of FIG. 40 where rule R5 is designated as a null rule, thus actions 4020(11) and action 4020(12) are not applicable. Rule R2 leads to only one valid rule, R6, when the value of R2 is "1".

Figure 43:
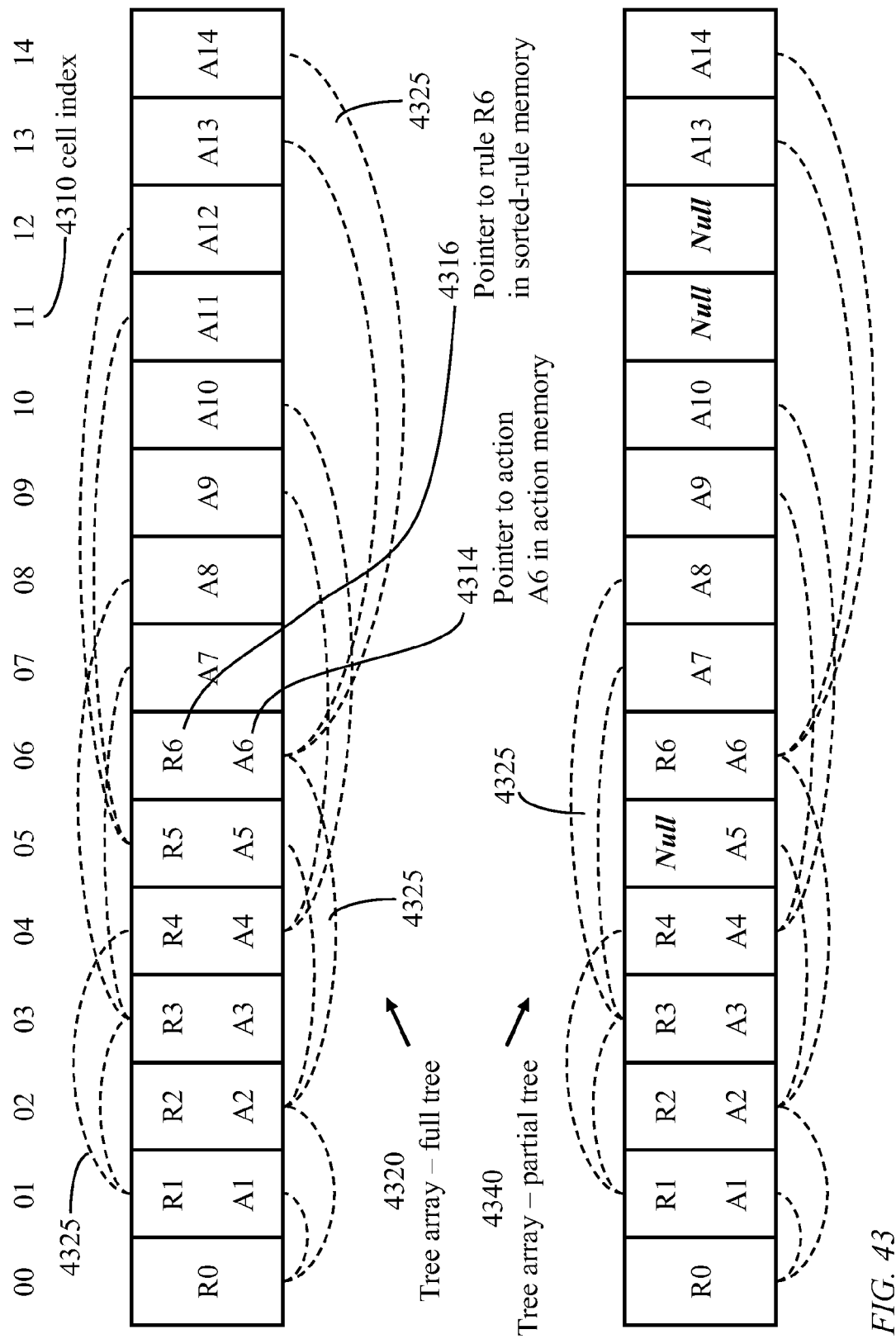
FIG. 43 illustrates an exemplary a canonical data structure representing a complete rule tree, with adaptation to an incomplete rule tree using null entries, in accordance with an embodiment of the present invention.

FIG. 43 illustrates a canonical structure representing the complete rule tree of FIG. 40 for $\mu$ rules labeled as $R_0$ to $R_{\mu-1}$, and $2\times\mu$ actions labeled as $A_1$ to $A_{2\mu}$, $\mu>1$, using an array 4320 having $(2\times\mu+1)$ cells indexed as 0 to $2\times\mu$. The cell indices for $\mu=7$ are 0 to 14 as indicated (reference numeral 4310). A cell in array 4320 of index j, $0\le j<\mu$, stores a pointer (reference numeral 4316) to an encoded rule in a memory device (not illustrated) storing sorted rules. A cell in array 4320 of index j, $1\le j<2\times\mu$, stores a pointer (reference numeral 4314) to an encoded action in a memory device (not illustrated) storing a list of actions. A cell in array 4320 of index j, $0\le j<\mu$, leads to two cells of indices (2j+1) and (2j+2) as indicated by lines 4325. The cell of index j=0 stores an identifier of the root rule R0 and leads to cells of indices 1 and 2. The cell of index j=1 stores pointers to action A1 and rule R1 and leads to cells of indices 3 and 4. The cell of index j=2 stores pointers to action A2 and rule R2 and leads to cells of indices 5 and 6 ($2\times 2+1$ and $2\times 2+2$). The cell of index j=3 stores pointers to action A3 and rule R3 and leads to cells of indices 7 and 8 ($2\times 3+1$ and $2\times 3+2$). The cell of index j=4 stores pointers to action A4 and rule R4 and leads to cells of indices 9 and 10 ($2\times 4+1$ and $2\times 4+2$). The cell of index j=5 stores pointers to action A5 and rule R5 and leads to cells of indices 11 and 12. The cell of index j=6 stores pointers to action A6 and rule R6 and leads to cells of indices 13 and 14. The cells of indices 7 to 14 store pointers to actions A7 to A14.

Array 4340 corresponds to the incomplete rule tree of FIG. 42 in which rule R5 is a null rule. Thus, the cell of index 5 in array 4340 provides a final action A5 and does not lead to any other cell.

Figure 44:
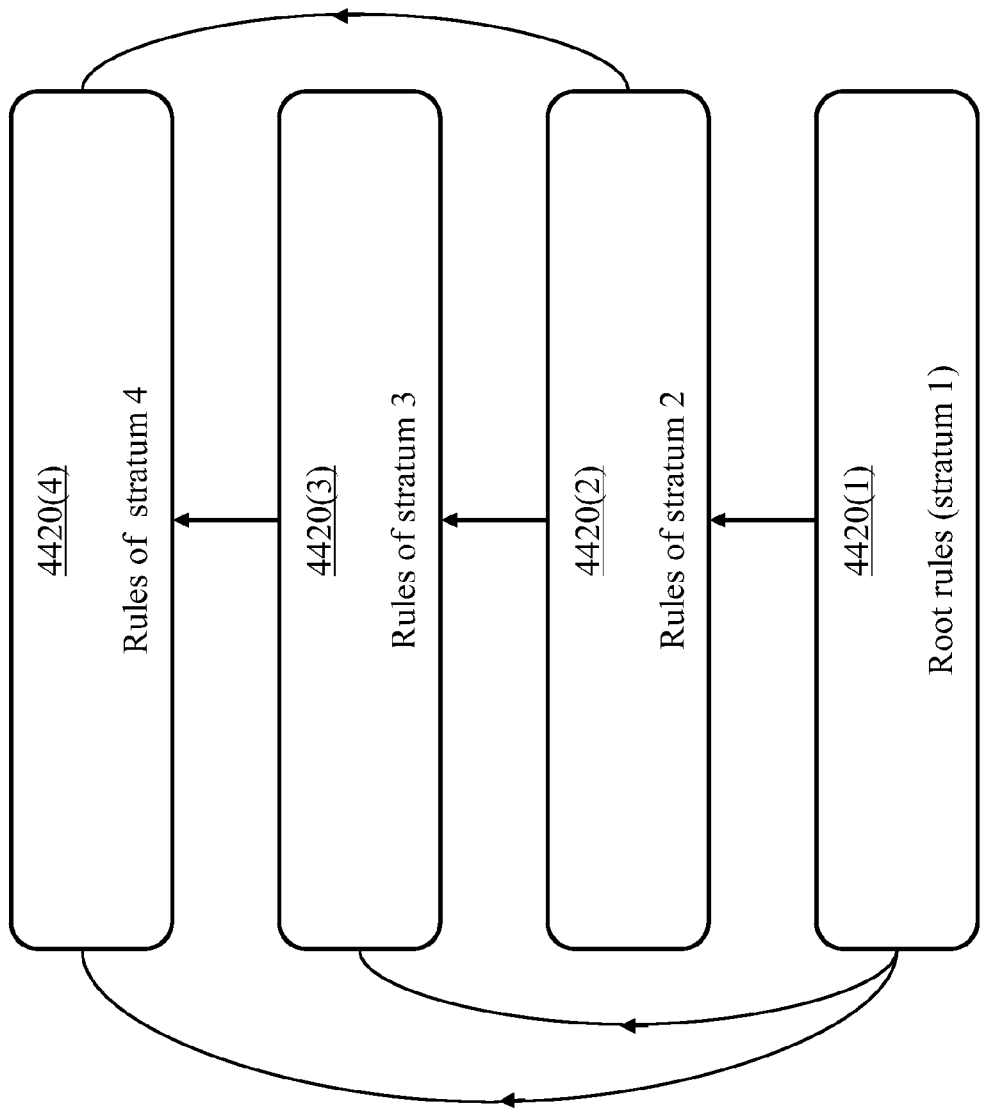
FIG. 44 illustrates an arrangement of the encoded rules generated by the configuration device of FIG. 33 in multiple rule strata where rules within a rule stratum are independent of each other and rules of a rule stratum beyond a first rule stratum depend on rules of preceding rule strata, in accordance with an embodiment of the present invention.

FIG. 44 illustrates an arrangement of the encoded rules generated by the configuration device of FIG. 33 in multiple rule strata, where rules within a rule stratum are independent of each other and rules of a stratum beyond a first rule stratum (root stratum) depend on rules of preceding rule strata. FIG. 44 illustrates four rule strata 4420(1), 4420(2), 4420(3), and 4420(4)—also labeled stratum 1, stratum 2, stratum 3, and stratum 4 respectively. A rule which does not depend on any other rule is herein called an independent rule or free rule. Independent rules are root rules and are selected to form stratum 1. Rules which are independent of each other but depend on rules of stratum 1 form stratum 2. Rules which are independent of each other but depend on rules of stratum 2—and possibly stratum 1—form stratum 3. Rules, which are independent of each other, but depend on rules of stratum 3—and possibly stratum 2 or stratum 1—form stratum 4.

Figure 45:
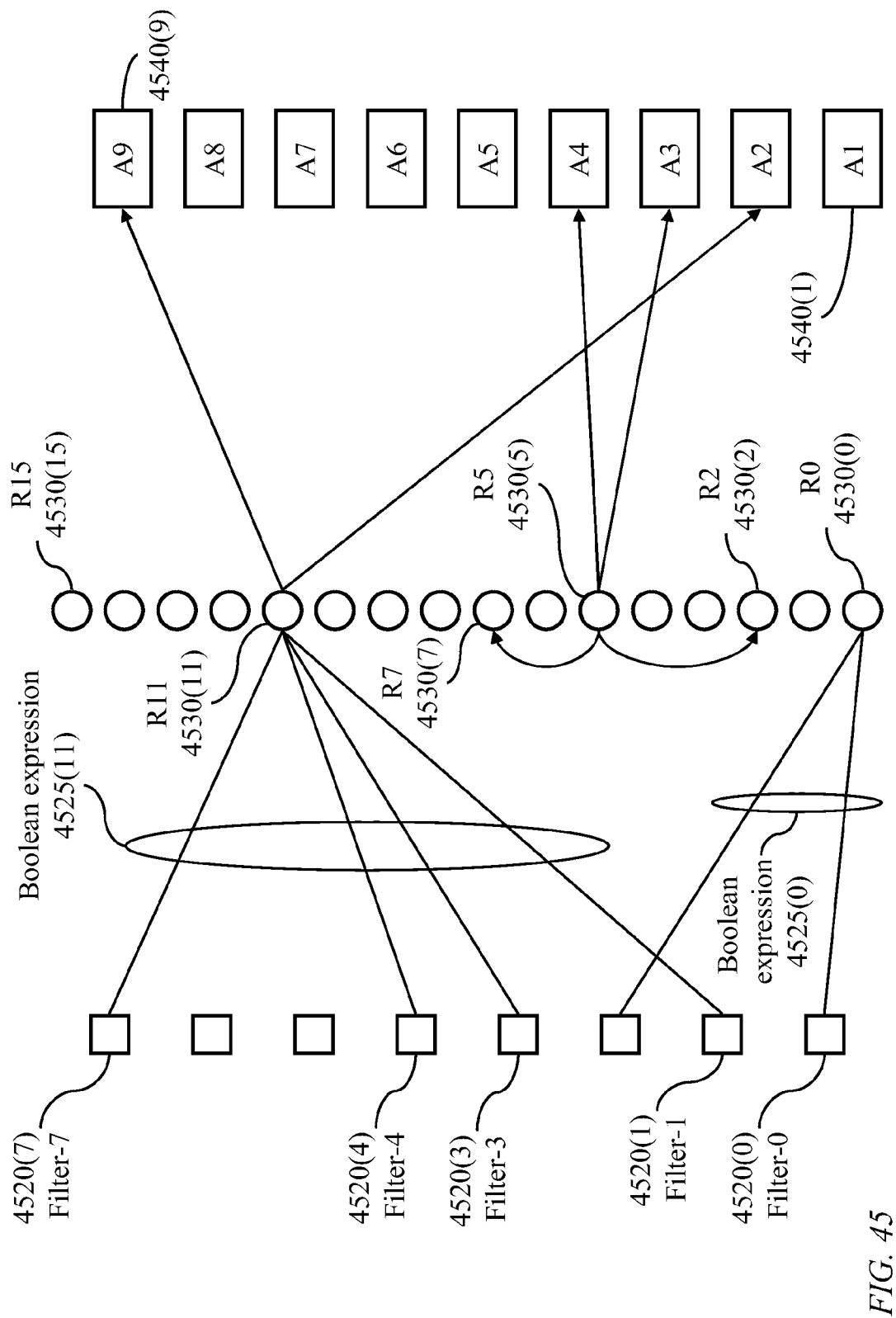
FIG. 45 illustrates a first rule in an intermediate stratum of the multiple-strata arrangement of FIG. 44, the first rule leading to one of two actions and succeeded by one two other rules, and a second rule in a last stratum leading to one of two actions but having no successor rules.

FIG. 45 illustrates an exemplary filtering module 3160 (FIG. 31) employing eight filters 4520, individually identified as 4520(0) to 4520(7), sixteen rules 4530, individually identified as 4530(0) to 4530(15), and nine actions 4540, individually identified as 4540(1) to 4540(9) and labeled A1 to A9. In this example, rule R0 is a Boolean function 4525(0) of two filters, 4520(0) and 4520(2) while rule R11 is a Boolean function 4525(11) of four filters 4520(1), 4520(3), 4520(4), and 4520(7). Rule, R5, in an intermediate rule stratum of the multiple-strata arrangement of FIG. 44, leads to one of two actions, A3 or A4, and one of two other rules, R2 and R7. A rule in a last rule stratum leads to one of two actions but has no successor rules. For example, rule R11 leads to one of two actions A2 and A9 but does not lead to other rules.

FIG. 46 illustrates an exemplary user-specified rule succession table 4600 having multiple rule records 4610, each rule record 4610 indicating a current rule 4620 having a binary outcome of "false" or "true". An action 4621 and a succeeding rule 4622 correspond to an outcome of "false". An action 4623 and a succeeding rule 4624 correspond to an outcome of "true". Rule succession table 4600 may be used in sorting the encoded rules generated by the configuration device of FIG. 33 in multiple rule strata as illustrated in FIG. 44. A symbol $\phi$ in table 4600 refers to a null rule.

Figure 47:
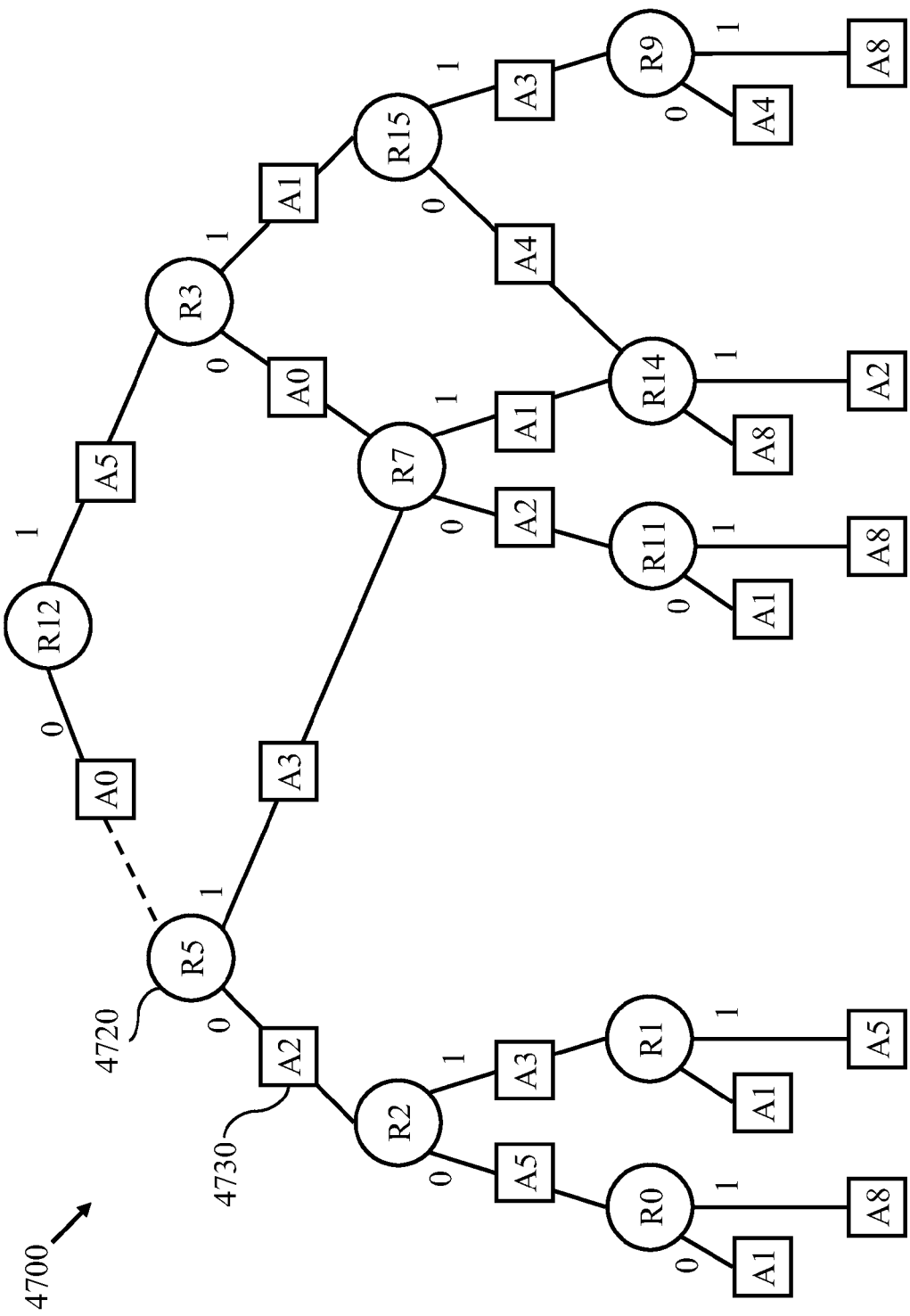
FIG. 47 illustrates a rule graph corresponding to the rule succession table of FIG. 46.

FIG. 47 illustrates a rule graph 4700 constructed using the rule succession table 4600 of FIG. 46. As indicated in succession table 4600, rule R12 leads to either of rules R5 or R3 but is not a successor of any other rule. Thus, rule R12 is a root rule. Rule graph 4700 covers 11 rules: R0, R1, R2, R3, R5, R7, R9, R11, R12, R14, and R15. Notably, rule graph 4700 may represent the rule succession table 5100 of FIG. 51 if the line connecting action A0 to rule R5, which is illustrated as a dotted line, is removed.

Figure 48:
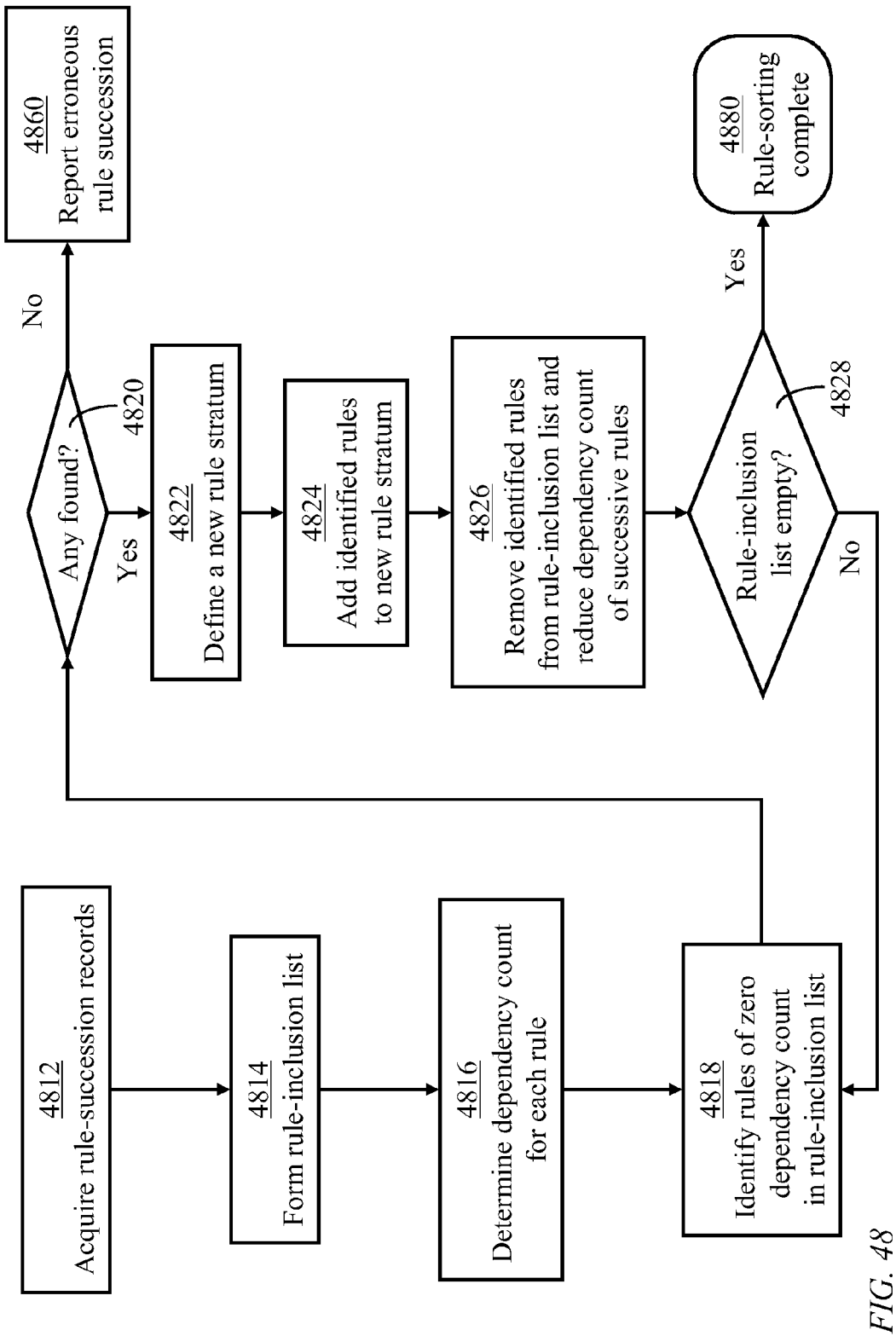
FIG. 48 is a flow chart illustrating a general method of sorting the encoded rules generated by the configuration device of FIG. 33 in the multiple rule strata of FIG. 44, in accordance with an embodiment of the present invention.

FIG. 48 is a flow chart illustrating a general method of sorting the encoded rules generated by the configuration device FIG. 33 in the multiple rule strata illustrated in FIG. 44. In step 4812, rule-succession records are received. Each rule succession record corresponds to a specific rule within a set of rules and indicates: (1) a first action and a first succeeding rule corresponding to a value of 0 ("false") of the specific rule; and (2) a second action and a second succeeding rule corresponding to a value of 1 ("true") of the specific rule. Step 4814 forms a rule-inclusion list which includes a rule identifier of each rule referenced in each rule succession record. Step 4816 determines a dependency count for each rule, where the dependency count of a specific rule indicates a number of rules directly preceding the specific rule.

Step 4818 identifies specific rules within the rule-inclusion list having zero dependency count. If step 4820 determines that no rules of zero dependency count are found, step 4860 reports erroneous data. Otherwise, if step 4820 determines that at least one rule has a zero dependency count, step 4822 defines a new rule stratum, starting with stratum 1. Step 4824 adds an identifier of each rule of zero dependency count to the new stratum and step 4826 removes the identifier from the rule-inclusion list and reduces dependency count of each of the first succeeding rule and the second succeeding rule by 1. If step 4828 determines that the rule-inclusion list is empty, the rule-sorting process is considered to be complete (step 4880). Otherwise, step 4818 is revisited to identify rules of a subsequent rule stratum.

Figure 49:
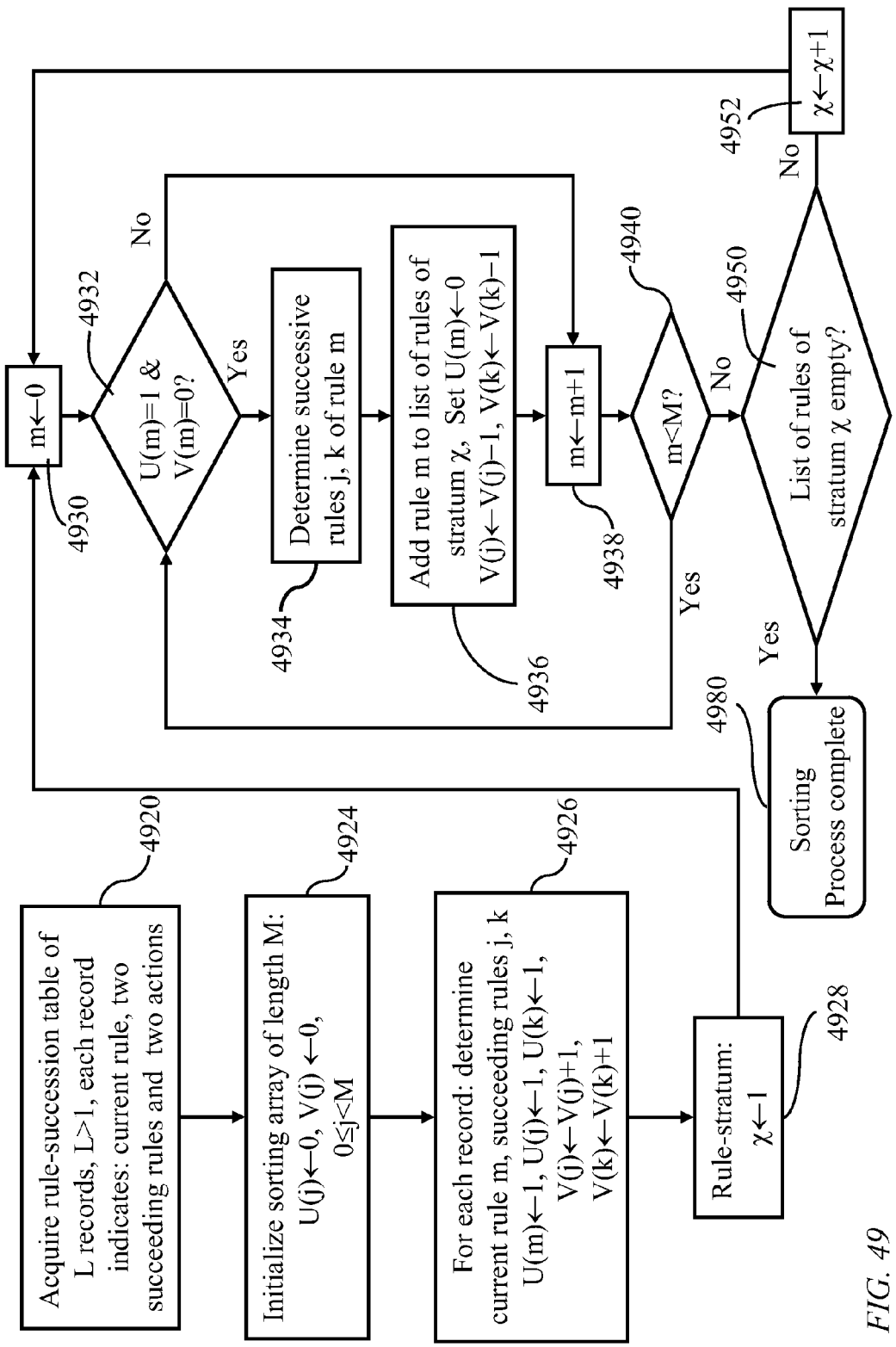
FIG. 49 is a flow chart illustrating an exemplary implementation of the method of FIG. 48, in accordance with an embodiment of the present invention.

FIG. 49 is a flow chart illustrating an exemplary implementation of the method of FIG. 48 applied to a set of M rules, M>1. In step 4920, processor-readable instructions stored in memory device 3350 cause processor 3342 (FIG. 33) to acquire a rule-succession table including a number L, L>1, of rule-succession records (FIG. 46) from a user. The number L of rule-succession records is less than or equal to the number M of rules in the set of rules because some rules may not apply to a data component under consideration. Each record includes: an identifier of a parent rule; a first action and a first successor rule corresponding to a value "false" of the parent rule; and a second action and a second successor rule corresponding to a value "true" of the parent rule. The rules are identified by indices 0 to (M−1). Some rules may not be considered and, therefore, not referenced in any of the rule-succession records. In step 4924, two arrays U and V, each having M integer entries, are initialized with all entries set to zero. In step 4926, an identifier m of a parent rule and identifiers j and k of successor rules of each record are determined and used to mark array U so that U(m)=1, U(j)=1 if rule j is a valid rule, and U(k)=1 if rule k is a valid rule. Thus, an entry U(y), 0≤y<M, is set to equal 1 if rule y is encountered at least once in the succession records. An entry V(y) indicates the number of times rule y is encountered as a successor rule. Thus, step 4926 increases entry V(j) by 1, if rule j is a valid rule, and increases entry V(k) by 1, if rule k is a valid rule. Array U serves as a rule-inclusion list and array V indicates a dependency count for each rule in the rule-inclusion list, where the dependency count for a particular rule is a number of rules directly preceding the particular rule.

Step 4928 sets an index χ of the current rule stratum to 1. Step 4930 sets an index m of a parent rule to zero. If step 4932 determines that U(m)=0 or V(m)>0, the index m is increased by 1 in step 4938 and if step 4940 determines that m is less than M, step 4932 is revisited to consider a subsequent entry of array V. If step 4932 determines that U(m)=1 and V(m)=0, then rule m belongs to the current stratum x. Step 4934 then determines successive rules j and k of parent rule m and step 4936 adds rule m to a list of rules of stratum χ, debits entry V(j) by 1, if rule j is a valid rule, and debits entry V(k) by 1, if rule k is a valid rule. Index m is increased by 1 in step 4938 and, if m is less than M, step 4932 is revisited. If index m equal M, step 4940 leads to step 4950. If step 4950 determines that the list of rules in current stratum χ is empty, the process of sorting the rules in hierarchical strata is considered complete (step 4980). Otherwise, the stratum index χ is increased by 1 in step 4952 and step 4930 is revisited to start associating new rules with a new stratum. Notably, each entry of array U has a value of zero, and each entry of array V has a value of zero, after the last rule stratum is determined and this property may be used to indicate completion of the sorting process.

FIG. 50 illustrates the method of FIG. 48, with the implementation of FIG. 49 using rule succession table 4600. In the exemplary rule-succession table of FIG. 46, the rule identifiers range from 0 to 15 and are indicated as such in FIG. 50 (reference numeral 5010). Each of entries U(j) and V(j), 0≤j<16, is set to equal 0 (step 4924). Rules of indices 4, 6, 8, 10, and 13 (R4, R6, R8, R10, and R13) are not listed in table 4600 and each corresponding entry in array U is set to equal 0 while each other entry is set to equal 1 according to step 4926 of FIG. 49. The first record in table 4600 indicates that rules 2 and 7 are successive rules. Thus, each of entries V(2) and V(7) is increased by 1. Likewise, the second record indicates that rules 11 and 14 are successive rules, hence each of V(11) and V(14) is increased by 1. After considering all records, array V has an entry of 1 for each of rules 0, 1, 2, 3, 5, 9, 11, and 15 and an entry of 2 for each of rules 7 and 14. Each of the entries in array V corresponding to absent rules 4, 6, 8, 10, and 13 has the initialized value of 0. Arrays U and V then take the form 5020(1).

Starting with stratum 1 (step 4928) and scanning entries U(m) and V(m), starting with m=0 (step 4930), step 4932 indicates that only rule 12 satisfy the condition U(12)=1 and V(12)=0. Thus, rule 12 is the only rule in stratum 1 (χ=1). Step 4934 determines (from table 4600) that rules 5 and 3 are the successive rules of rule 12 and step 4936 resets entry U(12) to 0 and reduces each of entries V(3) and V(5) by 1. Arrays U and V then take the form 5020(2). Step 4950 determines that the list of rules of stratum 1 is not empty (it contains rule 12), hence the stratum index χ is increased by 1 (step 4952) and step 4930 is revisited.

Scanning arrays U and V indicates that rule 3 satisfies the condition of step 4932 (U(3)=1 and V(3)=0). The successor rules of rule 3 are rules 7 and 15 (step 4934, table 4600) and step 4936 sets U(3) to 0 and reduces each of V(7) and V(15) by 1. Continuing the scan of arrays U and V indicates that rule 5 satisfies the condition of step 4932 (U(5)=1 and V(5)=0). The successor rules of rule 5 are rules 2 and 7 (step 4934, table 4600) and step 4936 sets U(5) to 0 and reduces each of V(2) and V(7) by 1. Arrays U and V then take the form 5020(3). Thus, rules 3 and 5 are determined to belong to stratum 2.

Step 4950 indicates that the list of rules of stratum 2 is not empty (it contains rules 3 and 5). Thus, the stratum index is increased by 1 in step 4952 and step 4930 is revisited. Continuing the process, rules 2, 7, and 15 are determined to belong to stratum 3 and arrays U and V take the form 5020(3). Step 4950 determines that the list of rules of stratum 3 is not empty and step 4952 increases the stratum index to 4 (χ=4). Repeating steps 4930 to 4940 determines that rules 0, 1, 9, 11, and 14 belong to stratum 4 and arrays U and V take the form 5020(4) where each entry in array V has a value of 0 and, hence, all rules have been considered. One way to determine completion of the sorting process is to repeat steps 4930 to 4950 for χ=5. Step 4950 would then determine that the list of rules of stratum 5 is empty and terminate the sorting process.

FIG. 51 illustrates a user-specified rule succession table similar to the rule succession table 4600 of FIG. 46 but with rule R12 having only one successor rule, R3. As in succession table 4600, rule R5 has two successor rules R2 and R7 but is not a successor of any other rule. Thus, both rules R5 and R12 are root rules.

FIG. 52 illustrates application of the method of FIG. 48, with the implementation of FIG. 49, using rule succession table of FIG. 51. In the exemplary rule-succession table of FIG. 51, the rule identifiers range from 0 to 15 and are indicated as such in FIG. 52 (reference numeral 5210). Following steps similar to those described above with reference to FIG. 50, the rules are sorted into four strata where stratum 1 contains rules R5 and R12, stratum 2 contains rules R2 and R3, stratum 3 contains rules R0, R1, R7, and R15, and stratum 4 contains rules R9, R11, and R14. Thus, rules R5 and R12 may be applied first, starting with either R5 or R12. Rules R2 and R3 may be applied subsequently in either order (R2 then R3 or R3 then R2). Rules R0, R1, R7, and R15 may then be applied in any order. Finally, rules R9, R11, and R14 may be applied in any order.

Figure 53:
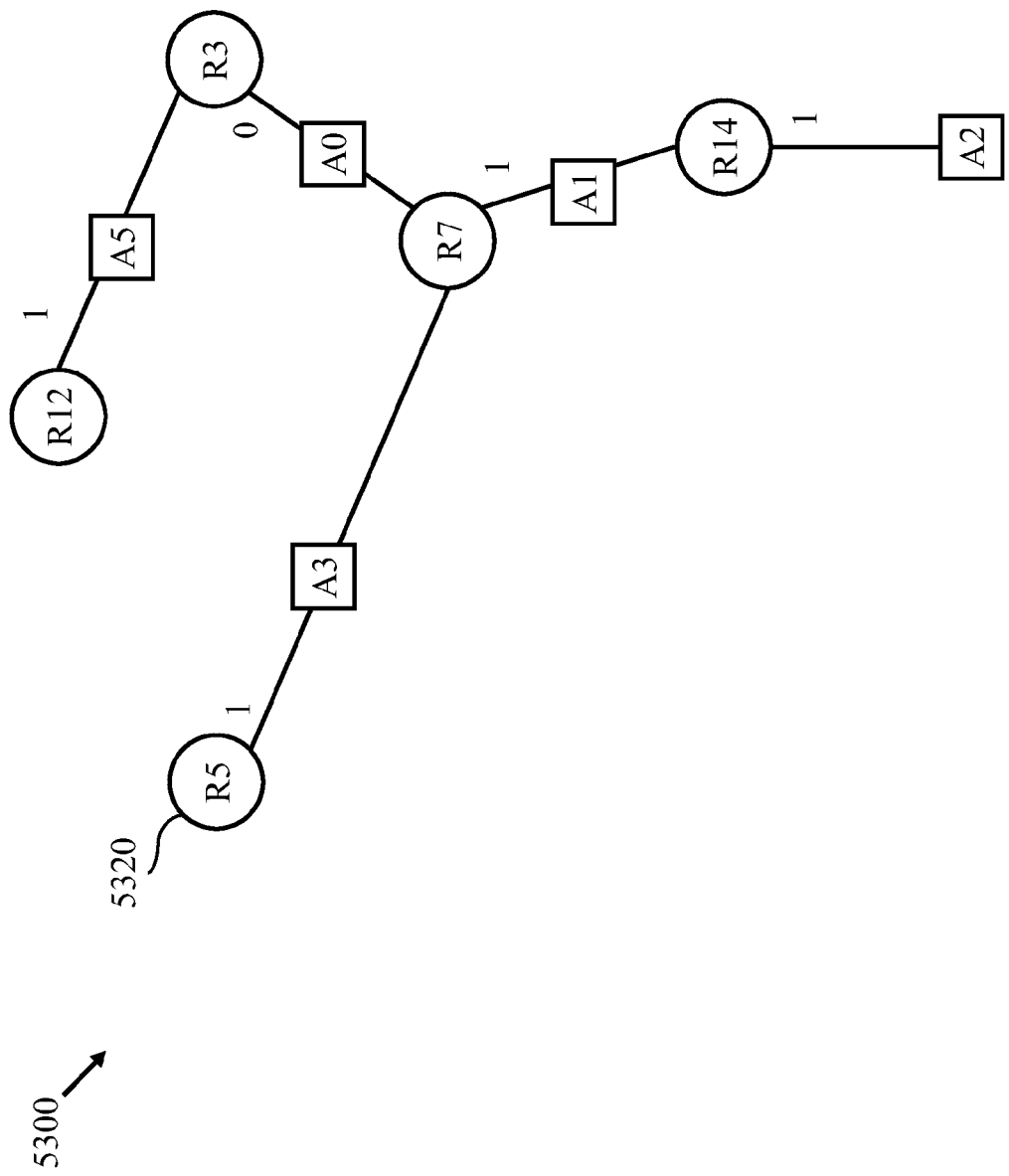
FIG. 53 illustrates an example of an order of processing rules according to the rule succession table of FIG. 51.

Based on rule succession table 5100 of FIG. 51, rules R5 and R12 are free rules belonging to the first stratum as indicated in FIG. 52 and are therefore evaluated first. FIG. 53 illustrates a case where rule R5 has a value of "1" and rule R12 also has a value of "1". The successor of rule R5 is then rule R7 and the successor of rule R12 is rule R3. Rule R7 becomes a successor of rule R3 if rule R3 has a value of "0". As indicated in FIG. 52, rule R3 belongs to the second stratum of mutually independent rules and rule R7 belongs to the third stratum of mutually independent rules. Hence, rule R3 is naturally evaluated before rule R7.

Figure 54:
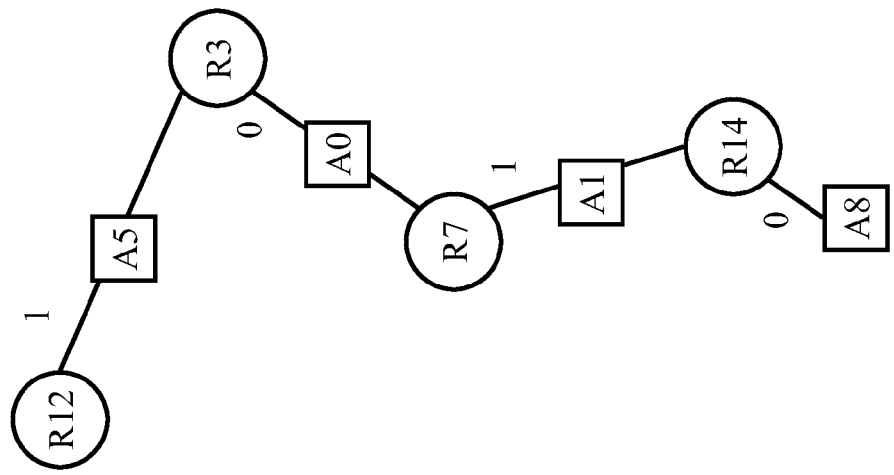
FIG. 54 illustrates another example of an order of processing rules according to the rule succession table of FIG. 51.
Figure 54:
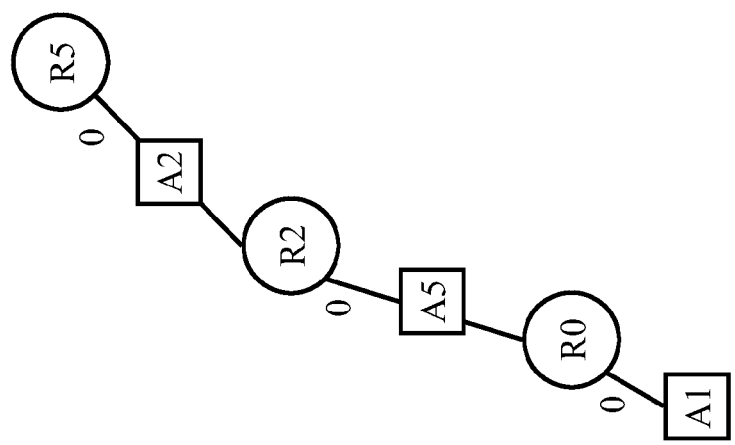

FIG. 54 illustrates a case where rule R5 has a value of "0" and rule R12 has a value of "1". The successor of rule R5 is then rule R2 and the successor of rule R12 is rule R3. As indicated in FIG. 54, rules R2 and R3 are mutually independent. FIG. 52 indicates that rules R2 and R3 belong to the second stratum of mutually independent rules.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. An apparatus for content filtering of data containers, said apparatus comprising:
a plurality of content-specific filtering modules, each content-specific module comprising a respective hardware processor executing content-specific instructions pertinent to respective content-specific rules for editing a component of a respective content type of a set of predefined content types to produce a respective edited component compatible with decoding capabilities of a respective receiver, said predefined content types comprising at least two of: a video signal; an audio signal; a text; a still-image signal; and an animation signal;
a root module comprising a root processor implementing processor-executable instructions to:
apply preliminary rules for admission of a received container of multiple container types of said set of predefined content types;
parse an admissible received container into constituent components; and
direct each said constituent component to a respective filtering module;
and
a multiplexer for combining edited components of said plurality of content-specific filtering modules for transmission to said respective receiver.

2. An apparatus for content filtering of data containers, said apparatus comprising:
a plurality of processing units, each processing unit comprising:
a hardware processor; and
a memory storing processor-executable instructions which cause said hardware processor to apply encoded rules to a data container of multiple content types of a set of predefined content types to produce an edited container compatible with decoding capabilities of a respective receiver, said predefined content types comprising at least two of: a video signal; an audio signal; a text; a still-image signal; and an animation signal;
an input memory device holding data containers, of said multiple content types, received from a network;
an input selector directing a data container from said input memory to an unoccupied processing unit of said plurality of processing units;
and
an output selector directing an edited container from a processing unit to said network.

3. The apparatus of claim 1 wherein said each content-specific filtering module comprises:
a respective module processor;
an instructions memory storing processor-executable instructions; and
a data-memory storing for a respective content type:
a set of descriptors;
a set of encoded filters, each encoded filter specifying a content descriptor, a descriptor criterion, and an operator; and
a set of ordered rules.

4. The apparatus of claim 1 wherein said processor-executable instructions cause said root processor to edit a received data container by performing at least one of:
deleting an attachment of said received data container;
deleting a component of said received data container; and
appending a notification to said received data container.

5. The apparatus of claim 1 wherein said content-specific instructions further cause said respective hardware processor to arrange respective content-specific rules into at least one rule tree where at least one content-specific rule leading to one of two respective actions and one of two other rules.

6. The apparatus of claim 1 wherein at least one content-specific filter is configured to perform a signal-processing function on a respective data component.

7. The apparatus of claim 1 further comprising a central data memory storing:
a superset of content-specific rules applicable to all predefined content types; and
a corresponding superset of actions;
said content-specific rules and actions being encoded as computer-executable instructions.

8. The apparatus of claim 2 further comprising
a central processor; and
a central instructions memory storing software instructions which cause the central processor to perform functions of a network interface coupled to said input selector and said output selector.

9. The apparatus of claim 8 wherein said network interface receives data containers belonging to multiple data streams and wherein said software instructions cause said central processor to affix to each received data container:
a label for identifying a data stream to which each received container belongs; and
a cyclic container number within each data stream.

10. The apparatus of claim 9 wherein said software instructions cause said central processor to arrange edited data containers of each data stream in a sequential order of corresponding received data containers.

11. The apparatus of claim 2 further comprising
a central processor; and
a description memory device storing a set of editing-action descriptions, where each editing-action description contains a natural-language description of a corresponding editing-action of a predefined set of editing-actions.

12. The apparatus of claim 2 wherein at least one processing unit of said plurality of processing units is coupled to a respective pre-processing configuration hardware device comprising:
a configuration processor;
a memory device storing encoded rules and actions;
an instructions memory device storing processor-executable instructions which cause said configuration processor to produce sorted rules; and
a memory device for holding pointers to sorted rules and corresponding actions.

13. The apparatus of claim 12 further comprising a memory device storing a set of rule-succession records, each rule succession record corresponding to a specific rule and contains indicators of:

a first action and a first succeeding rule corresponding to one binary outcome of the specific rule; and a second action and a second succeeding rule corresponding to opposite binary outcome of the specific rule.

14. The apparatus of claim 12 wherein said processor-executable instructions cause said configuration processor to arrange said rules into rule strata so that:

rules within each rule stratum are independent of each other; and rules within each rule stratum beyond a first stratum depend on at least one rule of at least one preceding rule stratum.

15. A method of content filtering of data containers, said method comprising:

receiving a data container of multiple content types of a set of predefined content types comprising at least two of: a video signal; an audio signal; a text; a still-image signal; and an animation signal;

at a root module having a root processor:
    screening said data container;
    parsing said data container into constituent components; and
    directing each said constituent component to a respective filtering module of a plurality of content-specific filtering modules, each content-specific module comprising a respective hardware processor;

at each said content-specific filtering module, executing content-specific instructions for editing a respective component of a specific content type to produce a respective edited component compatible with decoding capability of a respective receiver; and combining edited components produced by said plurality of content-specific filtering modules to produce an edited data container for transmission to said respective receiver.

16. The method of claim 15 wherein said screening comprises at least one of:

accepting said data container;
deleting a constituent component; and
deleting an attachment of said data container.

17. The method of claim 15 wherein said editing comprises at least one of:

transcoding said respective component; and
appending a respective notification pertinent to said respective component.

18. A method of content filtering of data containers, said method comprising:

receiving, from a network, a succession of data containers of multiple content types of a set of predefined content types;

directing each data container to an unoccupied processing unit of a plurality of processing units, each processing unit comprising a respective hardware processor implementing instructions to edit all components of any data container of said multiple content types to produce an edited container compatible with decoding capabilities of a respective receiver, said predefined content types comprising at least two of: a video signal; an audio signal; a text; a still-image signal; and an animation signal;

and transferring edited containers produced at said plurality of processing units to said network;

said receiving, directing, and transferring being controlled by a central processor.

19. The method of claim 18 further comprising said central processor:

identifying a data stream to which each data container of said succession of data containers belongs; and affixing to said each data container:
    a label identifying said data stream; and
    a cyclic data-container number within each data stream.

20. The method of claim 18 further comprising providing, for at least one of said filtering modules, a configuration processor executing instructions causing the configuration processor to:

acquire encoded rules and actions;
sort said encoded rules to produce sorted rules; and
determine pointers to said sorted rules and corresponding actions.

* * * * *